United States Patent
Uchida et al.

(10) Patent No.: US 10,171,697 B2
(45) Date of Patent: Jan. 1, 2019

(54) IMAGE FORMING APPARATUS, IMAGE FORMING SYSTEM, REMOTE CONTROL METHOD AND NON-TRANSITORY COMPUTER-READABLE RECORDING MEDIUM ENCODED WITH REMOTE CONTROL PROGRAM

(71) Applicant: KONICA MINOLTA, INC., Chiyoda-ku, Tokyo (JP)

(72) Inventors: Hisashi Uchida, Kyoto (JP); Kazumi Sawayanagi, Itami (JP); Toshimichi Iwai, Nara-ken (JP); Tomoaki Nakajima, Kobe (JP); Atsushi Tamura, Amagasaki (JP); Yuji Tanaka, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/004,590

(22) Filed: Jan. 22, 2016

(65) Prior Publication Data

US 2016/0219175 A1 Jul. 28, 2016

(30) Foreign Application Priority Data

Jan. 26, 2015 (JP) ................................. 2015-012769

(51) Int. Cl.
*H04N 1/00* (2006.01)
*G06F 1/32* (2006.01)
(Continued)

(52) U.S. Cl.
CPC ......... *H04N 1/00896* (2013.01); *G02B 27/01* (2013.01); *G02B 27/017* (2013.01);
(Continued)

(58) Field of Classification Search
CPC .......... H04N 13/0429; H04N 1/00896; H04N 1/00204; H04N 1/00246; H04N 1/00251;
(Continued)

(56) References Cited

U.S. PATENT DOCUMENTS 8,370,657 B2 2/2013 Kuroishi et al.
9,876,920 B2 1/2018 Matsuhara et al.
(Continued)

FOREIGN PATENT DOCUMENTS

CN 101888460 A 11/2010
CN 104219412 A 12/2014
JP 2012131187 A 7/2012

OTHER PUBLICATIONS

Chinese Office Action dated Jan. 11, 2018 issued in counterpart Chinese Application No. 201610044396.9.
(Continued)

*Primary Examiner* — Chad Dickerson
(74) *Attorney, Agent, or Firm* — Holtz, Holtz & Volek PC

(57) ABSTRACT

An image forming apparatus includes a communication circuit capable of, in the case where an operation mode is any of a driving mode and a power saving mode, communicating with a remote operation device, a sleep transition portion to switch the operation mode to the power saving mode, a setting portion to set setting information in accordance with a remote operation command received from the remote operation device, a process execution portion to, in the case where the remote operation command received corresponds to an execution instruction operation, execute a process in accordance with the set setting information, and a recovery portion to maintain the operation mode in the power saving mode, and to, only in the case where the communication circuit receives the remote operation com-
(Continued)

mand corresponding to the execution instruction operation, switch the operation mode to the driving mode.

14 Claims, 34 Drawing Sheets

(51) Int. Cl.
  *H04N 13/332* (2018.01)
  *H04N 13/344* (2018.01)
  *G02B 27/01* (2006.01)

(52) U.S. Cl.
  CPC .............. *G06F 1/32* (2013.01); *G06F 1/3234* (2013.01); *H04N 1/00204* (2013.01); *H04N 1/00246* (2013.01); *H04N 1/00251* (2013.01); *H04N 1/00891* (2013.01); *H04N 13/332* (2018.05); *H04N 13/344* (2018.05); *H04N 2201/0094* (2013.01)

(58) Field of Classification Search
  CPC ... H04N 1/00891; G06F 3/012; G06F 3/3203; G06F 3/3206; G02C 5/00; G02C 11/10
  USPC .......... 358/1.11–1.18, 1.1, 1.9, 2.1; 359/466; 713/300, 310, 320, 321, 322, 323, 324, 713/330, 340; 348/E13.036; 396/324
  See application file for complete search history.

(56) References Cited

U.S. PATENT DOCUMENTS

| | | | | |
|---|---|---|---|---|
| 2007/0046618 | A1* | 3/2007 | Imai ...................... | G06F 1/3265 345/102 |
| 2010/0290074 | A1* | 11/2010 | Kuroishi ............ | G03G 15/5004 358/1.14 |
| 2010/0293400 | A1* | 11/2010 | Kuroishi ............... | G06F 3/1221 713/310 |
| 2012/0001937 | A1* | 1/2012 | Tagashira ............. | G02B 27/017 345/629 |
| 2013/0166935 | A1* | 6/2013 | Imaizumi .............. | G06F 1/3268 713/323 |
| 2014/0126018 | A1* | 5/2014 | Sugimoto ............... | G06F 3/013 358/1.15 |
| 2014/0355058 | A1* | 12/2014 | Matsuhara ......... | H04N 1/00381 358/1.15 |
| 2015/0168726 | A1* | 6/2015 | Kimura ................ | G02B 27/017 345/156 |
| 2017/0003743 | A1* | 1/2017 | Ichikawa ................ | G06F 3/013 |

OTHER PUBLICATIONS

Chinese Office Action (and English language translation thereof) dated Sep. 4, 2018 issued in counterpart Chinese Application No. 201610044396.9.

* cited by examiner

F I G. 3
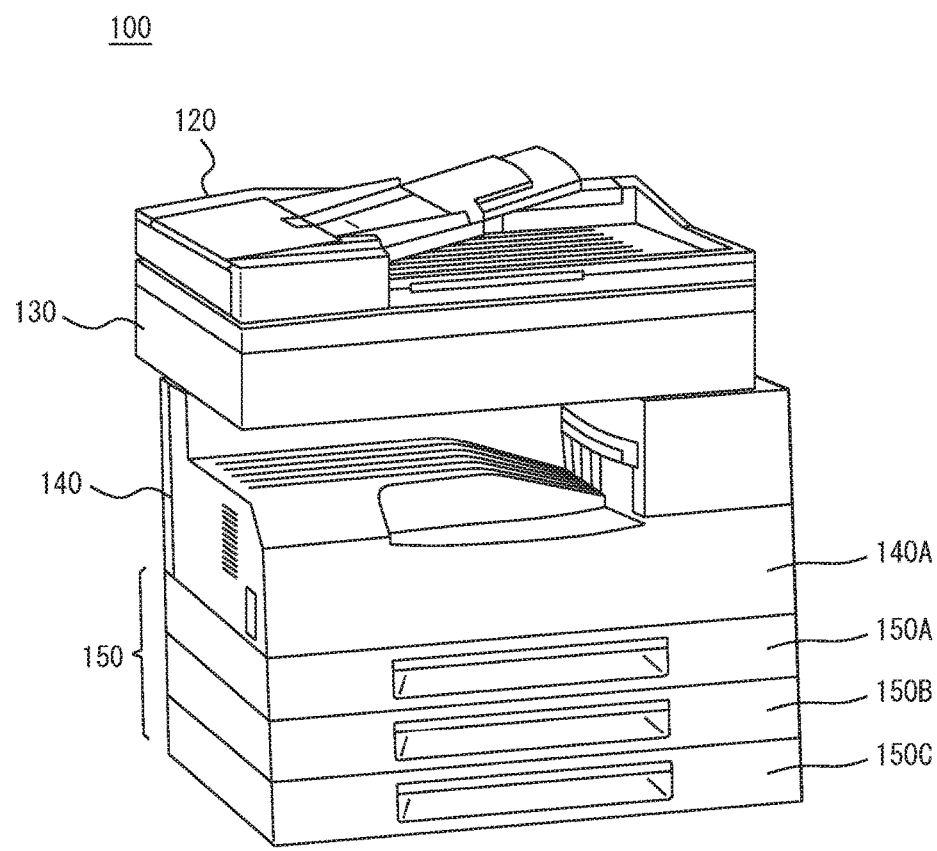

F I G. 7
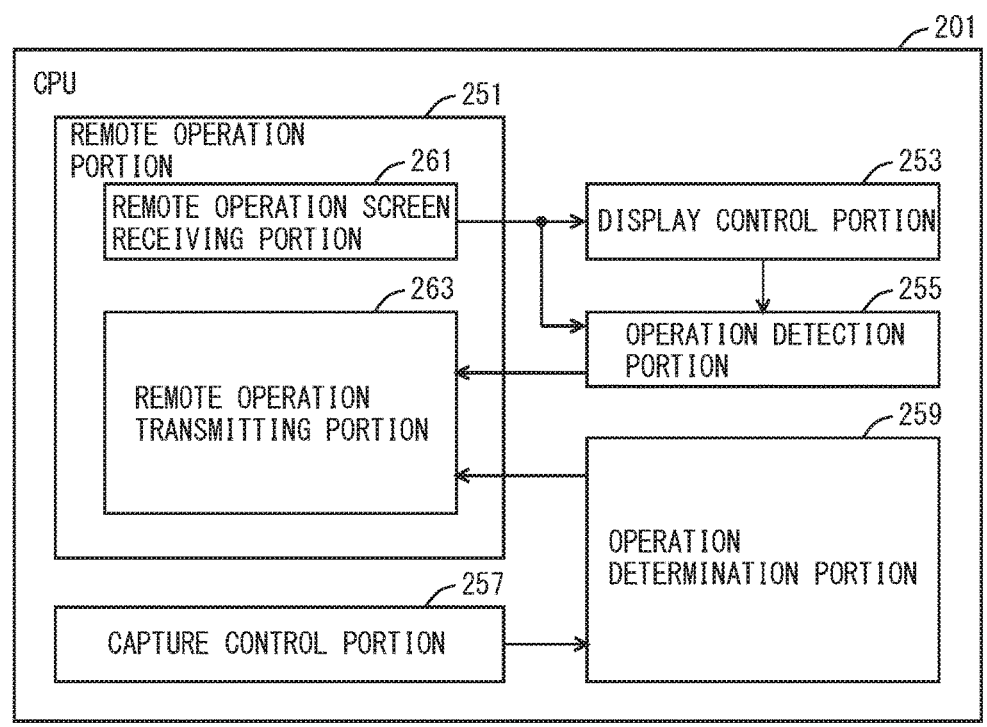

F I G. 3 4
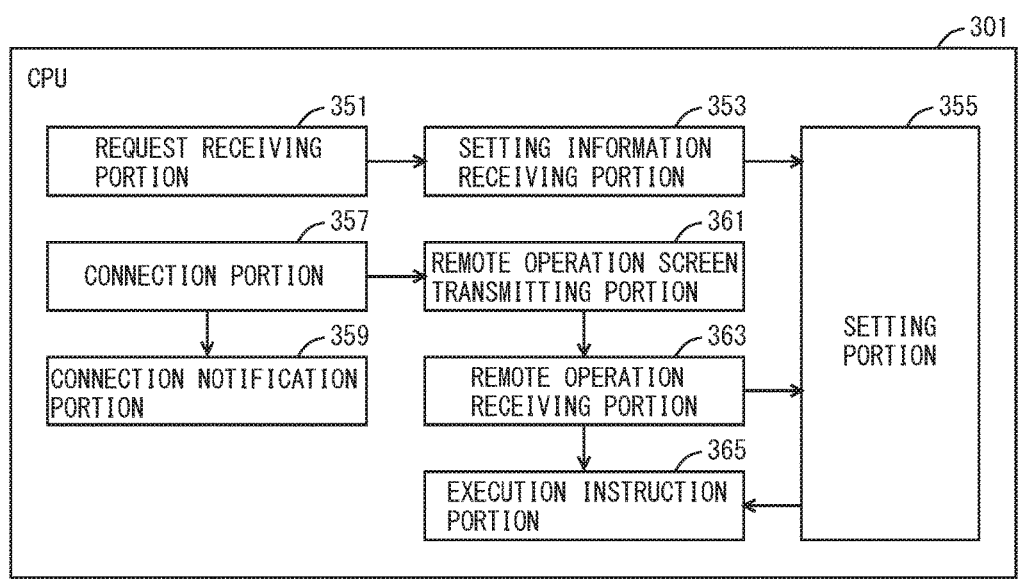

IMAGE FORMING APPARATUS, IMAGE FORMING SYSTEM, REMOTE CONTROL METHOD AND NON-TRANSITORY COMPUTER-READABLE RECORDING MEDIUM ENCODED WITH REMOTE CONTROL PROGRAM

This application is based on Japanese Patent Application No. 2015-012769 filed with Japan Patent Office on Jan. 26, 2015, the entire content of which is hereby incorporated by reference.

BACKGROUND OF THE INVENTION

Field of the Invention

The present invention relates to an image forming apparatus, an image forming system, a remote control method, and a non-transitory computer readable recording medium encoded with a remote control program. More specifically, the present invention relates to the image forming apparatus remotely operated by a remote operation device, the image forming system that includes the image forming apparatus remotely operated by the remote operation device, the remote control method to be performed by the image forming apparatus, and a non-transitory computer-readable recording medium encoded with the remote control program performed by a computer that controls the image forming apparatus.

Description of the Related Art

In recent years, regarding image forming apparatuses that typically include MFPs (Multi Function Peripheral), a request of reducing power consumption during a standby state in which the image forming apparatuses are not operating has grown. Japanese Patent Laid-Open No. 2012-131187 describes a printer that receives print data via a network line for printing, and acquires and sets setting information via the network line. The printer has a storage portion to store setting information received via the network line, a proxy server information storage portion to store information specifying a proxy server that stores the setting information on behalf of the storage portion, and a control portion to transmit the setting information to the proxy server when an operation mode is shifted to a power saving mode, and requests the setting information to the proxy server when the power saving mode is canceled.

On the one hand, the image forming apparatus has an operation panel, and cancels the power saving mode in order to accept an operation by a user in the case where the user operates using the operation panel. Further, the image forming apparatus has a paper feed tray to store paper, and cancels the power saving mode in the case where the user opens and closes the paper feed tray. Further, the image forming apparatus has a document tray for placing a document, and cancels the power saving mode in the case where the user places a document on a document tray. Therefore, even if the printer is in the power saving mode, in the case where the user operates the operation panel, the case where the user opens and closes the paper feed tray, the case where the user places a document on the document tray, or the like, the power saving mode is always canceled in conventional printers.

SUMMARY OF THE INVENTION

According to one aspect of the present invention, an image forming apparatus includes a communication circuit capable of, in the case where an operation mode is any of a driving mode and a power saving mode in which power consumption is smaller than the driving mode, communicating with a remote operation device, and a processor, wherein the processor includes a sleep transition portion configured to switch the operation mode from the driving mode to the power saving mode, a setting portion configured to set setting information in accordance with a remote operation command received by the communication circuit from the remote operation device, a process execution portion configured to, in the case where the remote operation command received by the communication circuit from the remote operation device corresponds to an execution instruction operation, execute a process in accordance with the set setting information, and a recovery portion configured to maintain the operation mode in the power saving mode until the communication circuit receives the remote operation command corresponding to the execution instruction operation, and configured to, only in the case where the communication circuit receives the remote operation command corresponding to the execution instruction operation, switch the operation mode to the driving mode.

According to another aspect of the present invention, an image forming apparatus includes a communication circuit capable of, in the case where an operation mode is any of a driving mode and a power saving mode in which power consumption is smaller than the driving mode, communicating with the remote operation device, and a processor, wherein the processor includes an operation detection portion configured to detect an operation by a user, a sleep transition portion configured to switch the operation mode from the driving mode to the power saving mode by satisfaction of a predetermined sleep condition, a setting portion configured to set setting information in accordance with the detected operation or a remote operation command received by the communication circuit from the remote operation device, and a recovery portion configured to, in the case where an operation is detected by the operation detection portion with the operation mode being switched to the power saving mode, switch the operation mode to the driving mode, and the recovery portion is configured not to, even in the case where an operation is detected by the operation detection portion, switch the operation mode to the driving mode during a period in which the remote operation device is remotely operation.

According to yet another aspect of the present invention, an image forming system that includes a remote operation device, an image forming apparatus remotely operated by the remote operation device, and a server, the image forming apparatus includes a communication circuit capable of, in the case where an operation mode is any of a driving mode and a power saving mode in which power consumption is smaller than the driving mode, communicating, and a processor, wherein the processor includes an operation detection portion configured to detect an operation by a user, a sleep transition portion configured to switch the operation mode from the driving mode to the power saving mode by satisfaction of a predetermined sleep condition, a setting information transmitting portion configured to, in the case where the operation mode is switched to the power saving mode, transmit setting information to the server, and a recovery portion configured to, in the case where an operation is detected by the operation detection portion with the operation mode being switched to the power saving mode, switch the operation mode to the driving mode, the remote operation device includes a capture portion that outputs an image capturing a subject, and an operation-side processor, wherein the operation-side processor includes an operation determination portion configured to determine an operation by the user based on the image output by the capture portion, and an operation transmitting portion configured to transmit a remote operation command corresponding to the operation determined by the operation determination portion to the server, the server includes a proxy setting portion configured to receive a remote operation command transmitted by the remote operation device on behalf of the image forming apparatus after receiving the setting information from the image forming apparatus, and change the setting information received from the image forming apparatus in accordance with the remote operation command received from the remote operation device, and an execution instruction portion configured to, in the case where the remote operation command received from the remote operation device corresponds to an execution instruction operation of giving an instruction to execute a process, transmit the changed setting information and the remote operation command corresponding to the execution instruction operation to the image forming apparatus, wherein the processor included in the image forming apparatus further includes a process execution portion configured to, in response to reception of the setting information and the remote operation command corresponding to the execution instruction operation from the server by the transmission circuit, execute a process in accordance with the received setting information, and the recovery portion is configured, even in the case where an operation is detected by the operation detection portion, not to switch the operation mode to the driving mode during a period in which the server is proxying.

According to yet another aspect of the present invention, a remote control method performed by an image forming apparatus remotely operated by a remote operation device, the image forming apparatus comprising a communication circuit capable of, in the case where an operation mode is any of a driving mode and a power saving mode in which power consumption is smaller than the driving mode, communicating with the remote operation device, the remote control method allowing the image forming apparatus to perform a sleep transition step of switching the operation mode from the driving mode to the power saving mode, a setting step of setting setting information in accordance with a remote operation command received from the remote operation device with the image forming apparatus being remotely operated by the remote operation device, a process execution step of, in the case where the remote operation command received from the remote operation device corresponds to an execution instruction operation, executing a process in accordance with the set setting information, and a recovery step of maintaining the operation mode in the power saving mode until the remote operation command corresponding to the execution instruction operation is received, and switching the operation mode to the driving mode only in the case where the remote operation command corresponding to the execution instruction operation is received.

According to yet another aspect of the present invention, a remote control method that is performed by an image forming apparatus, the image forming apparatus includes a communication circuit capable of, in the case where an operation mode is any of a driving mode and a power saving mode in which power consumption is smaller than the driving mode, communicating with the remote operation device, the remote control method includes an operation detection step of detecting an operation by a user, a sleep transition step of switching the operation mode from the driving mode to the power saving mode by satisfaction of a predetermined sleep condition, a setting step of setting setting information in accordance with the detected operation or a remote operation command received from the remote operation device, and a recovery step of, in the case where the operation is detected in the operation detection step with the operation mode being switched to the power saving mode, switching the operation mode to the driving mode, wherein the recovery step includes a step of, even in the case where the operation is detected by the operation detection portion, not switching the operation mode to the driving mode during a period in which the remote operation device is remotely operating.

According to yet another aspect of the present invention, a non-transitory computer-readable recording medium encoded with a remote control program, wherein the remote control program allows a computer, which controls the image forming apparatus having a communication circuit capable of, in the case where an operation mode is any of a driving mode and a power saving mode in which power consumption is smaller than the driving mode, communicating with the remote operation device, to perform a sleep transition step of switching the operation mode from the driving mode to the power saving mode, a setting step of setting setting information in accordance with a remote operation command received from the remote operation device with the image forming apparatus being remotely operated by the remote operation device, a process execution step of, in the case where the remote operation command received from the remote operation device corresponds to an execution instruction operation, executing a process in accordance with the set setting information, and a recovery step of maintaining the operation mode in the power saving mode until the remote operation command corresponding to the execution instruction operation is received, and switching the operation mode to the driving mode only in the case where the remote operation command corresponding to the execution instruction operation is received.

According to yet another aspect of the present invention, a non-transitory computer-readable recording medium encoded with a remote control program, wherein the remote control program allows a computer, which controls the image forming apparatus having a communication circuit capable of, in the case where an operation mode is any of a driving mode and a power saving mode in which power consumption is smaller than the driving mode, communicating with the remote operation device, to perform an operation detection step of detecting an operation by a user, a sleep transition step of switching the operation mode from the driving mode to the power saving mode by satisfaction of a predetermined sleep condition, a setting step of setting setting information in accordance with the detected operation or a remote operation command received from the remote operation device, and a recovery step of, in the case where the operation is detected by the operation detection portion with the operation mode being switched to the power saving mode, switching the operation mode to the driving mode, wherein the recovery step includes a step of, even in the case where the operation is detected by the operation detection portion, not switching the operation mode to the driving mode during a period in which the remote operation device is remotely operating.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 3 is a perspective view showing an appearance of an MFP in a first embodiment.

FIG. 7 is a block diagram showing one example of an outline of functions of a CPU included in the HMD.

FIG. 34 is a block diagram showing one example of functions of a CPU included in a server in the fourth embodiment.

DESCRIPTION OF THE PREFERRED EMBODIMENTS

Figure 1:
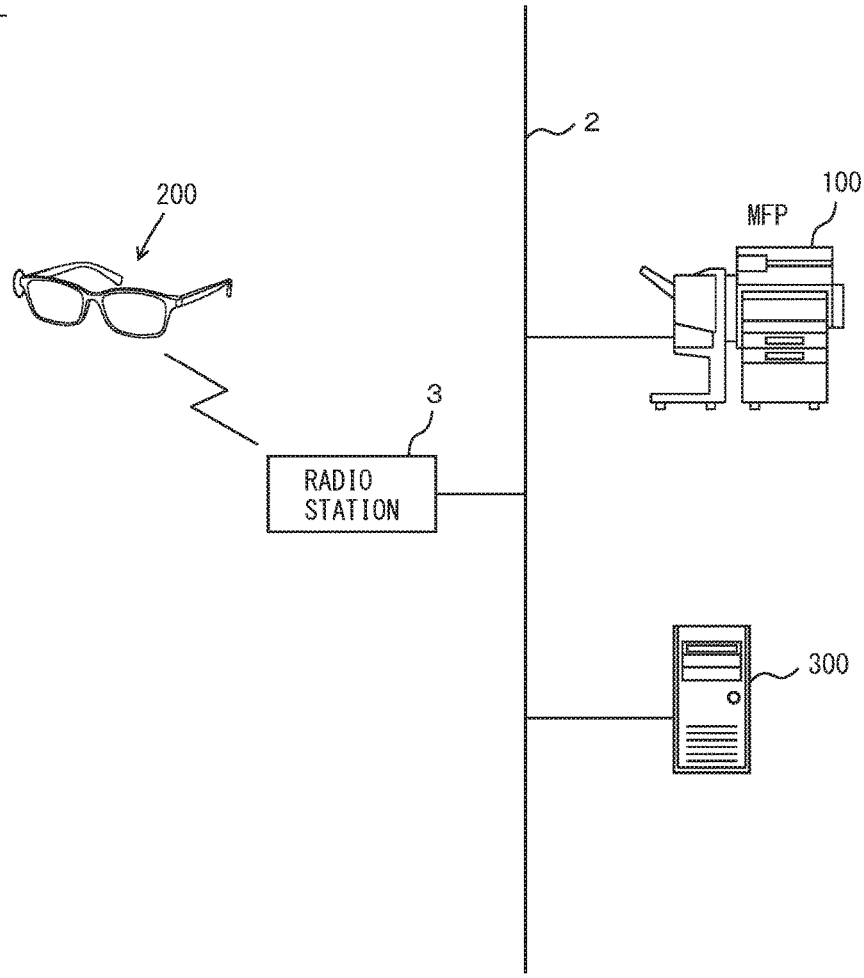
FIG. 1 is a diagram showing one example of an overview of an image forming system in embodiments of the present invention.

Embodiments of the present invention will be described below with reference to drawings. In the following description, the same parts are denoted with the same reference numerals. Their names and functions are also the same. A detailed description thereof is therefore not repeated.

<First Embodiment>

FIG. 1 is a diagram showing one example of an overview of an image forming system in an embodiment of the present invention. Referring to FIG. 1, the image forming system 1 includes an MFP (Multi Function Peripheral) 100, a head mount display (hereinafter referred to as an "HMD") 200 and a server 300.

The HMD 200 has a shape of glasses and is used by being worn by a user. The HMD 200 functions as a remote operation device that remotely operates the MFP 100, and includes at least a capture function to capture a subject, a display function to display an image in lens portions of the glasses, and a communication function using a wireless LAN. The user who wears the HMD 200 can simultaneously view the image displayed in the lenses as he or she views the subject through the lenses.

The MFP 100 includes a document scanning function for scanning a document, an image forming function for forming an image on a recording medium such as paper based on image data, and a facsimile transmitting-receiving function for transmitting and receiving facsimile data. The server 300 is a general computer.

A radio station 3, the MFP 100, and the server 300 are respectively connected to a network 2. The network 2 is a Local Area Network (LAN), either wired or wireless. Further, the Network 2 is not limited to the LAN, and may be a network using Public Switched Telephone Networks or the like. Further, the network 2 may be the internet or the Wide Area Network (WAN).

Further, the network 2 may be connected to the internet. In this case, the radio station 3, the MFP 100, and the server 300 can respectively communicate with a computer connected to the internet via the network 2. The radio station 3 is a relay device of the network 2, and communicates with the HMD 200 that includes a communication function using a wireless LAN to connect the HMD 200 to the network 2. Thus, the HMD 200 can communicate with the MFP 100 and the server 300.

If including the capture function to capture a subject, the display function to display an image, and the communication function using a wireless LAN, portable information devices carried by the user such as PDAs (Personal Digital Assistants) or smartphones may be used instead of the HMD 200.

Figure 2:
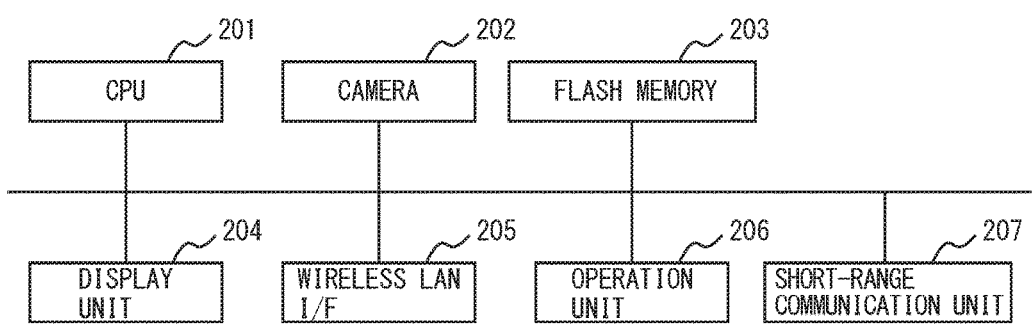
FIG. 2 is a block diagram showing one example of hardware configurations of an HMD in the present embodiment.

FIG. 2 is a block diagram showing one example of hardware configurations of the HMD in the present embodiment. Referring to FIG. 2, the HMD 200 in the present embodiment includes a CPU 201 for controlling the entire HMD 200, a camera 202, a flash memory 203 for storing data in a nonvolatile manner, a display unit 204 for displaying information, a wireless LAN I/F 205, an operation unit 206, and a short-range communication unit 207.

The camera 202 includes a lens and an optoelectronic transducer, light collected by the lens is imaged on the optoelectronic transducer, and the optoelectronic transducer photoelectrically converts the received light to output the image data to the CPU 201. The optoelectronic transducer is a CMOS (Complementary Metal Oxide Semiconductor) sensor, a CCD (Charge Coupled Device) sensor or the like. The camera 202 outputs image data of a video image. If being capable of capturing a video image, video cameras may be used instead of the HMD 200.

The display unit 204 is an LCD (Liquid Crystal Display) made of a transparent member, and embedded in surfaces of the lenses of the HMD 200. The display surfaces of the display unit 204 are arranged to be the same as the field of view in the case where the HMD 200 is worn by the user. Therefore, an image can be displayed at any position in the field of view of the user. An optical axis and a capture range of the camera 202 are arranged at positions defined on the basis of the display surface of the display unit 204. Specifically, the optical axis and the capture range of the camera 202 are set the same as the field of view in the case where the HMD 200 is worn by the user. Therefore, an image captured and acquired by the camera 202 is substantially the same as an image of the field of view, which the user actually sees.

The wireless LAN I/F 205 is an interface for communicating with the radio station 3 and connecting the HMD 200 to the network 2. IP (Internet Protocol) addresses of the MFP 100 and the server 300 are respectively registered in the HMD 200, so that the wireless LAN I/F 205 can communicate with the MFP 200 and the server 300, and transmit and receive data.

The short-range communication unit 207 wirelessly performs communication with the MFP 100 and the server 300 based on a GAP (Generic Access Profile) of Bluetooth standard (registered trademark) or the like. When a distance with the MFP 100 or the server 300 is not more than a communicable range, the short-range communication unit 207 communicates with the HMD 200. A communicable range of the short-range communication unit 207 is several meters. Further, the short-range communication unit 207 may communicate in a short-range radio communication system of NFC (Near Field Communication). In this case, a communicable range of the short-range communication unit 207 is several dozen centimeters.

When becoming communicable with the MFP 100 or the server 300, the short-range communication unit 207 may hand over the communication with the MFP 100 or the server 300 to the wireless LAN I/F 205. In this case, the wireless LAN I/F 205 is not required to perform negotiation for establishing a communication path with the MFP 100 or the server 300, so that it is easy to establish the communication path. In the present embodiment, the HMD 200 may communicate using any of the short-range communication unit 207 and the wireless LAN I/F 205.

The flash memory 203 stores a program to be executed by the CPU 201 or data required in order to execute the program. The CPU 201 loads the program recorded in the flash memory 203 into the RAM included in the CPU 201 for execution. In this case, another computer connected to the network 2 or the internet may overwrite the program stored in the flash memory 203 or additionally write a new program. Further, the HMD 200 may download the program from another computer connected to the network 2 or the internet, and store the program in the flash memory 203. The program referred to here includes not only a program directly executable by the CPU 201 but also a source program, a compressed program, an encrypted program or the like.

The operation unit 206 includes a microphone and accepts an instruction by the user by collecting voice produced by the user with the microphone and identifying the collected voice. For example, if names of commands respectively corresponding to a plurality of operations are defined, and the name of the command that is the same as character information acquired by the voice recognition is present, the operation unit 206 accepts an operation of giving an instruction to perform the command corresponding to the name of the command. Further, the operation unit 206 accepts the character information acquired by the voice recognition as an input value such as a character string or a numerical sequence. Further, the operation unit 206 includes a sight line detection sensor that detects a sight line of the user, and accepts an operation of specifying a process target portion by specifying a portion at which the user is viewing in the displayed image from the sight line detected by the sight line detection sensor and the image displayed in the display unit 204. For example, if an image of a button for accepting permission is displayed in the display unit 204, and the sight line detected by the sight line detection sensor is positioned within the image of the button, the operation unit 206 accepts an operation of designating the button for accepting permission by the user.

FIG. 3 is a perspective view showing an appearance of the MFP in the first embodiment. Referring to FIG. 3, the MFP 100 is one example of an image forming apparatus, and includes a document scanning unit 130 for scanning a document, an automatic document feeder 120 for transporting a document to the document scanning unit 130, an image forming unit 140 for forming an image on paper or other medium based on image data output by document scanning unit 130 scanning a document, a paper feed unit 150 for supplying paper to the image forming unit 140. The MFP 100 includes a front door 140A. The image forming unit 140 is externally exposed with the front door 140A being open, and the image forming unit 140 is not externally exposed with the front door 140A being closed. Further, the paper feed unit 150 includes 3 paper feed trays 150A, 150B, 150C for storing paper.

The automatic document feeder 120 automatically transports a plurality of documents set on a document feed tray to a predetermined document scanning position set on a platen glass of the document scanning unit 130 one by one, and discharges the document of which a document image is scanned by the document scanning unit 130 to a document discharge tray. The document scanning unit 130 includes a light source that irradiates the document transported to the document scanning position with light, and an optoelectronic transducer that receives the light reflected by the document, and scans the document image according to a size of the document. The optoelectronic transducer converts the received light into image data, which is an electric signal, and outputs the image data to the image forming unit 140. The paper feed unit 150 has the plurality of paper feed trays. Each of the plurality of paper feed trays stores the paper of a predetermined size. The paper feed unit 150 takes out paper from a paper feed tray that stores paper of a size used for image formation among the plurality of paper feed trays, and transports the taken paper to the image forming unit 140.

The image forming unit 140 forms an image by a well-known telecrophotographic method, and forms an image on the paper transported by the paper feed unit 150 based on image data on which a data process is performed or image data that is externally received. The data process includes various data processes such as shading correction performed on the image data received from the document scanning unit 130.

Figure 4:
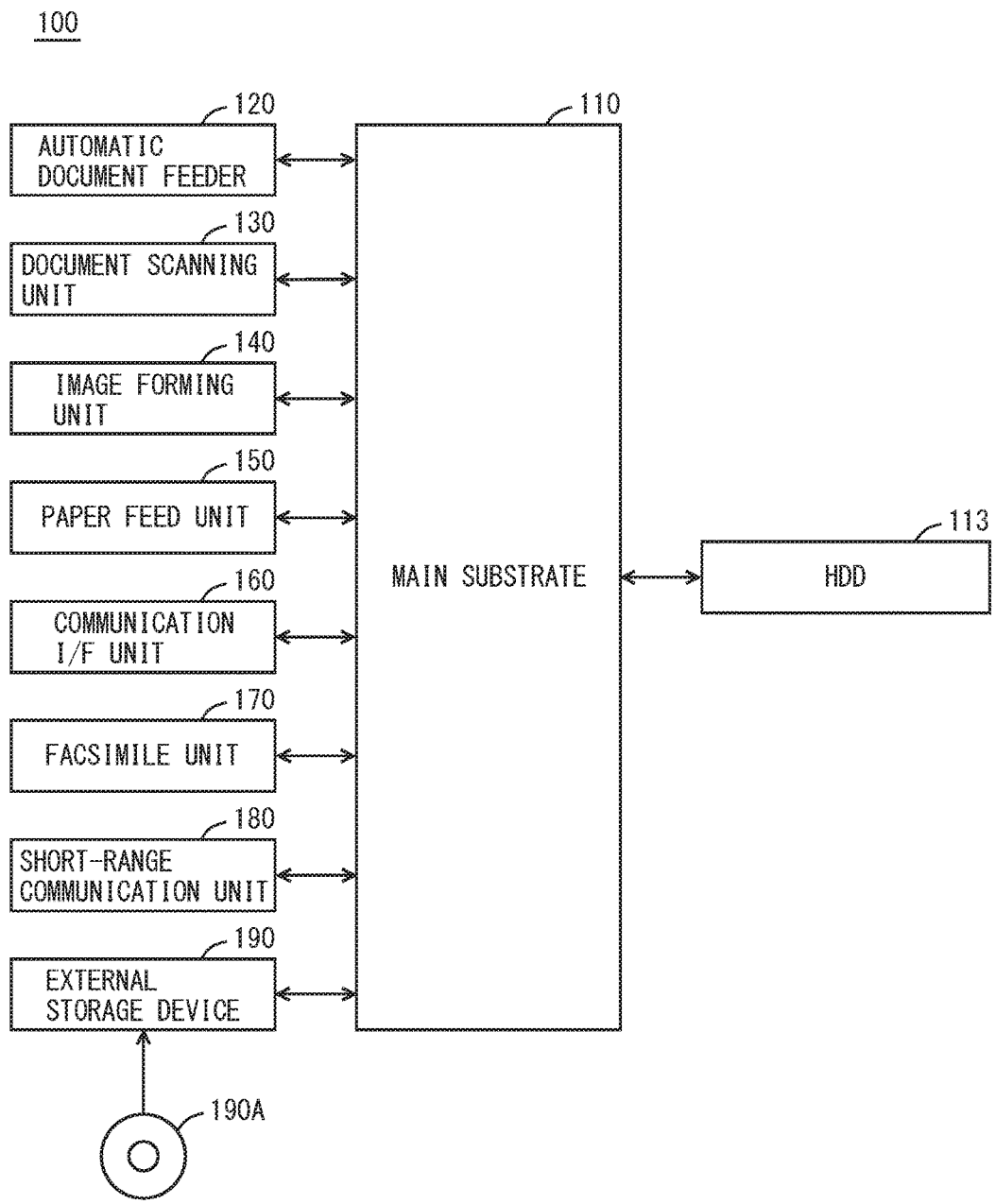
FIG. 4 is a block diagram showing one example of an outline of the hardware configurations of the MFP in the first embodiment.

FIG. 4 is a block diagram showing one example of an outline of hardware configurations of the MFP in the first embodiment. Referring to FIG. 4, the MFP 100 includes a main substrate 110, a communication interface (I/F) unit 160, a facsimile unit 170, a short-range communication unit 180, an external storage device 190, and a hard disc drive (HDD) 113 as a mass storage device in addition to the automatic document feeder 120, the document scanning unit 130, the image forming unit 140, and the paper feed unit 150, described above.

The main substrate 110 is connected to the automatic document feeder 120, the document scanning unit 130, the image forming unit 140, and the paper feed unit 150, and the communication I/F unit 160, the facsimile unit 170, the short-range communication unit 180, the external storage device 190, and the HDD 113.

The communication I/F unit 160 is an interface for connecting the MFP 100 to the network 2. The communication I/F unit 160 communicates with the server 300 or the radio station 3 by a communication protocol such as a TCP (Transmission Control Protocol) or a UDP (User Datagram Protocol), the server 300 and the radio station 3 being connected to the network 2. The protocol for communication is not limited in particular, and any protocol can be used. Therefore, the MFP 100 can communicate with the HMD 200 via the radio station 3.

The short-range communication unit 180 wirelessly communicate with the HMD 200 based on the GAP of Bluetooth standard (registered trademark) or the like. When a distance with the HMD 200 becomes not more than the communicable range, the short-range communication unit 180 communicates with the HMD 200. A communicable range of the short-range communication unit 180 is several meters. Further, the short-range communication unit 180 may communicate in a short-range radio communication system of NFC. In this case, a communicable range of the short-range communication unit 180 is several dozen centimeters.

The facsimile unit 170 is connected to a Public Switched Telephone Network (PSTN) to transmit and receive facsimile data. A CD-ROM (Compact Disc Read Only Memory) 190A or a semiconductor memory is attached to the external storage device 190. The external storage device 190 reads out the data stored in the CD-ROM 190A or the semiconductor memory. The external storage device 190 stores data in the CD-ROM 190A or the semiconductor memory.

The CD-ROM 190A is attached to the external storage device 190. A CPU (Central Processing Unit) included in the main substrate 110 can access the CD-ROM 190A via the external storage device 190. The CPU included in the main substrate 110 loads a program recorded in the CD-ROM 190A attached to the external storage device 190 into the RAM included in the main substrate 100 for execution. As a medium that stores a program to be executed by the CPU included in the main substrate 110, the medium is not limited to the CD-ROM 190A, and may be a semiconductor memory such as an optical disc (MO (Magnetic Optical Disc)/MD (Mini Disc)/DVD (Digital Versatile Disc)), an IC card, an optical card, a mask ROM, an EPROM (Erasable Programmable ROM), an EEPROM (Electrically EPROM) or the like.

Further, a program to be executed by the CPU included in the main substrate 110 is not limited to a program recorded in the CD-ROM 190. A program stored in the HDD 113 may be loaded into the RAM included in the main substrate 110 for execution. In this case, another computer connected to the network 2 may overwrite the program stored in the HDD 113 of the MFP 100 or additionally write a new program. Further, the MFP 100 may download a program from another computer connected to the network 2, and store the program in the HDD 113. The program referred to here is not only a program directly executable by the CPU included in the main substrate 110 but also includes a source program, a compressed program, an encrypted program or the like.

Figure 5:
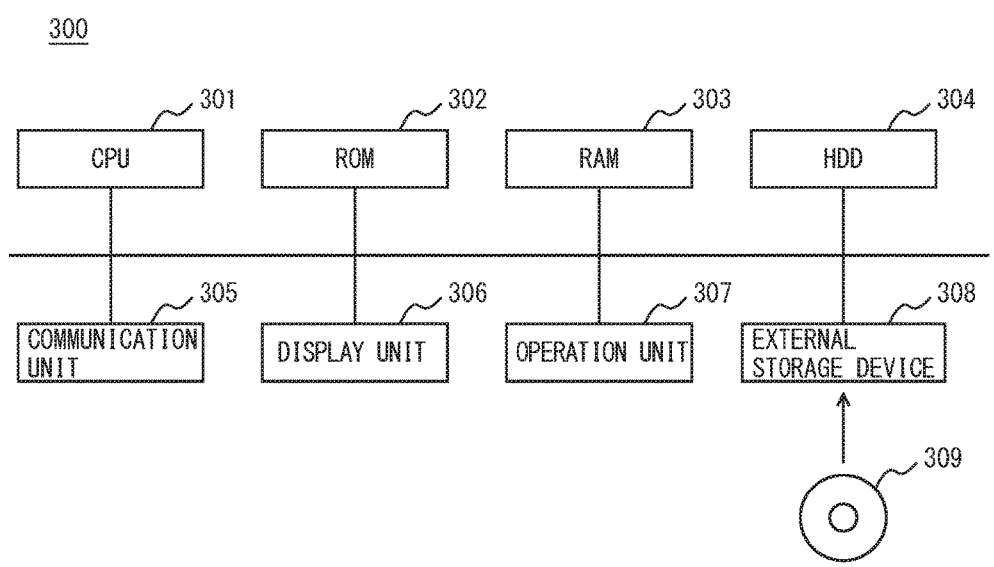
FIG. 5 is a block diagram showing one example of hardware configurations of a server in the present embodiment.

FIG. 5 is a block diagram showing one example of hardware configurations of the server in the present embodiment. Referring to FIG. 5, the server 300 includes a CPU 301 for controlling the entire server 300, a ROM 302 that stores a program to be executed by the CPU 301, a RAM 303 that is used as a work area of the CPU 301, an HDD 304 that stores data in a nonvolatile manner, a communication unit 305 that connects the CPU 301 to the network 2, a display unit 306 that displays information, an operation unit 307 that accepts input of an operation of the user, and an external storage device 308.

The CPU 301 loads a program stored in the ROM 302 or the HDD 304 into the RAM 302 for execution. A CD-ROM 309 storing a program can be attached to the external storage device 308. The CPU 301 can access the CD-ROM 309 via the external storage device 308. The CPU 301 can load the program recorded in the CD-ROM 309 into the RAM 302 for execution.

The programs recorded in the ROM 302, the HDD 304 or the CD-ROM 309 have been described as programs to be executed by the CPU 301. However, another computer connected to the network 2 may overwrite a program stored in the HDD 304 or additionally write a new program. Further, the server 300 may download a program from another computer connected to the network 2. The program referred to here includes not only a program directly executable by the CPU 301 but also includes a source program, a compressed program, an encrypted program or the like.

The program to be executed by the CPU 301 may be stored not only in the CD-ROM 309 but also in a semiconductor memory such as an optical disc (MO/MD/DVD), an IC card, an optical card, a mask ROM, an EPROM, and an EEPROM.

Figure 6:
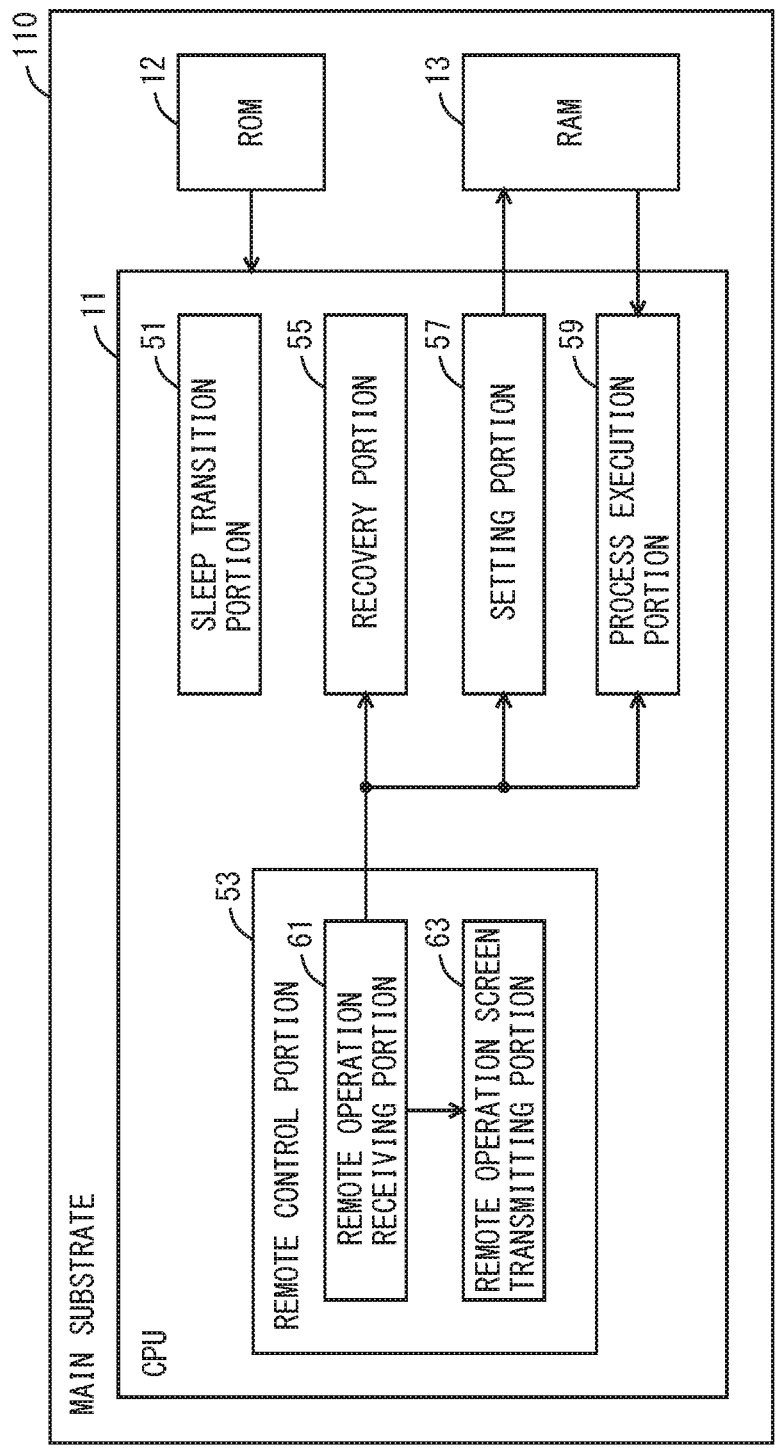
FIG. 6 is a block diagram showing one example of configurations of a main substrate included in the MFP in the first embodiment.

FIG. 6 is a block diagram showing one example of configurations of the main substrate included in the MFP in the first embodiment. Referring to FIG. 6, the main substrate 110 included in the MFP 100 includes a CPU 11 that controls the entire MFP 100, a ROM 12 that stores a program to be executed by the CPU 11, and data and the like required for execution of the program, and a RAM 13 that is used as a work area of the CPU 11.

The CPU 11 forms a sleep transition portion 51, a remote control portion 53, a recovery portion 55, a setting portion 57, and a process execution portion 59 by executing a remote control program. An example in which the main substrate 110 includes the CPU 11, the ROM 12, and the RAM 13 is described. However, the main substrate 110 may be constituted by a circuit that realizes functions similar to the sleep transition portion 51, the remote control portion 53, the recovery portion 55, the setting portion 57, and the process execution portion 59, which are formed by execution of the remote control program by the CPU 11. For example, a relay circuit may be used as the circuit in this case.

The remote control portion 53 controls the short-range communication unit 180 and/or the communication I/F unit 160 to establish a communication path with the remote operation device. Here, the remote operation device is the HMD 200. For example, when the short-range communication unit 180 or the communication I/F unit 160 becomes communicable with the HMD 200, the remote control portion 53 establishes a communication path with the HMD 200 via the short-range communication unit 180 or the communication I/F unit 160. Further, when the short-range communication unit 180 becomes communicable with the HMD 200, the remote control portion 53 performs setting to communicate with the HMD 200 via the communication I/F unit 160 by negotiating with the HMD 200, and controls the communication I/F unit 160 to establish the communication path with the HMD 200.

When the communication path established between the communication I/F unit 160 and the HMD 200 that is the remote operation device is cut off, the sleep transition portion 51 switches an operation mode from a driving mode to a power saving mode. Power consumption of the power saving mode is smaller than the driving mode. Here, in the power saving mode, the sleep transition portion 51 shuts off the power supplied to the automatic document feeder 120, the document scanning unit 130, the image forming unit 140, the paper feed unit 150, and the HDD 113. Even when the operation mode is the power saving mode, the communication I/F unit 160, the facsimile unit 170, and the short-range communication unit 180 receive the power, and operate in order to receive data externally transmitted.

The remote control portion 53 includes a remote operation receiving portion 61 and a remote operation screen transmitting portion 63. When the communication path is established between the communication I/F unit 160 and the HMD 200, the remote operation screen transmitting portion 63 reads out a remote operation screen defined as a default and an initial screen from the HDD 113, controls the communication I/F unit 160 to transmit the read remote operation screen to the HMD 200, and outputs the remote operation screen to the remote operation receiving portion 61.

Even in the case where the operation mode is switched to either the driving mode or the power saving mode, the remote control portion 53 establishes a communication path with the HMD 200. The remote operation receiving portion 61 controls the communication I/F unit 160 to receive a remote operation command transmitted from the HMD 200. In response to reception of the remote operation command from a remote operation device, the remote operation receiving portion 61 outputs the remote operation command to the remote operation screen transmitting portion 63, the recovery portion 55, the setting portion 57, and the process execution portion 59.

When receiving the remote operation command from the remote operation receiving portion 61, the remote operation screen transmitting portion 63 produces a remote operation screen corresponding to the remote operation command, and controls the communication I/F unit 160 to transmit the produced remote operation screen to the HMD 200.

The remote operation commands, which the HMD 200 that is the remote operation device transmits to the MFP 100, include a setting instruction command corresponding to a setting operation of setting setting information, a screen transition command corresponding to a screen transition operation of giving an instruction to switch the remote operation screen to another remote operation screen, and an execution instruction command corresponding to an execution instruction operation of giving an instruction to execute a process. The setting instruction command defines a setting item and setting information. The screen transition command includes screen identification information for identifying the remote operation screen. The execution instruction command includes process identification information for identifying a process.

The remote operation command, which the HMD 200 that is the remote operation device transmits to the MFP 100, sometimes includes position information indicating a position in a remote operation screen. In the case where the remote operation command that is received after the remote operation screen is transmitted includes the position information, the remote operation receiving portion 61 produces any of the setting instruction command, the screen transition command, and the execution instruction command based on the position information and the remote operation screen transmitted to the remote operation device by the remote operation screen transmitting portion 63, and outputs the produced setting instruction command, screen transition command, and execution instruction command to the remote operation screen transmitting portion 63, the recovery portion 55, the setting portion 57, and the process execution portion 59. Specifically, if the position specified in the remote operation screen by the position information is within a transition button included in the remote operation screen, the remote operation receiving portion 61 specifies the screen transition operation, and produces the screen transition command corresponding to the specified screen transition operation. If the position specified in the remote operation screen by the position information is within a region assigned to the command to set a setting value, the remote operation receiving portion 61 specifies a setting instruction operation, and produces the setting instruction command corresponding to the specified setting instruction operation. If the position specified in the remote operation screen by the position information is within a region of a button assigned to an execution command, the remote operation receiving portion 61 specifies an execution instruction operation, and produces the execution instruction command corresponding to the specified execution instruction operation.

In the case where receiving the setting instruction command from the remote operation receiving portion 61, the setting portion 57 sets the setting information in accordance with the setting instruction command. The setting portion 57 sets the setting information defined by the setting instruction command in a setting item defined by the setting instruction command. Specifically, the setting portion 57 updates the setting information of the setting item defined by the setting command among the setting information stored in the RAM 13 by the setting information defined by the setting command.

In response to input of the screen transition command from the remote operation receiving portion 61, the remote operation screen transmitting portion 63 produces a remote operation screen defined by the screen transition command, and controls the transmission I/F unit 160 to transmit the produced remote operation screen to the HMD 200.

In the case where the operation mode is switched to the power saving mode, the recovery portion 55 switches the operation mode to the driving mode in response to input of the execution instruction command from the remote operation receiving portion 61. Specifically, the recovery portion 55B supplies the power to the automatic document feeder 120, the document scanning unit 130, the image forming unit 140, the paper feed unit 150, and the HDD 113.

The MFP 100 in the first embodiment may include a sensor indicating that the paper feed tray of the paper feed unit 150 is opened, a sensor detecting that a document has been placed on the automatic document feeder 120, a sensor detecting a size of the document, a sensor detecting a paper inverting unit, and a sensor detecting the opening and closing of the front door 140A to expose inside of the image forming unit 140. In this case, in the case where the operation mode is switched to the power saving mode, even if the opening of the paper feed tray of the paper feed unit 150 is detected, placement of the document on the automatic document feeder 120 is detected, the paper inverting unit is detected, or the opening of the front door 140A is detected, by the above-mentioned sensors, the recovery portion 55 maintains the power saving mode until receiving the execution instruction command from the remote operation receiving portion 61.

In response to input of the execution instruction command from the remote operation receiving portion 61 with the operation mode being switched to the driving mode, the process execution portion 59 executes a process defined by the execution instruction command in accordance with the setting information set by the setting portion 57. Specifically, the process execution portion 59 reads out the setting information stored in the RAM 13, and executes the process in accordance with the read setting information. The processes to be executed by the process execution portion 59 include a scanning process of controlling the automatic document feeder 120 and the document scanning unit 130 to scan a document, an image forming process of controlling the image forming unit 140 and the paper feed unit 150 to form an image on the paper, a data management process that includes a process of controlling the HDD 113 to write data in the HDD 113 and a process of controlling the HDD 113 to read out data stored in the HDD 113, a data transmission process of controlling the communication I/F unit 160 to transmit data, or a combination of more than 1 of these processes. In the case where receiving the execution instruction command from the remote operation receiving portion 61 with the operation mode being switched to the power saving mode by the sleep transition portion 51, the operation mode is switched to the driving mode by the recovery portion 55, so that the process execution portion 59 can execute a process of controlling the automatic document feeder 120, the document scanning unit 130, the image forming unit 140, the paper feed unit 150, and the HDD 113.

FIG. 7 is a block diagram showing one example of an outline of functions of a CPU included in the HMD. Functions shown in FIG. 7 are the functions that are formed in the CPU 201 by execution of a remote operation program stored in the flash memory 203 by the CPU 201 included in the HMD 200. Referring to FIG. 7, the CPU 201 includes a remote operation portion 251 that remotely operates the MFP 100, a display control portion 253, an operation detection portion 255, a capture control portion 257 that controls the camera 202, and an operation determination portion 259.

The remote operation portion 251 controls the short-range communication portion 207. When the short-range communication portion 207 becomes communicable with the MFP 100, the remote operation portion 251 performs setting for communicating with the MFP 100 via the wireless LAN I/F 205 by negotiating with the MFP 100, and controls the wireless LAN I/F 205 to establish a communication path with the MFP 100. The remote operation portion 251 may control the short-range communication portion 207 or the wireless LAN I/F 205 to establish the communication path with the MFP 100.

The remote operation portion 251 includes a remote operation screen receiving portion 261 and a remote operation transmitting portion 263. The remote operation screen receiving portion 261 controls the wireless LAN I/F 205 to receive a remote operation screen from the MFP 100. The remote operation screen receiving portion 261 outputs the received remote operation screen to the display control portion 253, and outputs the remote operation screen to the operation detection portion 255. In response to input of the remote operation screen, the display control portion 253 controls the display unit 204 to display an image of the remote operation screen to the display unit 204.

The operation detection portion 255 controls the operation unit 206, detects a remote operation, which the user inputs in the operation unit 206, produces a remote operation command corresponding to the detected remote operation, and outputs the produced remote operation command to the remote operation transmitting portion 263. In the case where detecting a setting operation as the remote operation, the operation detection portion 255 produces a setting instruction command to give an instruction to set setting information that defines a value corresponding to the setting item. In the case where detecting a screen transition operation as the remote operation, the operation detection portion 255 produces a screen transition command including screen identification information. In the case where detecting an execution instruction operation as the remote operation, the operation detection portion 255 produces an execution instruction command that includes process identification information. In the case where detecting a remote operation to designate a position in the remote operation screen, the operation detection portion 255 produces a remote operation command that includes position information indicating a position designated in the remote operation screen.

In the case where a position in the remote operation screen displayed in the display unit 204 is detected by a sight line detection sensor, the operation detection portion 255 detects a remote operation designating a position in the remote operation screen. Further, the operation detection portion 255 detects a remote operation from the remote operation screen displayed in the display unit 204 and the position specified by the sight line detection sensor of the operation unit 206. For example, in the case where a position within a transition button included in the remote operation screen is detected by the sight line detection sensor, the operation detection portion 255 detects a screen transition operation. Further, in the case where a position within a region assigned to a command to set the setting information included in the remote operation screen is detected by the sight line detection sensor in the remote operation screen displayed in the display unit 204, the operation detection portion 255 detects a setting operation. In the case where a position within a region of a button assigned to an execution command included in the remote operation screen is detected in the remote operation screen displayed in the display unit 204, the operation detection portion 255 detects an execution instruction operation.

Further, the operation detection portion 255 detects an operation by the user by collecting voice produced by the user with the microphone of the operation unit 206 and identifying the collected voice. For example, if names respectively corresponding to a plurality of operations are defined, in the case where the name corresponding to any of the plurality of operations is present in character information acquired by identification of the voice, the operation detection portion 255 detects a remote operation corresponding to the name. Further, the operation detection portion 255 detects the character information acquired by the voice recognition as setting information. For example, in the case where the name "the number of copies" is defined with respect to a setting operation of setting the number of copies, if a character string of "set the number of copies to 5" is recognized by the voice recognition, the operation detection portion 255 detects a setting operation of giving an instruction to set the setting information corresponding to the setting information "5" in the setting item for setting of the number of copies.

The capture control portion 257 controls the camera 202, and acquires image data that is output by the camera 202 capturing a subject. The capture control portion 257 outputs the image data output by the camera 202 to the operation determination portion 259.

The operation determination portion 259 determines an operation by the user based on the image data input from the capture control portion 257. More specifically, the operation determination portion 259 detects an operation by the user based on a change of a shape of the MFP 100. The operation determination portion 259 produces a remote operation command corresponding to the determined operation, and outputs the produced remote operation command to the remote operation transmitting portion 263.

The operations determined by the operation determination portion 259 include a configuration changing operation and a process execution condition setting operation. The configuration changing operation is an operation of setting setting information that defines a hardware resource constituting the MFP 100. The setting information that defines the hardware resource constituting the MFP 100 includes setting information that defines a size of paper stored in the paper feed tray included in the paper feed unit 150 and setting information that defines whether an option device is attached, for example.

The process execution condition setting operation is an operation other than the configuration changing operation and an operation of setting the setting information that defines an executable process by the MFP 100. The process execution condition setting operation includes an operation of selecting one of the setting information set by the configuration changing operation and an operation of setting the setting information that defines a process to be executed by the MFP 100. The operation of selecting one of the setting information set by the configuration changing operation includes an operation of selecting one size for the document from a plurality of sizes for the document that can be read by the MFP 100, and an operation of selecting one size from a plurality of sizes for the paper stored in the paper feed unit 150, for example. Further, the operation of setting the setting information that defines a process to be executed by the MFP 100 includes an operation of defining the number of copies of the image to be formed.

The operation determined by the operation determination portion 259 is the same as the operation detected by the operation detection portion 255. In other words, the operation determined by the operation determination portion 259 is an operation of setting the setting information that is the same as the setting information set by an operation of inputting in accordance with the remote operation screen by the user.

For example, when the paper feed tray included in the paper feed unit 150 of the MFP 100 is opened, the shape of the MFP 100 is changed. The operation determination portion 259 determines the configuration changing operation of defining a size of the paper stored in the paper feed tray by detecting the shape of the MFP 100 with the paper feed tray being open. More specifically, the operation determination portion 259 analyses image data, specifies a paper feed tray included in the paper feed unit 150 from the change of the shape of the MFP 100, and further detects a size of the paper stored in the paper feed tray from the change of the shape of the inside of the paper feed unit 150. In the case where the paper feed unit 150 includes a plurality of paper feed trays, the operation determination portion 259 specifies a paper feed tray of which a state is changed to a state of being opened by the user among the plurality of paper feed trays. Further, the operation determination portion 259 detects the change of the size of the stored paper based on the change of the shape of the inside of the paper feed tray. Further, the operation determination portion 259 analyses the image data after the shape of the inside of the paper feed tray is changed, and specifies the size of the paper on the basis of the size of the paper feed tray. In the case where determining the configuration changing operation of defining the size of the paper stored in the paper feed tray, the operation determination portion 259 produces a setting instruction command that gives an instruction to set the setting information corresponding to the specified size of the paper in the setting item that defines the size of the paper stored in the specified paper feed tray, and outputs the setting instruction command to the remote operation transmitting portion 263.

Further, when an option device is added to the MFP 100, the shape of the MFP 100 is changed. The operation determination portion 259 determines the configuration changing operation of defining the addition of the option device by detecting the shape of the MFP 100 with the option device being added. The option device is attachable to and removable from the MFP 100 and, for example, a paper inverting unit that inverts the front and the back of the paper supplied from the paper feed unit 150 in order to form images on both sides of the paper by the image forming unit 140. Specifically, the operation determination portion 259 analyzes the image data. In the case where the shape of the MFP 100 is changed to a shape in which the paper inverting unit is attached to a position to which the paper inverting paper is attached, the operation determination portion 259 determines the configuration changing operation of defining the addition of the option device. In the case where determining the configuration changing operation of defining the addition of the option device, the operation determination portion 259 produces a setting instruction command that gives an instruction to set the setting information corresponding to a value indicating presence of the paper inverting unit in the setting item indicating the presence of the paper inverting unit, and outputs the setting instruction command to the remote operation transmitting portion 263.

Further, when a document is placed on the automatic document feeder 120 by the user, the shape of the MFP 100 is changed. The operation determination portion 259 determines a process execution condition setting operation of defining a size and an orientation of the document by detecting the shape of the MFP 100 with the document being placed on the automatic document feeder 120. The operation determination portion 259 specifies the size of the document on the basis of the size of the automatic document feeder 120, and specifies the orientation of the document from the specified size. In the case where determining the process execution condition setting operation of defining the size and the orientation of the document, the operation determination portion 259 produces a setting instruction command that gives an instruction to set the setting information corresponding to the size and orientation of the document specified from the image data in the setting item indicating the size and the orientation of the document, and outputs the setting instruction command to the remote operation transmitting portion 263.

In response to input of a remote operation command from the operation detection portion 255, the remote operation transmitting portion 263 controls the wireless LAN I/F 205 to transmit the remote operation command to the MFP 100. Further, in response to input of a remote operation command from the operation determination portion 259, the remote operation transmitting portion 263 controls the wireless LAN I/F 205 to transmit the remote operation command to the MFP 100.

Figure 8:
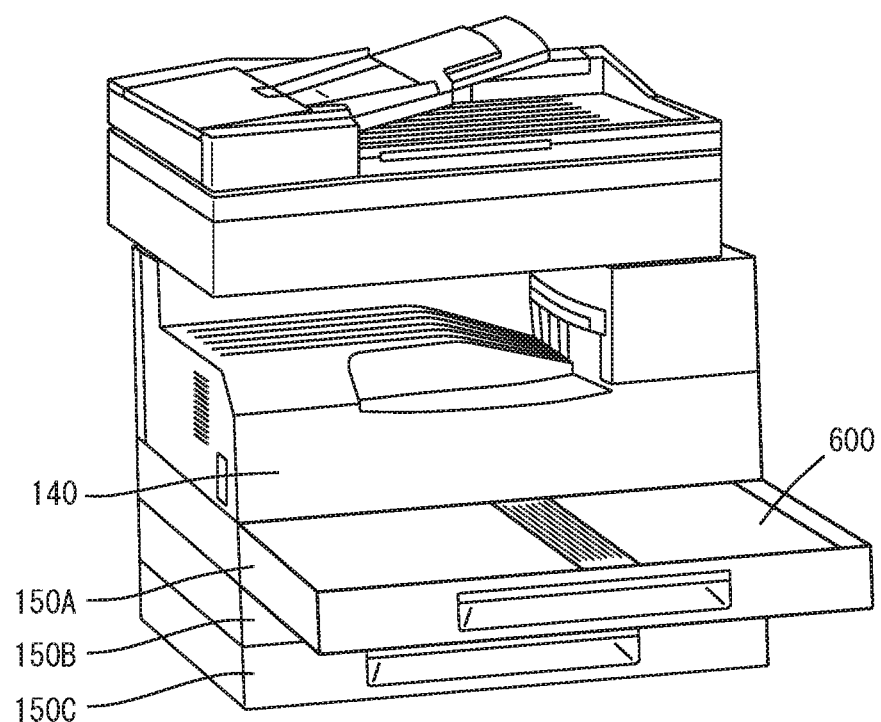
FIG. 8 is a diagram showing one example of an appearance of the MFP with a paper feed tray being open.

FIG. 8 is a diagram showing one example of an appearance of the MFP with the paper feed tray being open. Referring to FIG. 8, the paper feed unit 150 included in the MFP 100 has 3 paper feed trays 150A to 150C, and the top paper feed tray 150A being drawn forward is shown. Thus, the paper feed tray 150A being drawn forward can be detected from an image capturing the appearance of the MFP 100, and the paper feed tray 150A being drawn forward can be specified.

Figure 9:
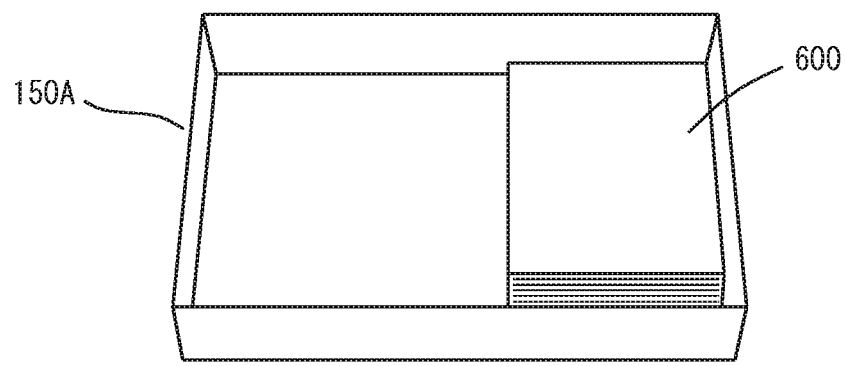
FIG. 9 is a diagram schematically showing one example of an image capturing inside of the paper feed tray.

FIG. 9 is a diagram schematically showing one example of an image capturing inside of the paper feed tray. Referring to FIG. 9, paper 600 is stored in the paper feed tray 150A. A size of the paper 600 can be found on the basis of the size of the paper feed tray 150A in a lateral direction. The size of the paper stored in the paper feed tray 150A can be specified from the image capturing the appearance of the MFP 100.

Figure 10:
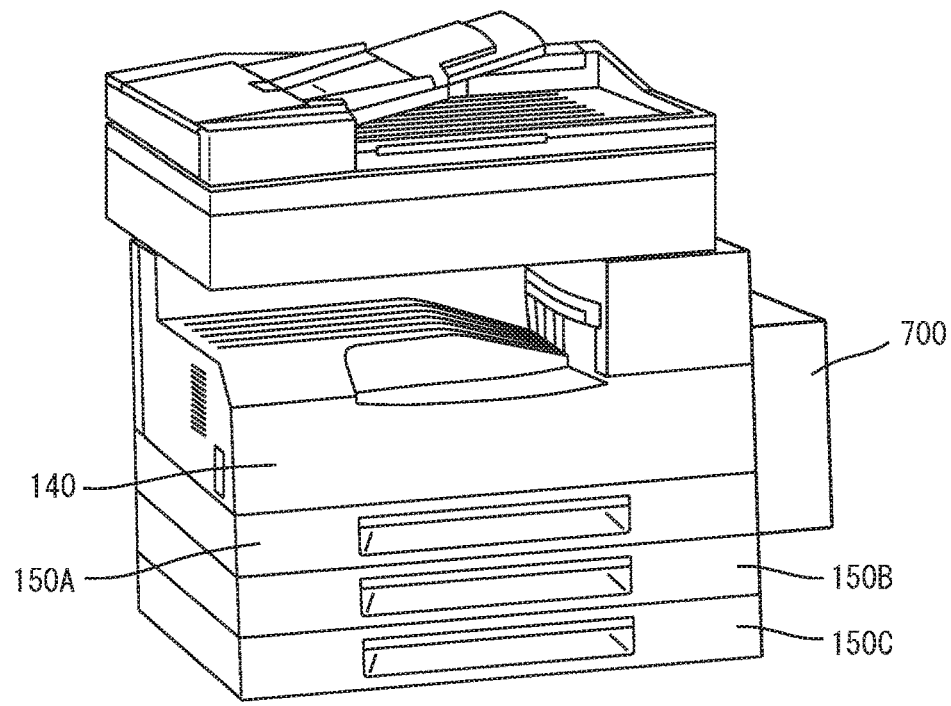
FIG. 10 is a diagram showing one example of an appearance of the MFP with a paper inverting unit being attached.

FIG. 10 is a diagram showing one example of an appearance of the MFP with the paper inverting unit being attached. Referring to FIG. 10, the paper inverting unit 700 is attached to a side surface of the MFP 100. A position to which the paper inverting unit 700 is attached is determined to be in the vicinity of the image forming unit 140 in advance. Presence or absence of the attachment of the paper inverting unit 700 can be determined from the image capturing the appearance of the MFP 100.

Figure 11:
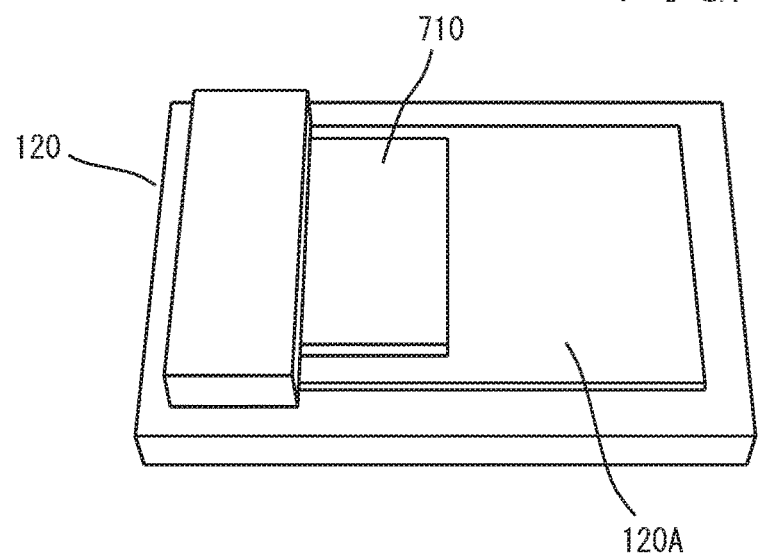
FIG. 11 is a diagram schematically showing a document being placed on an automatic document feeder.

FIG. 11 is a diagram schematically showing a document being placed on the automatic document feeder. Referring to FIG. 11, the document 710 is placed on a document tray 120A of the automatic document feeder 120. It can be determined from an image capturing the appearance of the MFP 100 that the document 710 is placed on the automatic document feeder 120. Further, the size of the document 710 can be detected on the basis of the size of the automatic document feeder 120, and an orientation of the document 710 can be detected from the detected size.

Figure 12:
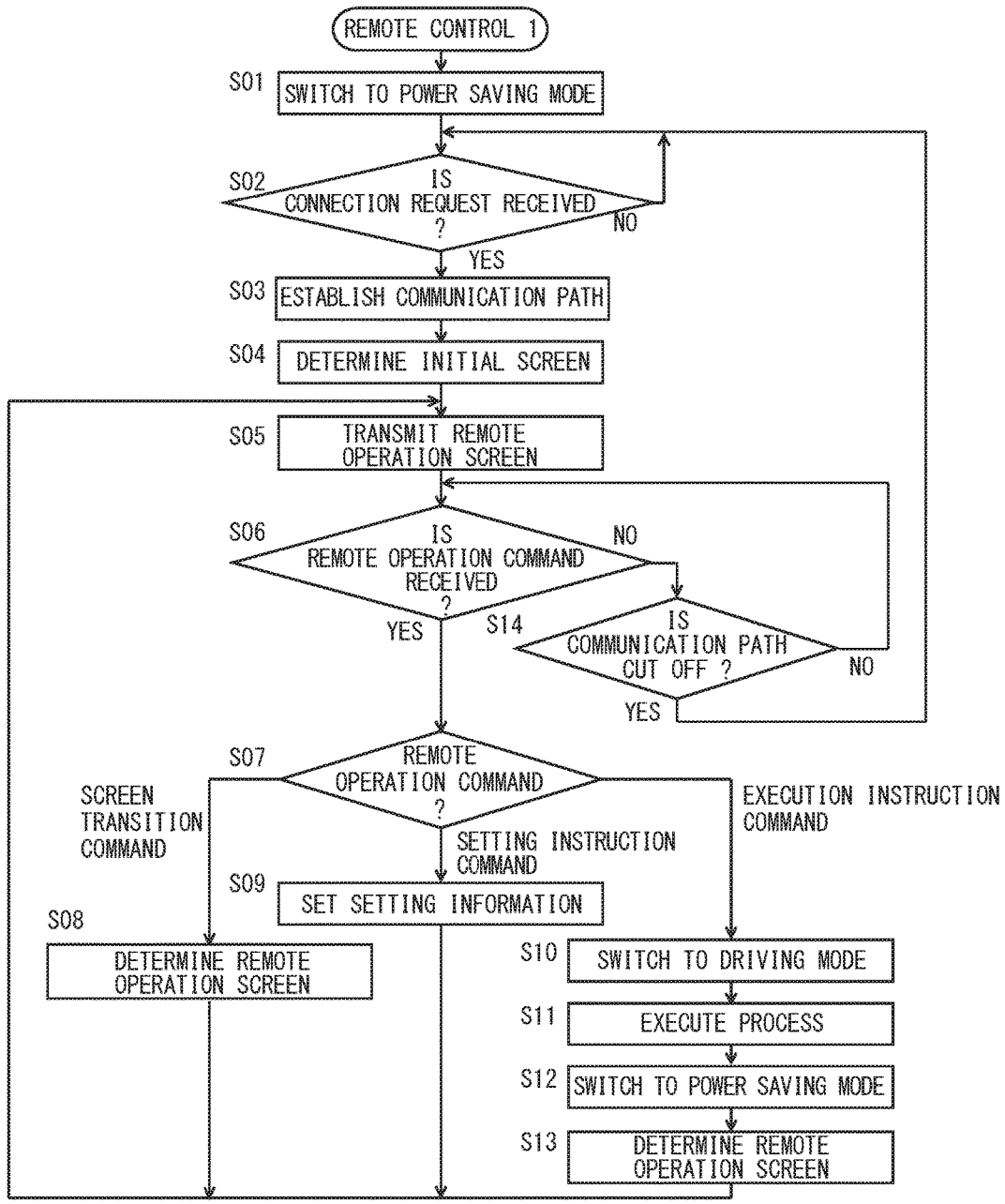
FIG. 12 is a flow chart showing one example of a flow of a remote control process in the first embodiment.

FIG. 12 is a flow chart showing one example of a flow of a remote control process in the first embodiment. The remote control process in the first embodiment is a process executed by execution of a remote control program in the first embodiment stored in the ROM 12, the HDD 13 or the CD-ROM 190A by the CPU 11 included in the MFP 100 in the first embodiment. Referring to FIG. 12, when being activated, the CPU 11 switches the operation mode to the power saving mode (step S01). Specifically, the CPU 11 shuts off the power supplied to the automatic document feeder 120, the document scanning unit 130, the image forming unit 140, the paper feed unit 150, and the HDD 113. Then, the CPU 11 determines whether a connection request has been received (step S02). The process waits until the connection request is received (NO in the step S02). When the connection request is received (YES in the step S02), the process proceeds to the step S03. When the short-range communication unit 180 becomes communicable with the HMD 200, the short-range communication unit 180 receives a connection request from the HMD 200. In the step S03, the CPU 11 controls the communication I/F unit 160 to establish a communication path with the HMD 200, and the process proceeds to the step S04.

In the step S04, the CPU 11 determines an initial screen of the remote operation screen to be transmitted to the HMD 200. In the next step S05, the CPU 11 controls the communication I/F unit 160 to transmit the remote operation screen via the communication path established in the step S03.

In the step S06, the CPU 11 determines whether a remote operation command has been received from the HMD 200. If the communication I/F unit 160 has received the remote operation command via the communication path established in the step S03, the process proceeds to the step S07. If not, the process proceeds to the process S14. In the step S14, the CPU 11 determines whether the communication path established in the step S03 has been cut off. If the communication path has been cut off, the process returns to the step S02. If not, the process returns to the step S06.

In the step S07, the process branches depending on a type of the received remote operation command. If the remote operation command is a screen transition command, the process proceeds to the step S8. If the remote operation command is a setting instruction command, the process proceeds to the step S09. If the remote operation command is an execution instruction command, the process proceeds to the step S10. In the step S08, the CPU 11 determines a remote operation screen that is defined by the screen transition command, and the process returns to the step S05. In the step S05, in the case where the process proceeds from the step S08, the CPU 11 transmits the remote operation screen determined in the step S08 to the HMD 200.

In the step S09, the CPU 11 sets setting information in accordance with the setting instruction command, and the process returns to the step S05. Specifically, the setting information stored in the RAM 13 is updated by the setting information defined by the setting instruction command. In the step S05, in the case where the process proceeds from the step S09, the CPU 11 transmits a remote operation screen, which is the same as the previously transmitted remote operation screen and in which the setting information has been set, to the HMD 200.

In the step S10, the CPU 11 switches the operation mode to the driving mode, and the process proceeds to the step S11. The CPU 11 supplies the power to the automatic document feeder 120, the document scanning unit 130, the image forming unit 140, the paper feed unit 150, and the HDD 113. Then, the CPU 11 executes a process defined by the execution instruction command in accordance with the setting information stored in the RAM 13 (step S11), and the process proceeds to the step S12.

In the step S12, similarly to the step S01, the CPU 11 switches the operation mode to the power saving mode, and the process proceeds to the step S13. In the step S13, the CPU 11 determines a remote operation screen, and the process returns to the step S05. For example, the CPU 11 determines a remote operation screen including a result of the execution of the process. In the step S05, in the case where the process proceeds from the step S13, the CPU 11 transmits the remote operation screen determined in the step S13 to the HMD 200.

Figure 13:
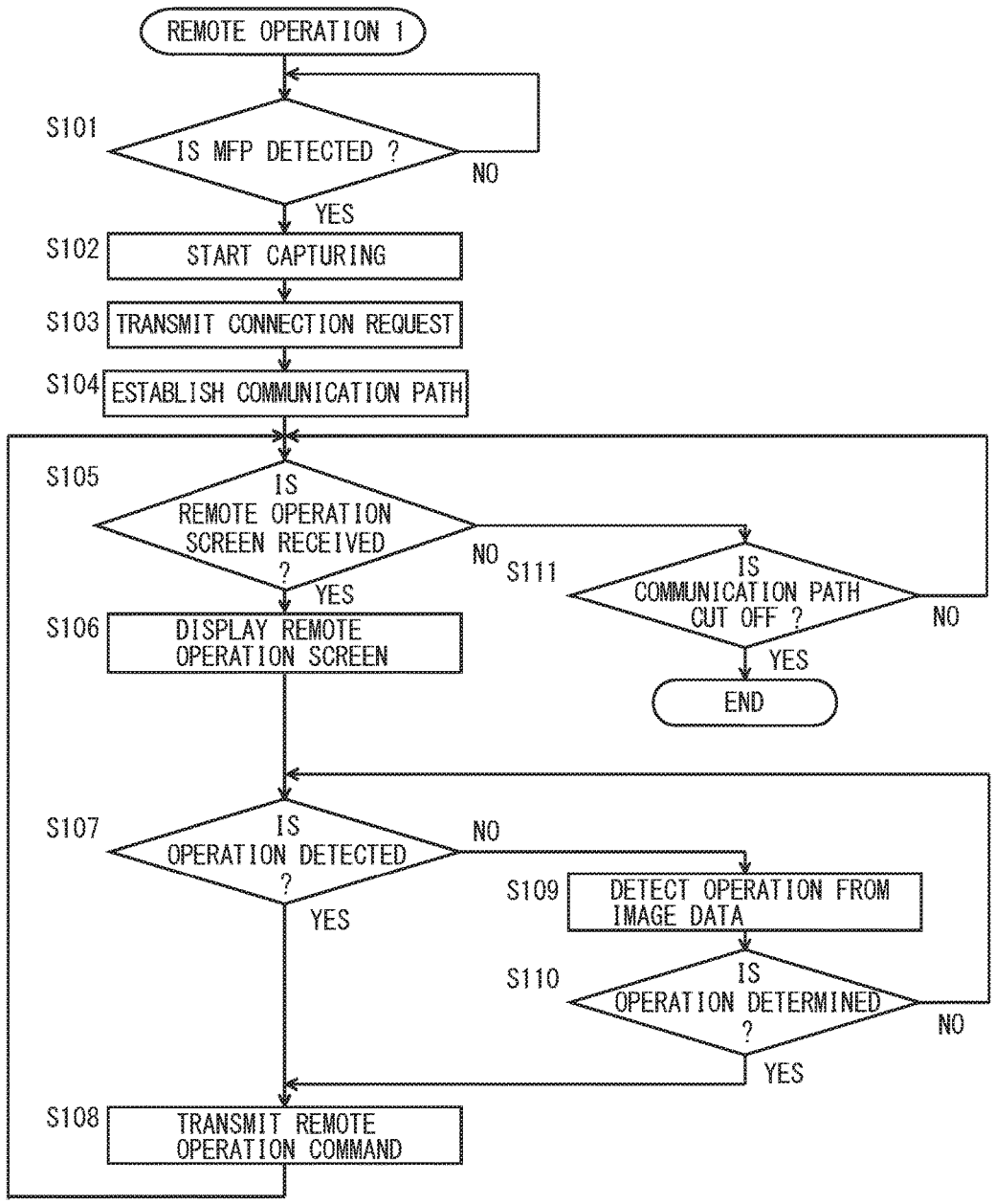
FIG. 13 is a flow chart showing one example of the flow of the remote operation process in the first embodiment.

FIG. 13 is a flow chart showing one example of a flow of a remote operation process in the first embodiment. The remote operation process in the first embodiment is a process executed by execution of a remote operation program in the first embodiment stored in the flash memory 203 by the CPU 201 included in the HMD 200. Referring to FIG. 13, the CPU 201 determines whether a remote control apparatus has been detected (step S101). Here, a case where the MFP 100 is detected as the remote control apparatus is described as an example. When the short-range communication unit 207 becomes communicable with the MFP 100, the CPU 201 detects the MFP 100. The process waits until the MFP 100 is detected. If the MFP 100 has been detected, the process proceeds to the step S102.

In the step S102, the CPU 201 activates the camera 202 to start capturing. Then, the CPU 201 controls the short-range communication unit 207 to transmit a connection request to the MFP 100 (step S103). In the next step S104, the CPU 201 controls the wireless LAN I/F 205 to establish a communication path with the MFP 100.

In the next step S105, the CPU 201 determines whether a remote operation screen has been received from the MFP 100. The CPU 201 determines whether the wireless LAN I/F 205 has received a remote operation screen via the communication path established in the step S104. If the remote operation screen has been received, the process proceeds to the step S106. If not, the process proceeds to the step S111. In the step S111, the CPU 201 determines whether the communication path established in the step S104 has been cut off. If the communication path has been cut off, the process ends. If not, the process returns to the step S105. The cases include the case where the communication path is cut off by an instruction by the user of the HMD 200, the case where the communication path is cut off by the MFP 100, and the case where the communication path is cut off by communication noise.

In the step S106, the CPU 201 displays the remote operation screen received in the step S105 in the display unit 204, and the process proceeds to the step S107. In the step S107, the CPU 201 determines whether an operation has been detected. The operation referred to here is an operation of inputting in the operation unit 206 by the user. For example, in the case where a position in the remote operation screen displayed in the display unit 204 in the step S106 is detected by the sight line detection sensor of the operation unit 206, the CPU 201 detects an operation based on the remote operation screen and the detected position. Further, the CPU 201 detects an operation by collecting voice produced by the user with the microphone of the operation unit 206 and identifying the collected voice. If the operation has been detected, the process proceeds to the step S108. If not, the process proceeds to the step S109.

In the step S109, the CPU 201 detects an operation of the user based on image data that is output by the camera 202. In the next step S110, the CPU 201 determines the operation by the user from the detected operation. In the case where the CPU 201 determines the operation by the user, the process proceeds to the step S108. If not, the process returns to the step S107. For example, in the case where detecting an operation of opening and closing the paper feed tray included in the paper feed unit 150 by the user, the CPU 201 determines a setting operation of setting setting information indicating the size of the paper in a setting item that defines the size of the paper stored in the paper feed tray. In the case where analyzing the image data and specifying the paper feed tray and the size of the paper, the CPU 201 determines a setting operation of setting the specified size of the paper in the setting item that defines the size of the paper stored in the specified paper feed tray. In the case where detecting an operation of adding an option device, the CPU 201 determines a setting operation of setting setting information that indicates presence of the option device in a setting item indicating the presence of the option device. The option device is a paper inverting unit, for example. Further, in the case where detecting an operation of placing a document on the automatic document feeder 120 by the user, the CPU 201 determines a setting operation of setting setting information that indicates placement of the document in a setting item that indicates the placement of the document.

In the step S108, the CPU 201 transmits a remote operation command to the MFP 100, and the process returns to the step S105. In the case where the process proceeds from the step S107, the CPU 201 produces a remote operation command corresponding to the operation detected in the step S107, and controls the wireless LAN I/F 205 to transmit the produced remote operation command via the communication path established in the step S104. In the case where the process proceeds from the step S110, the CPU 201 produces a remote operation command corresponding to the operation determined in the step S110, and controls the wireless LAN I/F 205 to transmit the produced remote operation command via the communication path established in the step S104.

<First Modified Example of Main Substrate>

Figure 14:
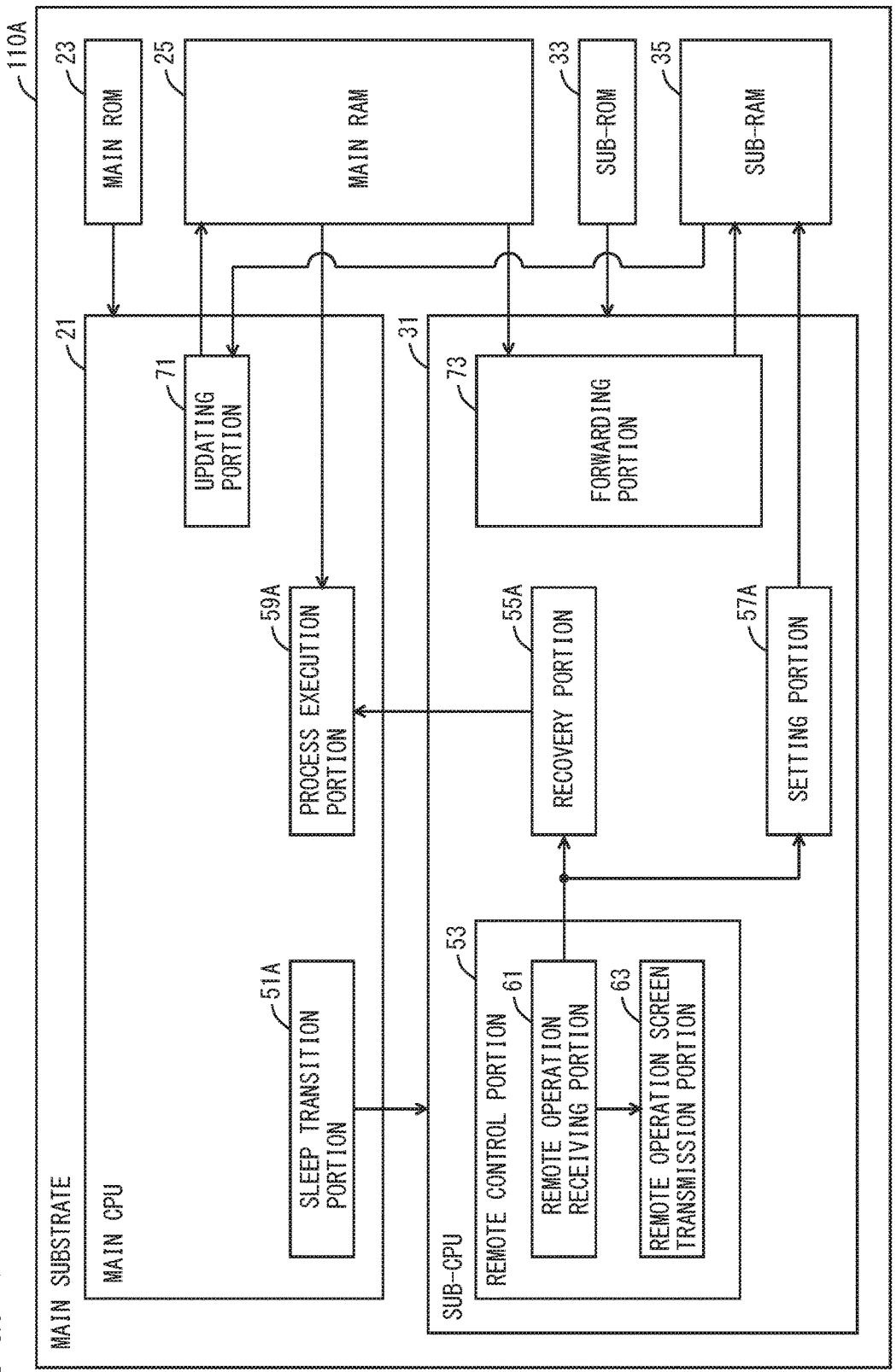
FIG. 14 is a block diagram showing one example of configurations of a main substrate in a modified example of the first embodiment.

FIG. 14 is a block diagram showing one example of configurations of the main substrate in the modified example of the first embodiment. Referring to FIG. 14, the main substrate 110A in the modified example of the first embodiment includes a main CPU 21 that controls the entire MFP 100, a main ROM 23 that stores a program to be executed by the main CPU 21 and data and the like required for the execution of the program, a RAM 25 that is used as a work area of the main CPU 21, a sub-CPU 31, a sub-ROM 33 that stores a program to be executed by the sub-CPU 31 and data and the like required for the execution of the program, and a sub-RAM 35 that is used as a work area of the sub-CPU 31.

The power consumption of the sub-CPU 31 is smaller than the main CPU 21. The power consumption of the sub-RAM 35 is smaller than the main RAM 25. The main CPU 21 and the main RAM 25 operate when the operation mode is the driving mode, and do not operate when the operation mode is the power saving mode. The sub-CPU 31 and the sub-RAM 35 operate when the operation mode is the power saving mode, and do not operate when the operation mode is the driving mode.

The main CPU 21 includes a sleep transition portion 51A, a process execution portion 59A, and an updating portion 71. The sub-CPU 31 includes a remote control portion 53, a recovery portion 55A, a setting portion 57A, and a forwarding portion 73.

The main CPU 21 forms the sleep transition portion 51A, the process execution portion 59A, and the updating portion 71 by executing a main part of the remote control program. The sub-CPU 31 forms the remote control portion 53, the recovery portion 55A, the setting portion 57A, and the forwarding portion 73 by executing a sub-part of the remote control program.

When a communication path established between the communication I/F unit 160 and the HMD 200 that is the remote operation device is cut off, the sleep transition portion 51A included in the main CPU 21 switches the operation mode from the driving mode to the power saving mode. During a period in which a communication path is not established between the communication I/F unit 160 and the HMD 200 that is the remote operation device, the operation mode is the power saving mode. Specifically, when the communication path established between the communication I/F unit 160 and the HMD 200 that is the remote operation device is cut off, the sleep transition portion 51A stops after activation of the sub-CPU 31. Specifically, the sleep transition portion 51A shuts off the power supplied to the main CPU 21.

When being activated by the main CPU 21, the sub-CPU 31 loads the sub-part of the remote control program stored in the sub-ROM 33 into the sub-RAM 35 for execution. When the sub-CPU 31 is activated, the forwarding portion 73 included in the sub-CPU 31 reads out setting information stored in the main RAM 25, and stores the setting information in the sub-RAM 35.

The remote control portion 53 included in the sub-CPU 31 is the same as the remote control portion 53 shown in FIG. 6. A description thereof is therefore not repeated. In the case where a setting instruction command is input from the remote operation receiving portion 61, the setting portion 57A updates setting information corresponding to a setting item defined by the setting instruction command among setting information stored in the sub-RAM 35 by the setting information defined by the setting command.

In response to input of the execution instruction command from the remote operation receiving portion 61, the recovery portion 55A switches the operation mode to the driving mode. Specifically, the recovery portion 55A supplies the power to the automatic document feeder 120, the document scanning unit 130, the image forming unit 140, the paper feed unit 150, and the HDD 113, and activates the main CPU 21. The recovery portion 55A shuts off the power supplied to the sub-CPU 31 after the execution instruction command is output to the main CPU 21 after the activation of the main CPU 21.

When being activated by the sub-CPU 31, the main CPU 21 loads the main part of the remote control program stored in the main ROM 23 into the main RAM 25 for execution. When the main CPU 21 is activated, the updating portion 71 included in the main CPU 21 reads out the setting information stored in the sub-RAM 35, and stores the setting information in the main RAM 25.

In response to input of an execution instruction command from the sub-CPU 31, the process execution portion 59A included in the main CPU 21 executes a process defined by the execution instruction command in accordance with the setting information stored in the main RAM 25.

Figure 15:
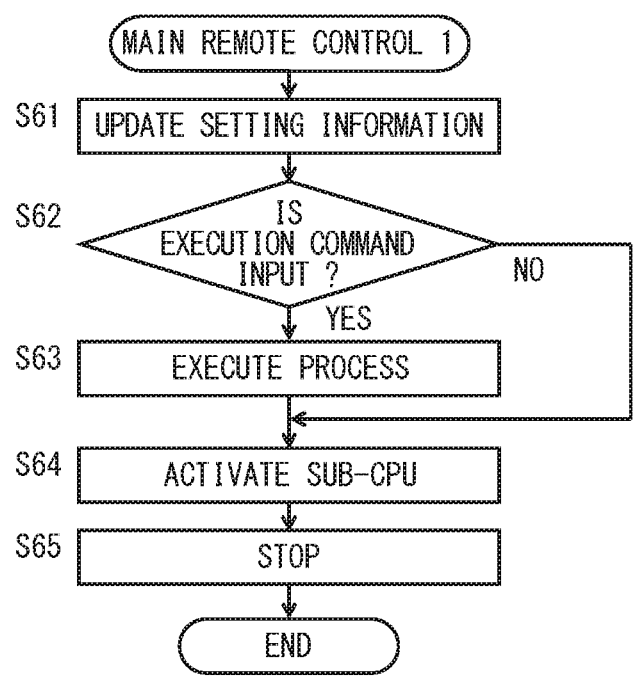
FIG. 15 is a flow chart showing one example of a flow of a main remote control process in the modified example of the first embodiment.

FIG. 15 is a flow chart showing one example of a flow of a main remote control process in the modified example of the first embodiment. The main remote control process in the modified example of the first embodiment is a process executed by execution of a main part of a remote control program in the modified example of the first embodiment stored in the main ROM 25, the HDD 113 or the CD-ROM 190A by the main CPU 21 included in the main substrate 110A in the modified example of the first embodiment.

Referring to FIG. 15, when being activated, the main CPU 21 updates setting information (step S61). Specifically, the main CPU 21 reads out setting information stored in the sub-RAM 35, and stores the setting information in the main RAM. Thereafter, the main CPU 21 shuts off the power supplied to the sub-RAM 35.

In the next step S62, the main CPU 21 determines whether an execution command has been input from the sub-CPU 31. If the execution command has been input, the process proceeds to the step S63. If not, the process proceeds to the step S64. In the step S63, the main CPU 21 executes a process specified by the execution command in accordance with the setting information stored in the main RAM 25, and the process proceeds to the step S64.

In the step S64, the main CPU 21 activates the sub-CPU 31, and the process proceeds to the step S65. Specifically, the main CPU 21 supplies the power to the sub-CPU 31 and the sub-RAM 35, and resets the sub-CPU 31. In the step S65, the CPU 21 stops, and ends the process. Specifically, the main CPU 21 shuts off the power supplied to the automatic document feeder 120, the document scanning unit 130, the image forming unit 140, the paper feed unit 150, and the HDD 113, and shuts off the power supplied to the main CPU 21.

Figure 16:
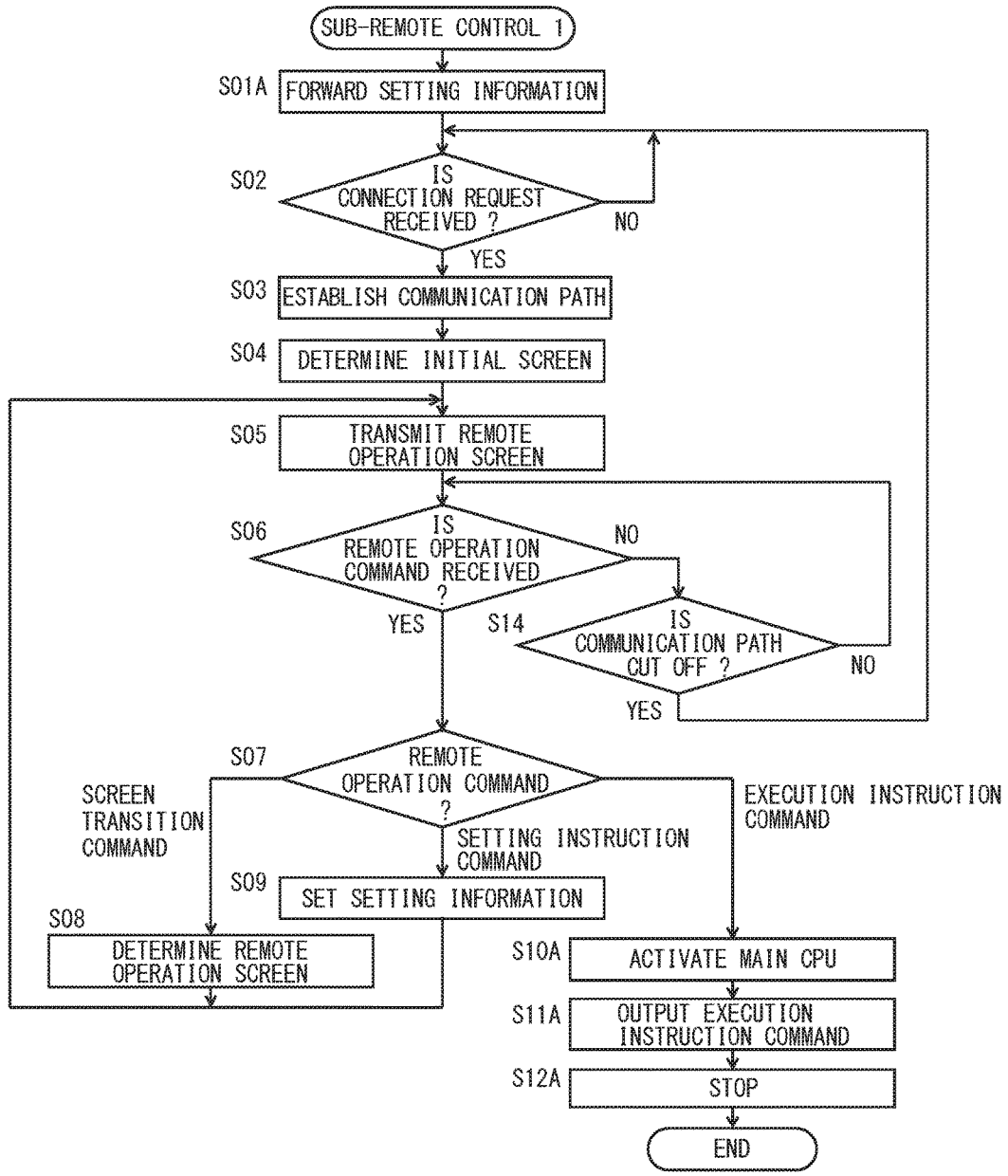
FIG. 16 is a flow chart showing one example of a flow of a sub-remote control process in the modified example of the first embodiment.

FIG. 16 is a flow chart showing one example of a flow of a sub-remote control process in the modified example of the first embodiment. The sub-remote control process in the modified example of the first embodiment is a process executed by execution of a sub-part of a remote control program in the modified example of the first embodiment stored in the sub-ROM 35, the HDD 113 or the CD-ROM 190A by the sub-CPU 31 included in the main substrate 110A in the modified example of the first embodiment.

Referring to FIG. 16, differences of the sub-remote control process from the remote control process shown in FIG. 12 lie in that the step S01 is changed to the step S01A, and that the steps S10 to S13 are changed to the steps S10A to S12A. Other processes are the same as the processes shown in FIG. 12. A description thereof is therefore not repeated. When being activated, the sub-CPU 31 forwards setting information (step S01A). Specifically, the sub-CPU 31 reads out the setting information stored in the main RAM 25, and stores the setting information in the sub-RAM 35. Thereafter, the sub-CPU 31 shuts off the power supplied to the main RAM 25.

The case where the process proceeds to the step S10A is the case where a remote operation command of an execution instruction command is received from the HMD 200 in the step S07. In the step S10A, the sub-CPU 31 activates the main CPU 21, and the process proceeds to the step S11A. Specifically, the sub-CPU 31 supplies the power to the main CPU 21 and the main RAM 25, and resets the main-CPU 31. In the next step S11A, the sub-CPU 31 outputs an execution instruction command to the main CPU 21, and the process proceeds to the step S12A. In the step S12A, the sub-CPU 31 stops, and ends the process. Specifically, the sub-CPU 31 supplies the power to the automatic document feeder 120, the document scanning unit 130, the image forming unit 140, the paper feed unit 150, and the HDD 113, and shuts off the power supplied to the sub-CPU 31.

Here, in the case where the operation mode is switched from the driving mode to the power saving mode, the forwarding portion 73 stores setting information stored in the main RAM 25 in the sub-RAM 35. In the case where the operation mode is switched from the power saving mode to the driving mode, the updating portion 71 stores setting information stored in the sub-RAM 35 in the main RAM 25. In contrast, in the case where the operation mode is switched from the driving mode to the power saving mode, the power supply of the main CPU 21 may be shut off after the updating portion 71 stores the setting information stored in the main RAM 25 in the sub-RAM 35. In the case where the operation mode is switched from the power saving mode to the driving mode, the power supply of the sub-CPU 31 may be shut off after the forwarding portion 73 stores the setting information stored in the sub-RAM 35 in the main RAM 25.

As described above, the MFP 100 in the first embodiment switches the operation mode from the driving mode to the power saving mode, and maintains the operation mode in the power saving mode until receiving a remote operation command corresponding to an execution instruction operation from the HMD 200 that is the remote operation device. Only in the case where receiving the remote operation command corresponding to the execution instruction operation, the MFP 100 switches the operation mode to the driving mode. Further, during the power saving mode, when receiving a setting instruction command that is a remote operation command corresponding to a setting instruction operation from the HMD 200, the MFP 100 sets setting information in accordance with the setting instruction command. In the case where receiving a remote operation command corresponding to an execution instruction operation from the HMD 200, the MFP 100 executes a process in accordance with the set setting information. Therefore, the MFP 100 maintains the operation mode in the power saving mode until receiving the remote operation command corresponding to the execution instruction operation, so that the MFP 100 can set the setting information in accordance with the remote operation command received from the remote operation device while still being in the power saving mode. As a result, the MFP 100 can stay in the power saving mode as much as possible, and the power consumption can be reduced.

The HMD 200, which functions as the remote operation device, determines an operation by the user based on an image acquired by the camera 202 capturing a subject, and transmits a remote operation command corresponding to the determined operation to the image forming apparatus. Therefore, the HMD 200 detects an operation from an image capturing the MFP 100 as a subject, so that an operation directed to the MFP 100 can be detected externally of the MFP 100, and the MFP 100 can be maintained in the power saving mode.

Further, the HMD 200 detects an operation based on a change of the shape of the MFP 100, thereby being capable of easily detecting an operation directed to the MFP 100.

Further, in the case where the operation mode is the driving mode, the main CPU 21 and the main RAM 25 operate in the main substrate 110A in the modified example of the first embodiment. In the case where the operation mode is the power saving mode, the sub-CPU 31 and the sub-RAM 35 operate in the main substrate 110A in the modified example of the first embodiment. Therefore, in the case where the operation mode is the driving mode, the power may be supplied to the main CPU 21 and the main RAM 25. In the case where the operation mode is the power saving mode, the power may be supplied to the sub-CPU 31 and the sub-RAM 35. Therefore, power consumption in the power saving mode can be reduced.

In the first embodiment, the MFP 100 is described as one example of the image forming apparatus. However, a printer may be the image forming apparatus. In this case, a process that is executed by the process execution portion 59 is an image forming process, and an execution instruction operation is an operation of giving an instruction to execute the image forming process to the printer.

<Second Embodiment>

An image forming system 1 in the second embodiment allows the server 300 to have part of the functions of the MFP 100 in the first embodiment. Hardware configurations of the HMD 200 in the second embodiment are the same as the hardware configurations shown in FIG. 2. An appearance and hardware configurations of the MFP in the second embodiment are the same as the appearance and the hardware configurations of the MFP in the first embodiment as shown in FIGS. 3 and 4. A description thereof is therefore not repeated.

Figure 17:
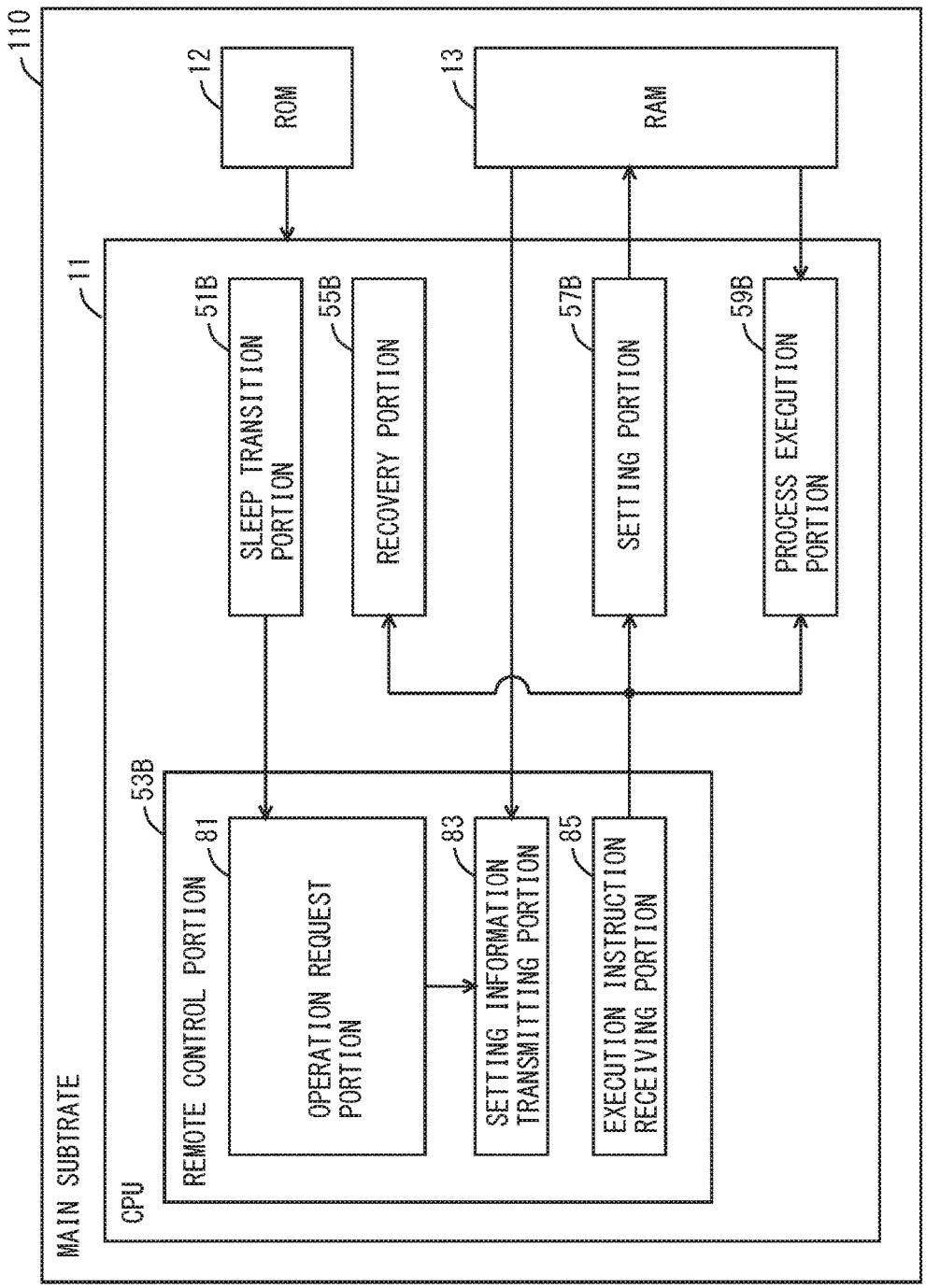
FIG. 17 is a block diagram showing one example of configurations of the main substrate included in the MFP in a second embodiment.

FIG. 17 is a block diagram showing one example of configurations of the main substrate included in the MFP in the second embodiment. Referring to FIG. 17, a difference of the main substrate included in the MFP in the second embodiment from the main substrate 110 included in the MFP 100 in the first embodiment lies in the function of the CPU 11. The CPU 11 includes a sleep transition portion 51B, a remote control portion 53B, a recovery portion 55B, a setting portion 57B and a process execution portion 59B.

When a process executed by the process execution portion 59B ends, the sleep transition portion 51B switches the operation mode from the driving mode to the power saving mode, and outputs a request instruction to the remote control portion 53B. In the case where switching the operation mode to the power saving mode, the sleep transition portion 51B shuts off the power supplied to the automatic document feeder 120, the document scanning unit 130, the image forming unit 140, the paper feed unit 150, and the HDD 113. The sleep transition portion 51B continues to supply the power to the communication I/F unit 160, the facsimile unit 170, and the short-range communication unit 180 even if the operation mode is the power saving mode.

The remote control portion 53 includes an operation request portion 81, a setting information transmitting portion 83, and an execution instruction receiving portion 85. In response to input of a request instruction from the sleep transition portion 51B, the operation request portion 81 controls the communication I/F unit 160 to establish a communication path with the server 300, transmits a proxy request to the server 300, and outputs a transmission instruction to the setting information transmitting portion 83.

In response to input of the transmission instruction, the setting information transmitting portion 83 controls the communication I/F unit 160 to transmit the setting information stored in the RAM 13 to the server 300.

The execution instruction receiving portion 85 controls the communication I/F unit 160 to receive a server execution instruction from the server 300 after the operation request portion 81 transmits a proxy request to the server 300. The server execution instruction includes setting information and an execution instruction command. In response to reception of the server execution instruction, the execution instruction receiving portion 85 outputs a server recovery instruction to the recovery portion 55B, outputs a server setting instruction to the setting portion 57B, and outputs a process execution instruction to the process execution portion 59B. The server setting instruction includes setting information included in the server execution instruction, and the process execution instruction includes process identification information of a process specified by the execution instruction command included in the server execution instruction.

In the case where receiving a server setting instruction from the execution instruction receiving portion 85, the setting portion 57B sets setting information included in the server setting instruction. Specifically, the setting portion 57B updates setting information of a setting item corresponding to the setting information included in the server setting instruction among setting information stored in the RAM 13 by the setting information included in the server setting instruction.

In response to input of the server recovery instruction from the execution instruction receiving portion 85, the recovery portion 55B switches the operation mode from the power saving mode to the driving mode. Specifically, the recovery portion 55B supplies the power to the automatic document feeder 120, the document scanning unit 130, the image forming unit 140, the paper feed unit 150, and the HDD 113.

In response to input of the process execution instruction from the execution instruction receiving portion 85 with the operation mode being switched to the driving mode, the process execution portion 59B executes a process specified by the process identification information included in the process execution instruction in accordance with the setting information set by the setting portion 57B. Specifically, the process execution portion 59B reads out the setting information stored in the RAM 13, and executes the process in accordance with the read setting information. The processes to be executed by the process execution portion 59B include a scanning process, an image forming process, a data management process, a data transmission process, or a combination of more than 1 of these processes. In the case where a server execution instruction is input from the execution instruction receiving portion 85 with the operation mode being switched to the power saving mode by the sleep transition portion 51B, the operation mode is switched to the driving mode by the recovery portion 55B, so that the process execution portion 59B can execute a process to control the automatic document feeder 120, the document scanning unit 130, the image forming unit 140, the paper feed unit 150, and the HDD 113.

Figure 18:
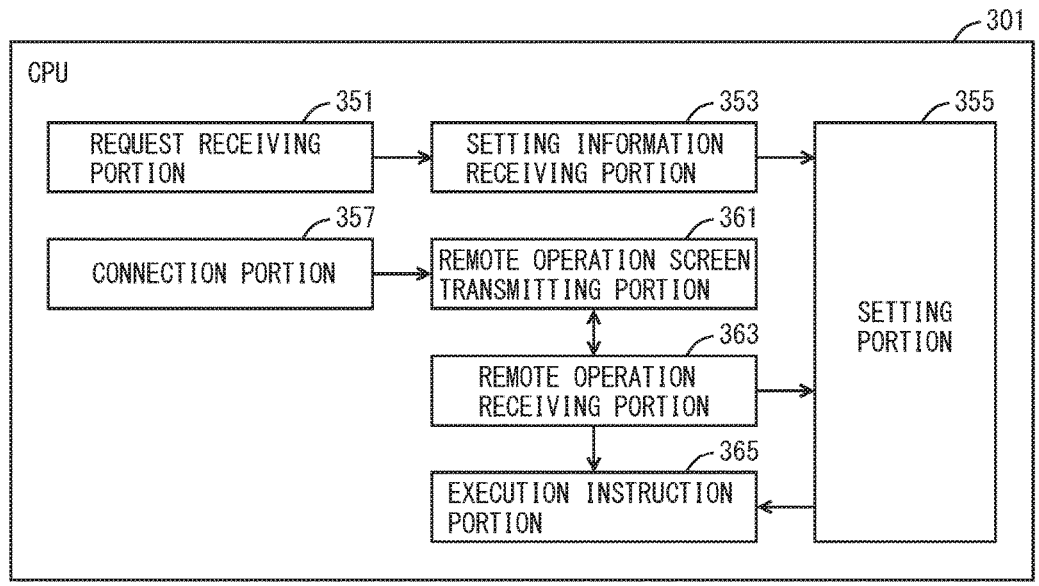
FIG. 18 is a block diagram showing one example of functions of a CPU included in a server in the second embodiment.

FIG. 18 is a block diagram showing one example of functions of a CPU included in the server in the second embodiment. Functions shown in FIG. 18 are formed by execution of a proxy program stored in the ROM 302, the HDD 304 or the CD-ROM 309 by the CPU 301 included in the server 300 in the second embodiment. Referring to FIG. 18, the CPU 301 included in the server 300 in the second embodiment includes a request receiving portion 351, a setting information receiving portion 353, a setting portion 355, a connection portion 357, a remote operation screen transmitting portion 361, a remote operation receiving portion 363, and an execution instruction portion 365.

The request receiving portion 351 controls the communication unit 305 to receive a proxy request from the MFP 100. When receiving a proxy request from the MFP 100, the request receiving portion 351 outputs a reception instruction to the setting information receiving portion 353.

When receiving the reception instruction from the request receiving portion 351, the setting information receiving portion 353 controls the communication unit 305 to receive setting information transmitted by the MFP 100. The setting information receiving portion 353 outputs the setting information to the setting portion 355. The setting portion 355 stores the setting information that is input from the setting information receiving portion 353 in the HDD 304.

When controlling the communication unit 305 to receive a connection request from the HMD 200, the connection portion 357 establishes a communication path with the HMD 200. The connection request received from the HMD 200 is a connection request to remotely operate the MFP 100, and includes device identification information for identifying the MFP 100. When the communication path is established between the communication unit 305 and the HMD 200, the connection portion 357 outputs a transmission instruction to the remote operation screen transmitting portion 361. The transmission instruction includes path identification information for identifying the communication path established between the connection portion 357 and the HMD 200.

In response to input of the transmission instruction from the connection portion 357, the remote operation screen transmitting portion 361 controls the communication unit 305 to transmit a remote operation screen defined as default and an initial screen, and outputs the path identification information and the remote operation screen to the remote operation receiving portion 363.

The remote operation receiving portion 363 controls the communication unit 305 to receive a remote operation command transmitted from the HMD 200. In response to reception of the remote operation command from the HMD 200, the remote operation receiving portion 363 outputs the remote operation command and the path identification information to the remote operation screen transmitting portion 361, the setting portion 355, and the execution instruction portion 365.

The remote operation command, which the HMD 200 that is the remote operation device transmits to the server 300 in order to remotely operate the MFP 100, includes a setting instruction command, a screen transition command, and an execution instruction command. Further, the remote operation command sometimes includes position information indicating a position in a remote operation screen. In the case where the remote operation command received after the transmission of the remote operation screen includes the position information, the remote operation receiving portion 363 produces any of the setting instruction command, the screen transition command, and the execution instruction command based on the position information and the remote operation screen that is transmitted to the HMD 200 by the remote operation screen transmitting portion 361, and outputs the produced setting instruction command, screen transition command, or execution instruction command to the remote operation screen transmitting portion 361, the setting portion 355, and the execution instruction portion 365. In the case where outputting the execution instruction command, the remote operation receiving portion 363 outputs the path identification information to the execution instruction portion 365.

When receiving a remote operation command from the remote operation receiving portion 363, the remote operation screen transmitting portion 361 produces a remote operation screen corresponding to the remote operation command, and controls the communication unit 305 to transmit the produced remote operation screen to the HMD 200.

In the case where receiving the setting instruction command from the remote operation receiving portion 363, the setting portion 355 sets the setting information in accordance with the setting instruction command. The setting portion 355 sets the setting information defined by the setting instruction command in a setting item defined by the setting instruction command. Specifically, the setting portion 355 updates the setting information of the setting item that is defined by the setting command among setting information stored in the HDD 304 by the setting information defined by the setting command.

In response to input of a screen transition command from the remote operation receiving portion 363, the remote operation screen transmitting portion 361 produces a remote operation screen defined by the screen transition command, and controls the communication unit 305 to transmit the produced remote operation screen to the HMD 200.

In response to input of the path identification information and the execution instruction command from the remote operation receiving portion 363, the execution instruction portion 365 controls the communication unit 305 to transmit a server execution instruction to the MFP 100. The server execution instruction includes the execution instruction command and the setting information stored in the HDD 304.

Figure 19:
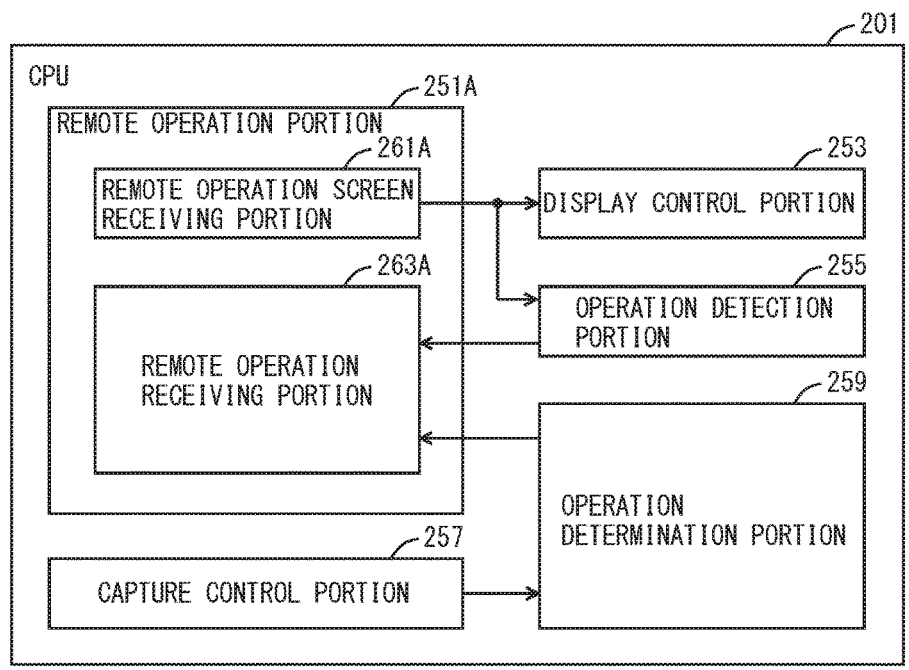
FIG. 19 is a block diagram showing one example of functions of the CPU included in an HMD in the second embodiment.

FIG. 19 is a block diagram showing one example of functions of a CPU included in the HMD in the second embodiment. Referring to FIG. 19, a difference of the functions of the CPU included in the HMD in the second embodiment from the functions shown in FIG. 7 lie in that the remote operation unit 251 is changed to a remote operation portion 251A. Other functions are the same as the functions shown in FIG. 7. A description thereof is therefore not repeated. Referring to 19, when the operation unit 206 accepts a remote operation instruction, the remote operation portion 251A transmits a connection request to the server 300 via the wireless LAN I/F 205, and establishes a communication path with the server 300. For example, if a list of devices that can be targets of the remote operation is displayed in the display unit 306, and the user designates one device from the list using the operation unit 307, the operation portion 206 accepts the remote operation instruction. Here, an example in which the MFP 100 is designated as the device of the target of the remote operation is described. Here, a connection request includes device identification information of a device, which is the target of the remote operation, that is, the MFP 100 in this case.

The remote operation portion 251A includes a remote operation screen receiving portion 261A and a remote operation transmitting portion 263A. The remote operation screen receiving portion 261A controls the wireless LAN I/F 205 to receive a remote operation screen from the server 300. The remote operation screen receiving portion 261A outputs the received remote operation screen to the display control portion 253, and outputs the remote operation screen to the operation detection portion 255.

In response to input of a remote operation command from the operation detection portion 255, the remote operation transmitting portion 263A controls the wireless LAN I/F 205 to transmit the remote operation command to the server 300. Further, in response to input of the remote operation command from the operation determination portion 259, the remote operation transmitting portion 263A controls the wireless LAN I/F 205 to transmit the remote operation command to the server 300.

Figure 20:
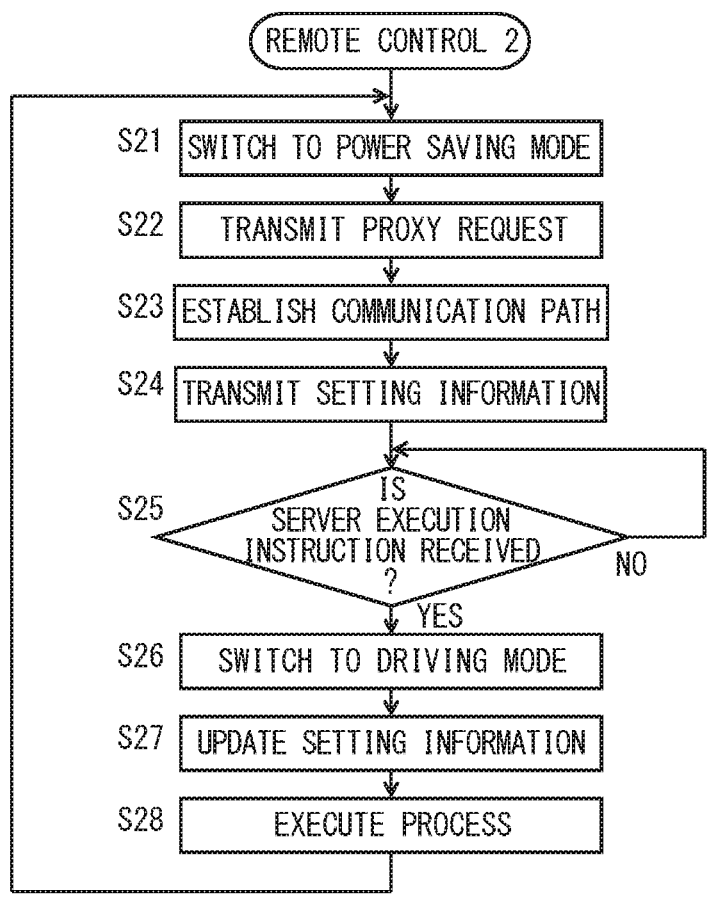
FIG. 20 is a flow chart showing one example of a flow of a remote control process in the second embodiment.

FIG. 20 is a flow chart showing one example of a flow of a remote control process in the second embodiment. The remote control process in the second embodiment is a process executed by execution of a remote control program in the second embodiment stored in the ROM 12, the HDD 113, or the CD-ROM 190A by the CPU 11 included in the MFP 100A in the second embodiment. Referring to FIG. 20, when being activated, the CPU 11 switches the operation mode to the power saving mode (step S21). Specifically, the CPU 11 shuts off the power supplied to the automatic document feeder 120, the document scanning unit 130, the image forming unit 140, the paper feed unit 150, and the HDD 113. Then, the CPU 11 controls the communication I/F unit 160 to transmit a proxy request to the server 300 (step S22). Then, the CPU 11 controls the communication I/F unit 160 to establish a communication path with the server 300 (Step S23). In the next step S24, the CPU 11 transmits setting information stored in the RAM 15, and the process proceeds to the step S25. Specifically, the CPU 11 controls the communication I/F unit 160 to transmit the setting information to the server 300 via a communication path established in the step S23.

In the next step S25, the CPU 11 determines whether a server execution instruction has been received from the server 300. The process waits until the communication I/F unit 160 receives the server execution instruction via the communication path established in the step S23. When the server execution instruction is received, the process proceeds to the step S26. In the step S26, the operation mode is switched to the driving mode. Specifically, the CPU 11 supplies the power to the automatic document feeder 120, the document scanning unit 130, the image forming unit 140, the paper feed unit 150, and the HDD 113.

In the step S27, the CPU 11 updates the setting information. Specifically, the CPU 11 overwrites the setting information stored in the RAM 15 with the setting information that is included in the server execution instruction received in the step S25. In the next step S28, the CPU 11 executes a process specified by an execution instruction command included in the server execution instruction received in the step S25 in accordance with the setting information that is stored in the RAM 15, and the process returns to the step S21.

Figure 21:
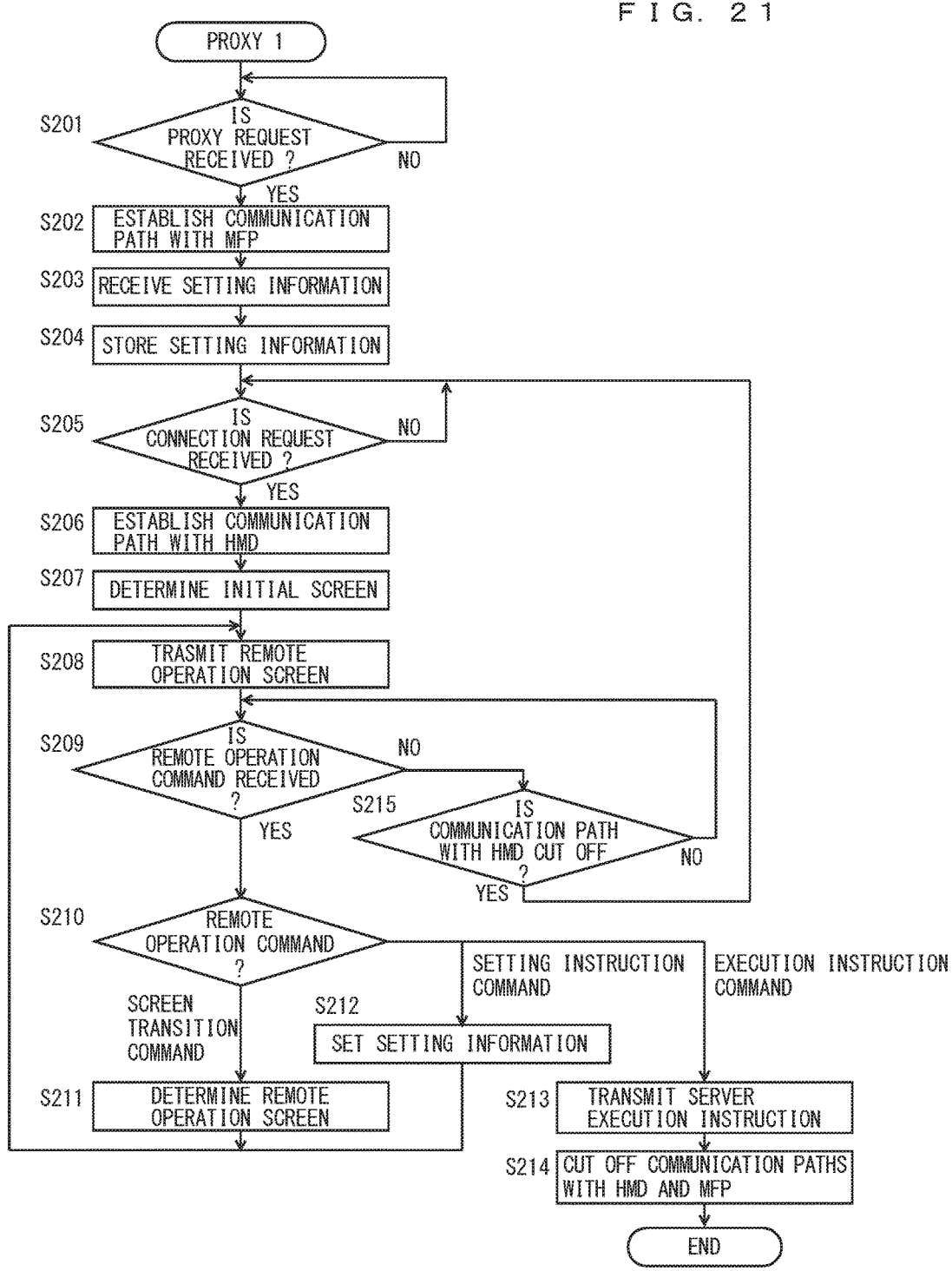
FIG. 21 is a flow chart showing one example of a flow of a proxy process in the second embodiment.

FIG. 21 is a flow chart showing one example of a flow of a proxy process in the second embodiment. The proxy process in the second embodiment is a process executed by execution of a proxy program in the second embodiment stored in the ROM 302, the HDD 304 or the CD-ROM 309 by the CPU 301 included in the server 300 in the second embodiment. Referring to FIG. 21, the CPU 301 determines whether a proxy request has been received from the MFP 100 (step S201). The process waits until the communication unit 305 receives the proxy request from the MFP 100 (NO in step S201). If the proxy request has been received (YES in the step S201), the process proceeds to the step S202.

In the next step S202, the CPU 301 establishes a communication path with the MFP 100 that has transmitted the proxy request, and the process proceeds to the step S203. Then, the CPU 301 controls the communication unit 305 to receive setting information from the MFP 100 via the communication path established in the step S202 (step S203). Then, the CPU 301 stores the received setting information in the HDD 304, and the process proceeds to the step S205.

In the step S205, the CPU 301 determines whether a connection request has been received from the HMD 200 (step S205). The process waits until the communication unit 305 receives the connection request from the HMD 200 (step S205). If the connection request has been received (YES in the step S205), the process proceeds to the step S206. The connection request includes device identification information of a device, which is a target of a remote operation with the HMD 200. Here, a case in which the connection request including the device identification information of the MFP 100 is received is described as an example. In the step S206, the CPU 301 controls the communication unit 305 to establish a communication path with the HMD 200, and the process proceeds to the step S207.

In the step S07, the CPU 301 determines an initial screen of the remote operation screen to be transmitted to the HMD 200. Specifically, the CPU 301 determines a remote operation screen for remotely operating the MFP 100 specified by the device identification information included in the connection request received in the step S205. In the next step S208, the CPU 301 controls the connection unit 305 to transmit the remote operation screen via the connection path established in the step S206. In the next step S209, the CPU 301 determines whether a remote operation command has been received from the HMD 200. If the communication unit 305 has received the remote operation command from the HMD 200 via the connection path established in the step S206, the process proceeds to the step S210. If not, the process proceeds to the step S215. In the step S215, the CPU 301 determines whether the communication path established with the HMD 200 in the step S206 has been cut off. If the communication path has been cut off, the process returns to the step S205. If not, the process returns to the step S209.

In the step S210, the process branches depending on a type of the received remote operation command. If the remote operation command is a screen transition command, the process proceeds to the step S211. If the remote operation command is a setting instruction command, the process proceeds to the step S212. If the remote operation command is an execution instruction command, the process proceeds to the step S213. In the step S211, the CPU 301 determines a remote operation screen defined by the screen transition command, and the process returns to the step S208. In the step S208, in the case where the process proceeds from the step S211, the CPU 301 transmits the remote operation screen determined in the step S211 to the HMD 200.

In the step S212, the CPU 301 sets setting information in accordance with a setting instruction command, and the process returns to the step S208. Specifically, the CPU 301 updates setting information stored in the HDD 304 by setting information defined by the setting instruction command. In the step S208, in the case where the process proceeds from the step S212, the CPU 301 transmits a remote operation screen, which is the same as the previously transmitted remote operation screen and in which the setting information is set, to the HMD 200.

In the step S213, the CPU 301 transmits a server execution instruction to the MFP 100. The CPU 301 controls the communication unit 305 to transmit the server execution instruction via the communication path established with the MFP 100 in the step S202. The server execution instruction includes setting information stored in the HDD 304 and an execution instruction command.

In the next step S214, the CPU 301 cuts off the communication paths with the HMD 200 and the MFP 100, and ends the process. Specifically, the CPU 301 cuts off the communication path established with the MFP 100 in the step S202 and the communication path established with the HMD 200 in the step S206.

Figure 22:
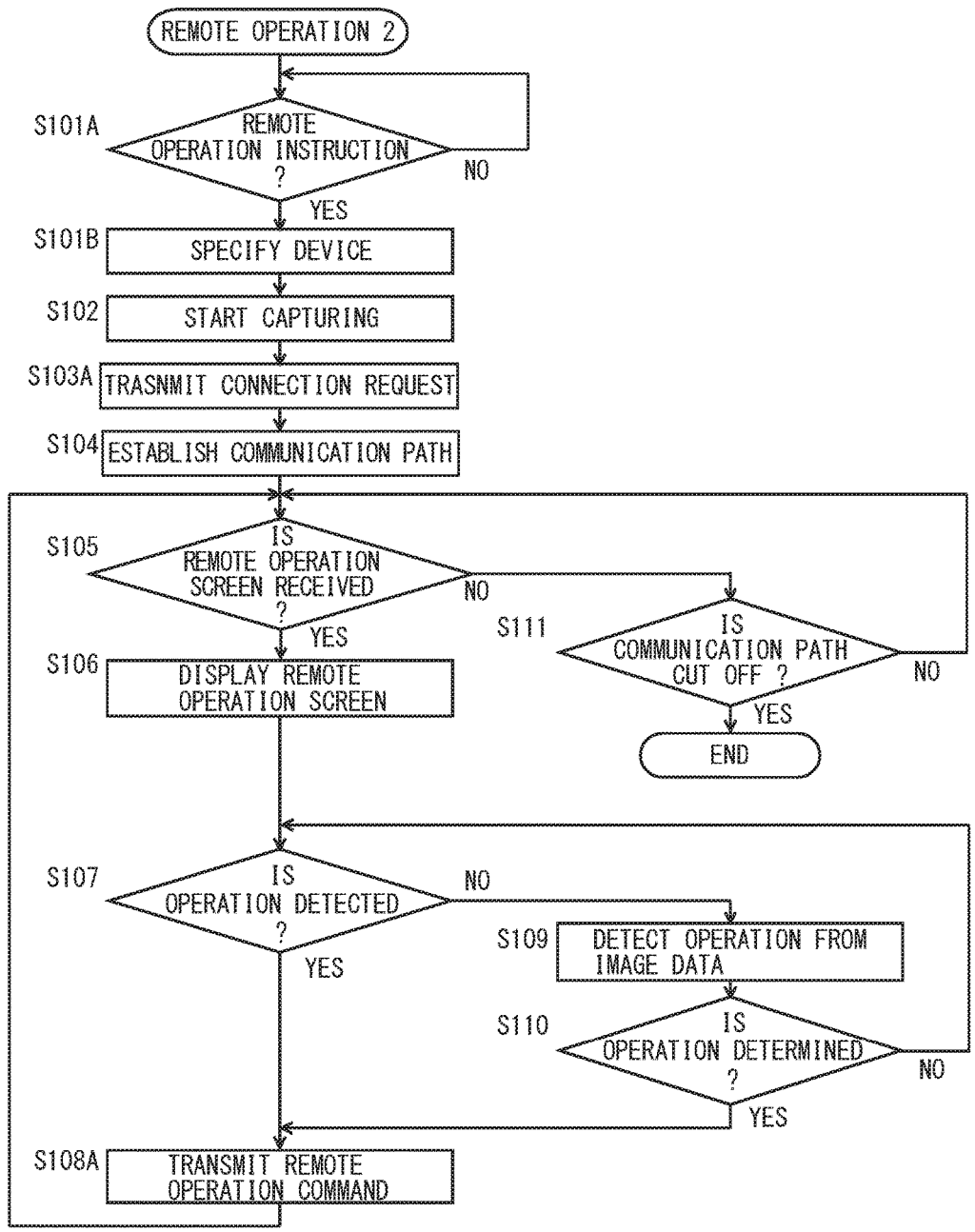
FIG. 22 is a flow chart showing one example of the flow of the remote operation process in the second embodiment.

FIG. 22 is a flow chart showing one example of a flow of a remote operation process in the second embodiment. The remote operation process in the second embodiment is a process executed by execution of a remote operation program in the second embodiment stored in the flash memory 203 by the CPU 201 included in the HMD 200. Referring to FIG. 22, differences of the remote operation process in the second embodiment from the remote operation process in the first embodiment shown in FIG. 13 lie in that the step S101A and the step S101B are performed instead of the step S101, and that the step S103 and the step S108 are changed to the step S103A and the step S108A. Other processes are the same as the processes shown in FIG. 13. A description thereof is therefore not repeated.

The CPU 201 included in the HMD 200 in the second embodiment determines whether a remote operation instruction has been received in the step S101A. The process waits until the operation unit 206 accepts the remote operation instruction (NO in step S101A). If the remote operation instruction has been accepted, the process proceeds to the step S101B. For example, the CPU 206 accepts a remote operation instruction by identifying the predetermined voice.

In the next step S101B, the CPU 201 specifies a device that is a target of a remote operation, and the process proceeds to the step S102. For example, the CPU 201 displays a list of devices that can be targets of the remote operation in the display unit 204. If the user designates one device from the list using the operation unit 307, the CPU 201 specifies the designated device. A case in which the MFP 100 is designated as the device of the target of the remote operation is described as an example.

After the capturing by the camera 202 is started in the step S102, the CPU 201 transmits a connection request to the server 300 in the step S103A. Specifically, the CPU 201 controls the wireless LAN I/F 205 to transmit the connection request to the server 300. The connection request includes device identification information for identifying the device specified in the step S101B, that is, the MFP 100 in this case.

In the step S108A, the CPU 201 transmits a remote operation command to the server 300, and the process returns to the step S105. In the case where the process proceeds from the step S107, the CPU 201 produces a remote operation command corresponding to an operation detected in the step S107, and controls the wireless LAN I/F 205 to transmit the produced remote operation command to the server 300 via the communication path established in the step S104. In the case where the process proceeds from the step S110, the CPU 201 produces a remote operation command corresponding to an operation determined in the step S110, and controls the wireless LAN I/F 205 to transmit the produced remote operation command to the server 300 via the communication path established in the step S104.

<Second Modified Example of Main Substrate>

Figure 23:
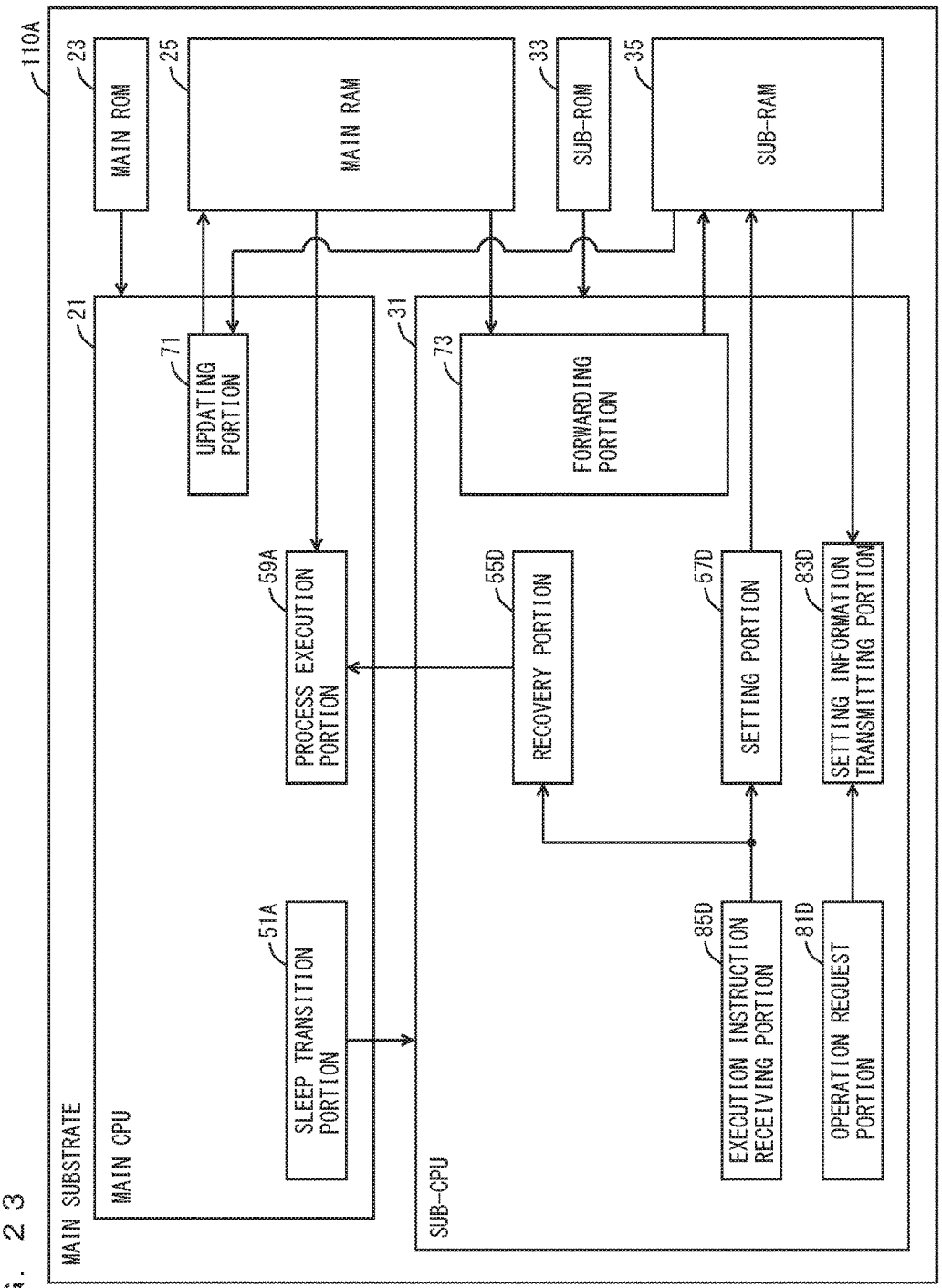
FIG. 23 is a block diagram showing one example of configurations of a main substrate in a modified example of the second embodiment.

FIG. 23 is a block diagram showing one example of configurations of the main substrate in the modified example of the second embodiment. Referring to FIG. 23, differences of the main substrate 110A in the modified example of the second embodiment from the main substrate 110A in the modified example of the first embodiment shown in FIG. 18 lie in that the remote control portion 53 is removed, that an operation request portion 81D, a setting information transmitting portion 83D, and an execution instruction receiving portion 85D are added, and the recovery portion 55A and the setting portion 57A are changed to a recovery portion 55D and a setting portion 57D, in the sub-CPU 31. Functions of the forwarding portion 73 are the same as the functions shown in FIG. 18. A description thereof is therefore not repeated.

When the sub-CPU 31 is activated, the operation request portion 81D controls the communication I/F unit 160 to establish a communication path with the server 300, transmits a proxy request to the server 300, and outputs a transmission instruction to the setting information transmitting portion 83. In response to input of the transmission instruction, the setting information transmitting portion 83D controls the communication I/F unit 160 to transmit the setting information stored in the sub-RAM 35 to the server 300.

Similarly to the execution instruction receiving portion 85 shown in FIG. 17, the execution instruction receiving portion 85D controls the communication I/F unit 160 to receive a server execution instruction from the server 300. The server execution instruction includes setting information and an execution instruction command. In response to reception of the server execution instruction, the execution instruction receiving portion 85 outputs a server recovery instruction and a process execution instruction to the recovery portion 55D, and outputs a server setting instruction to the setting portion 57D. The server setting instruction includes setting information included in the server execution instruction, and the process execution instruction includes process identification information of a process specified by the execution instruction command included in the server execution instruction.

In the case where receiving a server setting instruction from the execution instruction receiving portion 85, the setting portion 57D updates setting information stored in the sub-RAM 35 by setting information included in the server setting instruction.

In response to input of a server recovery instruction from the execution instruction receiving portion 85, the recovery portion 55D switches the operation mode to the driving mode. Specifically, the recovery portion 55D supplies the power to the automatic document feeder 120, the document scanning unit 130, the image forming unit 140, the paper feed unit 150, and the HDD 113, and activates the main CPU 21. The recovery portion 55D stops after outputting an execution instruction command to the main CPU 21 after the activation of the main CPU 21. Specifically, the recovery portion 55D shuts off the power supplied to the sub-CPU 31. The execution instruction command is a command to give an instruction to execute a process specified by process identification information included in a process execution instruction.

In response to input of the execution instruction command from the recovery portion 55D, the process execution portion 59A included in the main CPU 21 reads out setting information stored in the main RAM 23, and executes a process specified by the execution instruction command in accordance with the read setting information. The processes to be executed by the process execution portion 59A include a scanning process, an image forming process, a data management process, a data transmission process, or a combination of more than 1 of these processes.

In this manner, in the case where the operation mode is the driving mode, the main CPU 21 and the main RAM 25 operate in the main substrate 110A in the modified example of the second embodiment. In the case where the operation mode is the power saving mode, the sub-CPU 31 and the sub-RAM 35 operate in the main substrate 110A in the modified example of the second embodiment. Therefore, in the case where the operation mode is the driving mode, the power may be supplied to the main CPU 21 and the main RAM 25. In the case where the operation mode is the power saving mode, the power may be supplied to the sub-CPU 31 and the sub-RAM 35. Therefore, power consumption in the power saving mode can be reduced.

Similarly to the modified example of the first embodiment, in the case where the operation mode is switched from the driving mode to the power saving mode, the main substrate 110A may shut off the power supply of the main CPU 21 after the updating portion 71 stores setting information stored in the main RAM 25 in the sub-RAM 35. In the case where the operation mode is switched from the power saving mode to the driving mode, the main substrate 110A may shut off the power supply of the sub-CPU 31 after the forwarding portion 73 stores setting information stored in the sub-RAM 35 in the main RAM 25.

In the modified example of the second embodiment, the main CPU 21 executes a main remote control process shown in FIG. 15.

Figure 24:
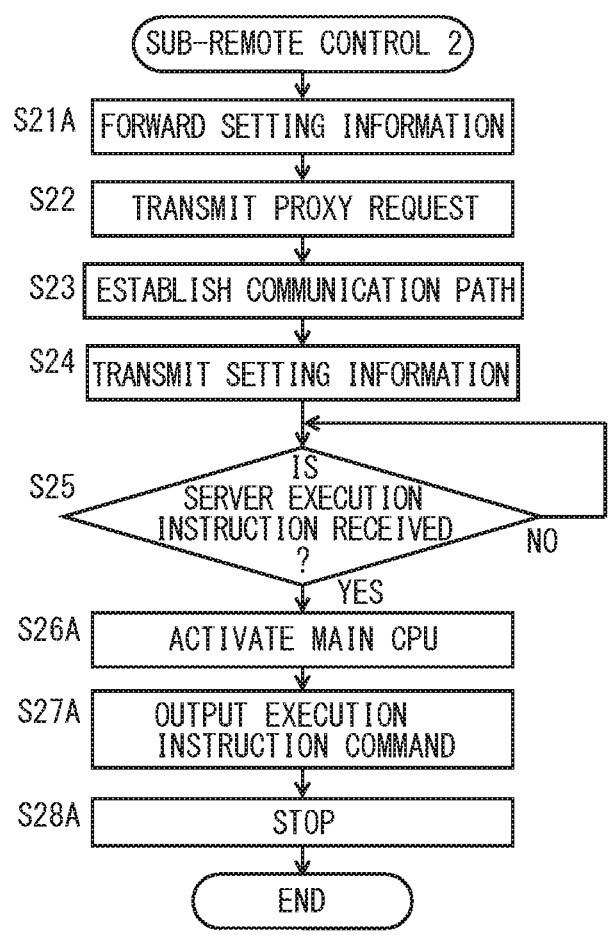
FIG. 24 is a flow chart showing one example of a flow of a sub-remote control process in the modified example of the second embodiment.

FIG. 24 is a flow chart showing one example of a flow of a sub-remote control process in the modified example of the second embodiment. The sub-remote control process is a process executed by execution of a sub-part of a remote control program in the modified example of the second embodiment stored in the sub-ROM 35, the HDD 113 or the CD-ROM 190A by the sub-CPU 31 included in the main substrate 110 in the modified example of the second embodiment. Referring to FIG. 24, when being activated, the sub-CPU 31 forwards setting information (step S21A). Specifically, the sub-CPU 31 reads out the setting information stored in the main RAM 25, and stores the setting information in the sub-RAM 35. Thereafter, the sub-CPU 31 shuts off the power supplied to the main RAM 25.

Then, the sub-CPU 31 controls the communication I/F unit 160 to transmit a proxy request to the server 300 (step S22). Then, the sub-CPU 31 controls the communication I/F unit 160 to establish a communication path with the server 300 (step S23). In the next step S24, the sub-CPU 31 transmits setting information stored in the RAM 15 to the server 300, and the process proceeds to the step S25. Specifically, the sub-CPU 31 controls the communication I/F unit 160 to transmit the setting information to the server 300 via the communication path established in the step S23.

In the next step S25, the sub-CPU 31 determines whether a server execution instruction has been received from the server 300. The process waits until the communication I/F unit 160 receives the server execution instruction via the communication path established in the step S23. When the server execution instruction is received, the process proceeds to the step S26A. In the step S26A, the sub-CPU 31 activates the main CPU 21, and the process proceeds to the step S27A. Specifically, the sub-CPU 31 supplies the power to the main CPU 21 and the main RAM 25, and resets the main CPU 31. In the next step S27A, the sub-CPU 31 outputs an execution instruction command to the main CPU 21, and the process proceeds to the step S28A. In the step S28A, the sub-CPU 31 stops, and ends the process. Specifically, the sub-CPU 31 supplies the power to the automatic document feeder 120, the document scanning unit 130, the image forming unit 140, the paper feed unit 150, and the HDD 113, and shuts off the power supplied to the sub-CPU 31.

When the communication with the HMD 200 stops, the MFP 100 in the second embodiment switches the operation mode from the driving mode to the power saving mode, transmits setting information to the server 300, and requests a proxy process.

As described above, the MFP 100 in the second embodiment switches the operation mode from the driving mode to the power saving mode, and transmits the proxy request to the server 300. After receiving the proxy request from the MFP 100, the server 300 receives a remote operation command transmitted from the HMD 200 on behalf of the MFP 100, and sets setting information in accordance with a setting instruction command received from the HMD 200. The server 300 sets the setting information in accordance with the setting instruction command received from the HMD 200 until an execution instruction command that is the remote operation command corresponding to an execution instruction operation is received from the HMD 200. In the case where receiving the remote operation command corresponding to the execution instruction operation, the server 300 transmits a server execution instruction including the changed setting information and the remote operation command to the MFP 100. After switching the operation mode to the power saving mode, the MFP 100 maintains the power saving mode until receiving a server execution instruction from the server 300. When the server execution instruction is received, the MFP 100 switches the operation mode to the driving mode, and executes an execution instruction command included in the server execution instruction in accordance with setting information included in the server execution instruction. Therefore, the MFP 100 does not switch the operation mode to the driving mode until receiving a server execution instruction after requesting the server 300 to receive a remote operation command, so that the power consumption of the MFP 100 can be reduced.

<Third Embodiment>

In an image forming system 1 in the third embodiment, the MFP 100 in the first embodiment is changed to an MFP 100A.

Figure 25:
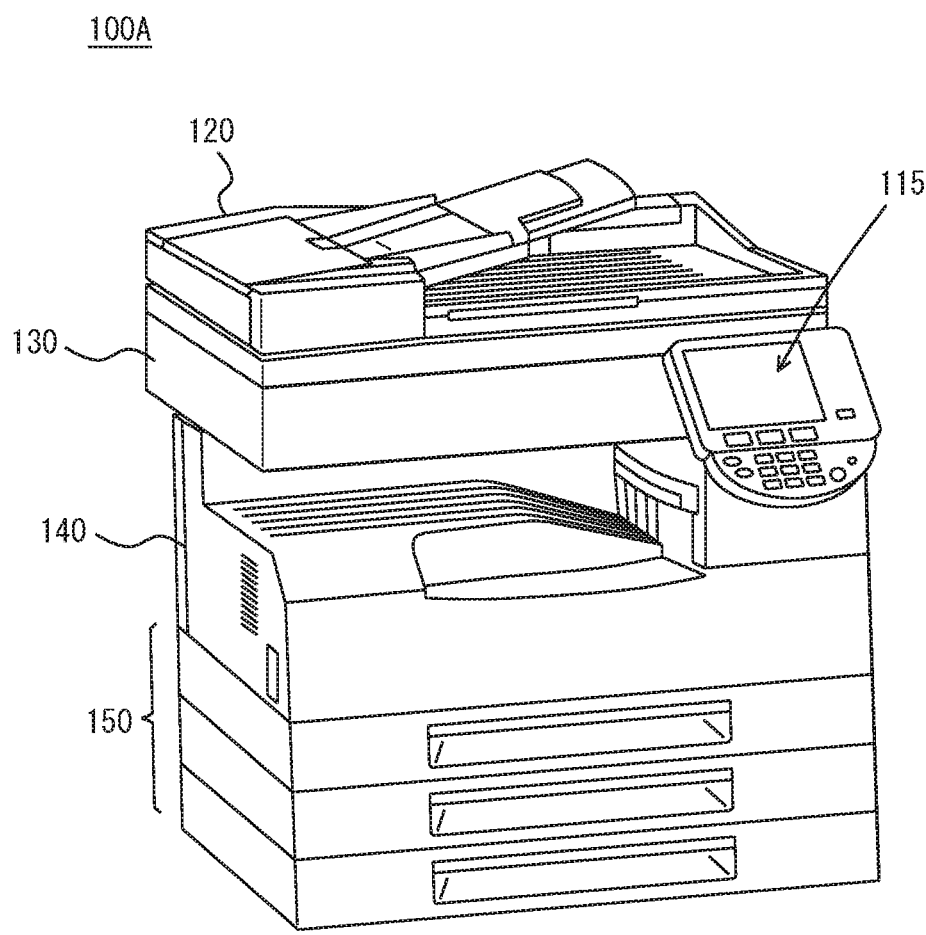
FIG. 25 is a perspective view showing an appearance of an MFP in a third embodiment.
Figure 26:
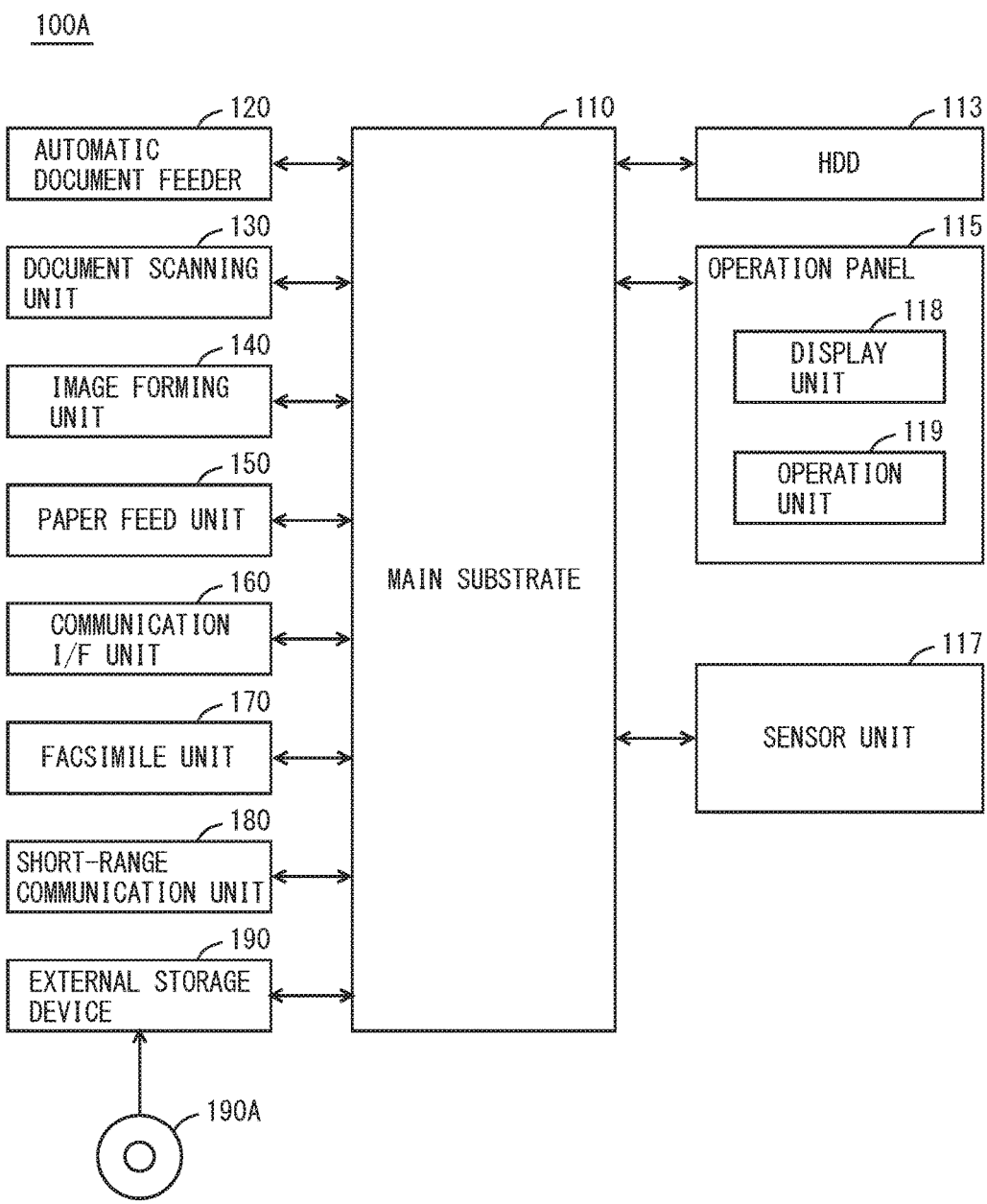
FIG. 26 is a block diagram showing one example of an outline of hardware configurations of the MFP in the third embodiment.

FIG. 25 is a perspective view showing an appearance of the MFP in the third embodiment. FIG. 26 is a block diagram showing one example of an outline of hardware configurations of the MFP in the third embodiment. Referring to FIGS. 25 and 26, a difference of the MFP 100A in the third embodiment from the MFP 100 in the first embodiment shown in FIGS. 3 and 4 lies in that an operation panel 115 and a sensor unit 117 are included. Other configurations are the same as the MFP 100 in the first embodiment. A description thereof is therefore not repeated.

The operation panel 115 includes a display unit 118 and an operation unit 119. The display unit 118 is a liquid crystal display (LCD), for example, and displays instruction menus to the user, information regarding image data and the like. The operation unit 119 includes a plurality of hard keys and a touch panel. The touch panel is compatible with multi-touch and is superimposed on an upper surface or a lower surface of the display unit 118 and, detects a position designated by the user in the display surface of the display unit 118.

The sensor unit 117 includes a plurality of sensors included in the MFP 100, detects output of the plurality of sensors, and outputs the detected sensor output to the main substrate 110. The sensor unit 117 includes a sensor for respectively detecting the opening and closing of the plurality of paper feed trays of the paper feed unit 150, a remaining amount detection sensor for detecting a remaining amount of paper, a sensor for detecting the opening and closing of the front door to externally expose a transport path of the paper, a jam sensor for detecting a jam of the paper provided in the transport path of the paper, a sensor for detecting a connection of an additional unit such as a paper inverting unit, a sensor for detecting presence of a document in the automatic document feeder 120, and a sensor for detecting the opening and closing of the front door 140A.

Figure 27:
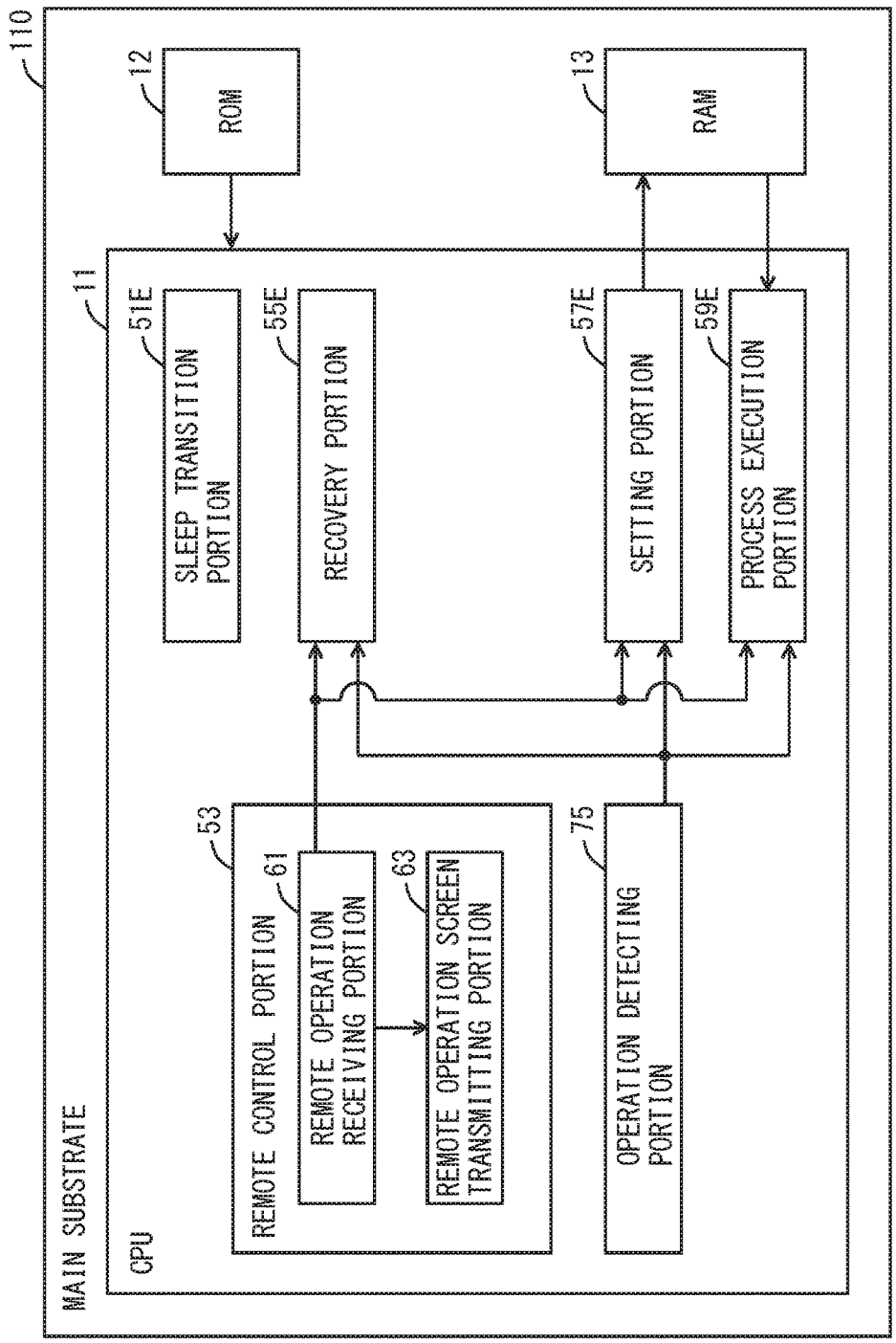
FIG. 27 is a block diagram showing one example of configurations of a main substrate included in the MFP in the third embodiment.

FIG. 27 is a block diagram showing one example of configurations of a main substrate included in the MFP in the third embodiment. Referring to FIG. 27, differences of the configurations of the main substrate included in the MFP in the third embodiment from the configurations of the main substrate 110 included in the MFP 100 in the first embodiment shown in FIG. 6 lie in that an operation detection portion 75 is added, and that the sleep transition portion 51, the recovery portion 55, the setting portion 57 and the process execution portion 59 are respectively changed to a sleep transition portion 51E, a recovery portion 55E, a setting portion 57E, and a process execution portion 59E, in the functions of the CPU 11. Other functions are the same as the functions shown in FIG. 6. A description thereof is therefore not repeated.

The operation detection portion 75 detects an operation by the user. The operation by the user includes an operation of opening and closing the paper feed unit 150 to change the settings of the paper, an operation of attaching an additional unit such as the paper inverting unit, an operation of placing a document on the automatic document feeder 120, and an operation of opening and closing the front door, in addition to an operation of inputting in the operation panel 115. The operations detected by the operation detection portion 75 include a configuration changing operation and a process execution condition setting operation. The configuration changing operation is an operation of setting setting information that defines a hardware resource that constitutes the MFP 100. The process execution condition setting operation is an operation other than the configuration changing operation, and an operation of setting the setting information that defines a process executable by the MFP 100.

The operation detection portion 75 detects an operation of inputting in the operation unit 119 included in the operation panel 115 by the user. Specifically, the operation detection portion 75 detects an operation of pressing the plurality of hard keys of the operation unit 119 or an operation of touching the touch panel. Further, the operation detection portion 75 detects an operation by the user based on detection by a sensor included in the sensor unit 117. For example, when the sensor included in the sensor unit 117 detects the opening of the plurality of paper feed trays included in the paper feed unit 150, the operation detection portion 75 detects an operation of opening the paper tray by the user. Further, when the sensor included in the sensor unit 117 detects a document on the document tray of the automatic document feeder 120, the operation detection portion 75 detects an operation of placing the document on the document tray by the user. When the operation by the user is detected, the operation detection portion 75 outputs an operation detection signal to the recovery portion 55E.

The operation detection portion 75 detects a setting operation of setting setting information, a screen transition operation of giving an instruction to switch an operation screen displayed in the display unit 118 to another operation screen, and an execution instruction operation of giving an instruction to execute a function. When a position in the operation screen is designated by the user with the operation screen being displayed in display unit 118, the operation detection portion 75 detects an operation based on the position designated in the operation screen. Specifically, if the position designated in the operation screen is within a transition button included in the operation screen, the operation detection portion 75 detects a screen transition operation. If the position designated in the operation screen is within a region assigned to a command that sets setting value, the operation detection portion 75 detects a setting operation. If the position designated in the operation screen is within a region of a button assigned to an execution command, the operation detection portion 75 detects an execution instruction operation. Further, if a start key among the plurality of hard keys included in the operation unit 119 is pressed, the operation detection portion 75 detects an execution instruction operation.

In the case where detecting the setting operation, the operation detection portion 75 outputs a setting instruction to the setting portion 57E. The setting instruction includes a setting item specified by the setting operation and setting information. In the case where detecting an execution instruction operation, the operation detection portion 75 outputs an execution instruction to the process execution portion 59E. The execution instruction includes process identification information for identifying a process specified by the execution instruction operation. In the case where detecting a screen transition operation, the operation detection portion 75 displays an operation screen specified by the screen transition operation in the display unit 118.

In the case where receiving a setting instruction command from the remote operation receiving portion 61, the setting portion 57E sets setting information in accordance with the setting instruction command. The setting portion 57E sets setting information defined by the setting instruction command in a setting item defined by the setting instruction command. Specifically, the setting portion 57E updates the setting information of the setting item defined by the setting command among setting information stored in the RAM 13 by the setting information defined by the setting command.

In the case where receiving a setting instruction from the operation detection portion 75, the setting portion 57E sets setting information in accordance with the setting instruction. The setting portion 57E sets the setting information included in the setting instruction in a setting item included in the setting instruction. Specifically, the setting portion 57E updates the setting information of a setting item defined by the setting instruction among the setting information stored in the RAM 13 by the setting information defined by the setting instruction.

In response to input of an execution instruction from the operation detection portion 75 with the operation mode being switched to the driving mode, the process execution portion 59E executes a process specified by process identification information included in the execution instruction in accordance with the setting information set by the setting portion 57E. Specifically, the process execution portion 59E reads out the setting information stored in the RAM 13, and executes the process in accordance with the read setting information. The processes to be executed by the process execution portion 59B include a scanning process of controlling the automatic document feeder 120 and the document scanning unit 130 to scan a document, an image forming process of controlling the image forming unit 140 and the paper feed unit 150 to form an image on paper, a data management process including a process of controlling the HDD 113 to write the data in the HDD 113 and a process of controlling the HDD 113 to read out the data stored in the HDD 113, a data transmission process of controlling the communication I/F unit 160 to transmit data, or a combination of more than 1 of these processes.

When a sleep transition condition is satisfied, the sleep transition portion 51E switches the operation mode from the driving mode to the power saving mode. The sleep transition condition is the case where the operation detection portion 75 does not accept an operation continuously for a predetermined period of time, for example. In the case where switching the operation mode to the power saving mode, the sleep transition portion 51B shuts off the power supplied to the automatic document feeder 120, the document scanning unit 130, the image forming unit 140, the paper feed unit 150, and the HDD 113. The sleep transition portion 51B continues to supply the power to the communication I/F unit 160, the facsimile unit 170, and the short-range communication unit 180 even if the operation mode is the power saving mode.

In the case where the operation mode is switched to the power saving mode, in response to input of an operation detection signal from the operation detection portion 75, the recovery portion 55E switches the operation mode from the power saving mode to the driving mode on condition that the remote control portion 53 has not established a communication path with the HMD 200. Specifically, the recovery portion 55E supplies the power to the automatic document feeder 120, the document scanning unit 130, the image forming unit 140, the paper feed unit 150, and the HDD 113. In the case where the operation mode is switched to the power saving mode, and the remote control portion 53 has established a communication path with the HMD 200, the recovery portion 55B does not switch the operation mode from the power saving mode to the driving mode even if receiving the operation detection signal from the operation detection portion 75.

In the case where the operation mode is switched to the power saving mode and the remote control portion 53 has established a communication path with the HMD 200, the recovery portion 55E sometimes receives an execution instruction command from the remote operation receiving portion 61. In response to input of the execution instruction command from the remote operation receiving portion 61, the recovery portion 55E switches the operation mode to the driving mode.

In response to input of an execution instruction from the operation detection portion 75 with the operation mode being switched to the driving mode, the process execution portion 59E executes a process defined by the execution instruction in accordance with the setting information set by the setting portion 57E. Specifically, the process execution portion 59E reads out setting information stored in the RAM 113, and executes a process in accordance with the read setting information. The processes to be executed by the process executing portion 59E include a scanning process, an image forming process, a data management process, a data transmission process, or a combination of more than 1 of these processes. In the case where receiving an execution instruction from the operation detection portion 75 with the operation mode being switched to the power saving mode by the sleep transition portion 51E, the operation mode is not switched to the driving mode by the recovery portion 55E, so that the process execution portion 59E does not execute a process.

Further, in the case where receiving an execution instruction from the remote operation receiving portion 61 with the operation mode being switched to the power saving mode by the sleep transition portion 51E, the operation mode is switched to the driving mode by the recovery portion 55E, so that the process execution portion 59E executes a process defined by an execution instruction. In the case where receiving an execution instruction from the remote operation receiving portion 61 with the operation mode being switched to the power saving mode, the operation mode is switched to the driving mode by the recovery portion 55E, so that the process execution portion 59E can execute a process of controlling the automatic document feeder 120, the document scanning unit 130, the image forming unit 140, the paper feed unit 150, and the HDD 113.

Hardware configurations of the HMD 200 in the third embodiment are basically the same as the hardware configurations shown in FIG. 2. The functions of the HMD 200 in the third embodiment are basically the same as the functions shown in FIG. 7. However, a difference lies in that the remote operation portion 251 displays a remote operation screen received from the MFP 100 at a position overlapping with a display surface of the display unit 118 of the MFP 100 in the display unit 204. The remote operation portion 251 displays the remote operation screen received from the MFP 100 at a position overlapping with the display surface of the display unit 118 of the MFP 100 in the display unit 204, whereby it appears to the user as if the remote operation screen is being displayed in the display unit 118 of the MFP 100 although nothing is displayed in the display unit 118 of the MFP 100. The user can perform a similar operation to the case where the remote operation screen is displayed in the display unit 118 of the MFP 100 in accordance with the remote operation screen which appears to be displayed in the display unit 118 of the MFP 100. In this case, the operation detection portion 255 extracts an image of a finger of the user from an image captured and acquired by the camera 202, and detects which position in the remote operation screen the user has designated, thereby detecting an operation by the user. Further, the image captured and acquired by the camera 202 includes an image of the operation unit 119, so that the operation detection portion 255 detects which key among the plurality of keys of the operation unit 119 the user has designated by the image captured and acquired by the camera 202.

A remote operation process executed by the CPU 201 included in the HMD 200 in the third embodiment is the same as the remote operation process shown in FIG. 13. A description thereof is therefore not repeated.

Figure 28:
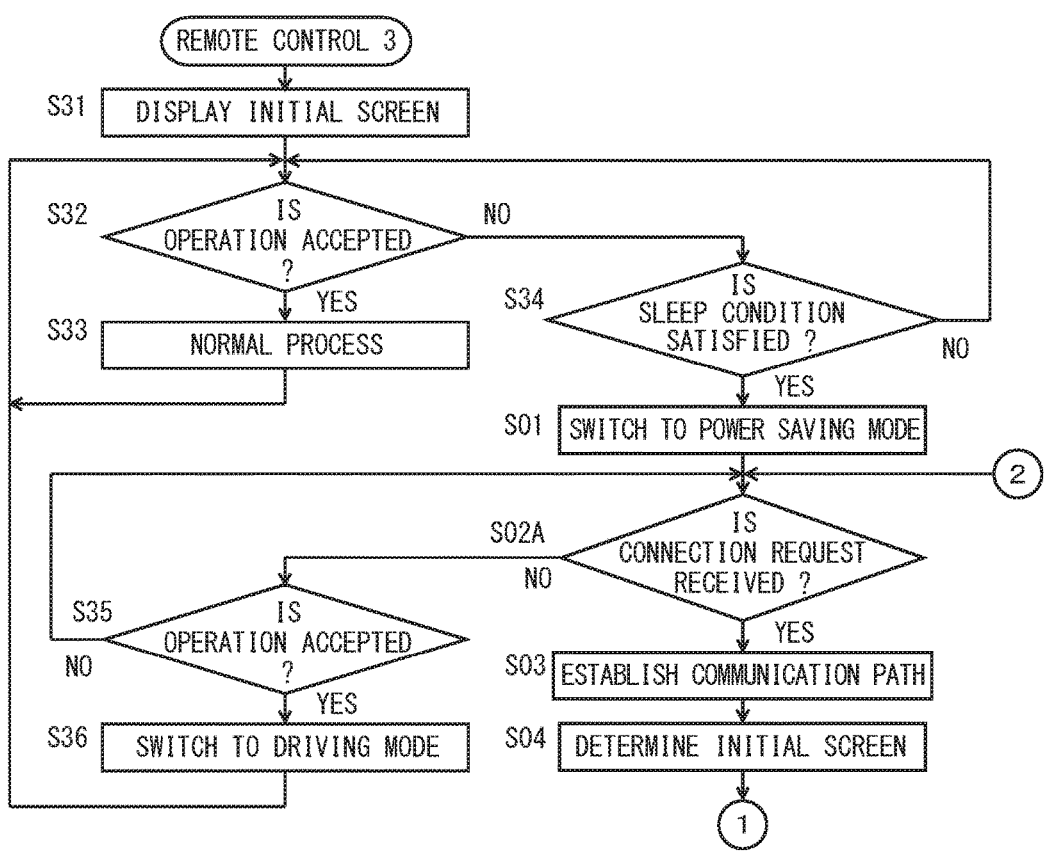
FIG. 28 is a first flow chart showing one example of a flow of a remote control process in the third embodiment.
Figure 29:
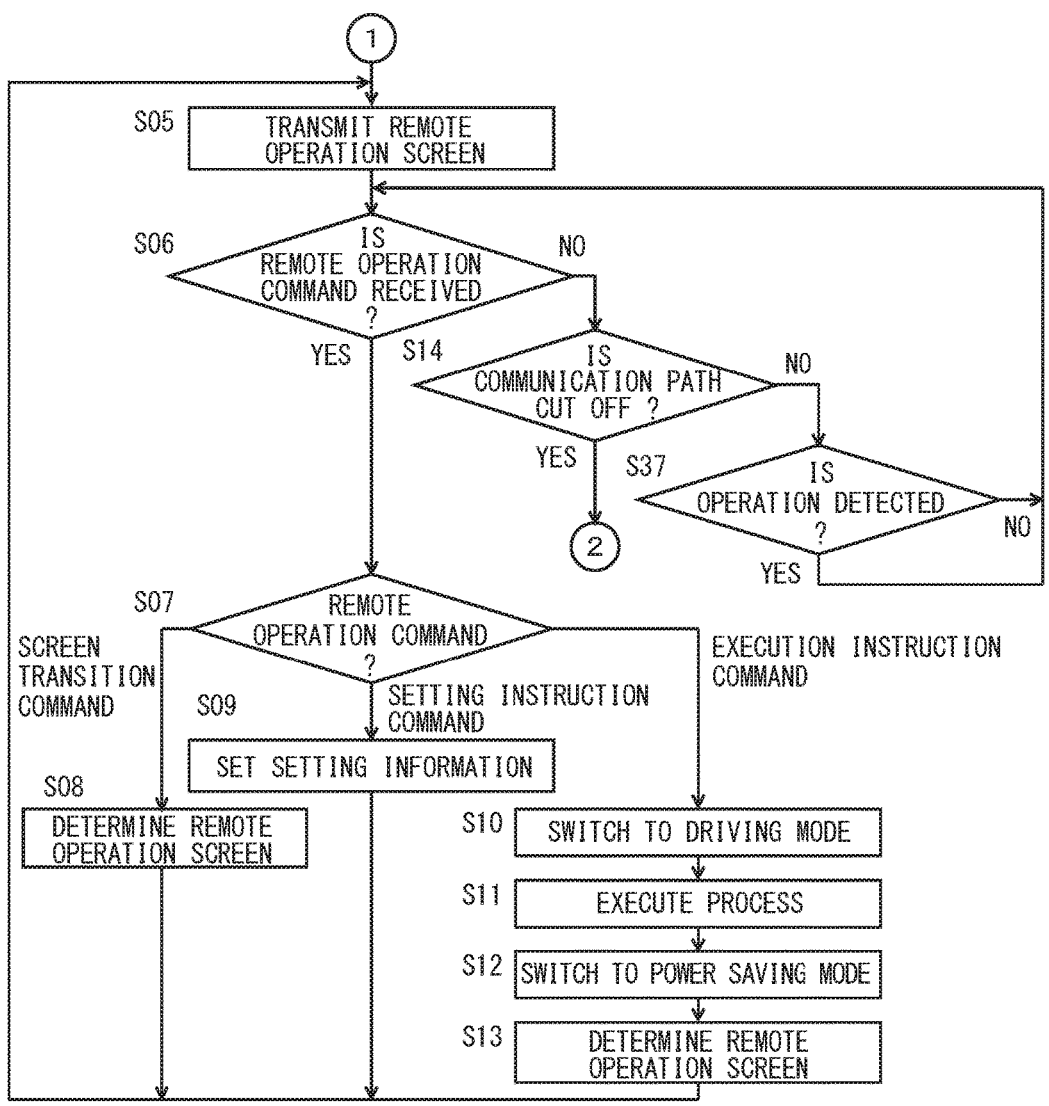
FIG. 29 is a second flow chart showing one example of the flow of the remote control process in the third embodiment.

FIGS. 28 and 29 are flow charts showing one example of a flow of the remote control process in the third embodiment. The remote control process in the third embodiment is a process executed by execution of a remote control program in the third embodiment stored in the ROM 12, the HDD 113 or the CD-ROM 190A by the CPU 11 included in the MFP 100A in the third embodiment. Referring to FIGS. 28 and 29, differences of the remote control process in the third embodiment from the remote control process in the first embodiment shown in FIG. 12 lie in that steps S31 to S34 are added before the step S01, that the step S02 is changed to the step S02A, that the step S35 and the step S36 are added after the step S02A, and that the step S37 is added after the step S14. The other processes are the same as the processes shown in FIG. 12. A description thereof is therefore not repeated.

The CPU 11 included in the MFP 100A in the third embodiment displays an initial screen in the display unit 118 (step S31). In the next step S32, the CPU 11 determines whether the operation unit 119 or the sensor unit 117 has accepted an operation by the user. If the operation has been accepted, the process proceeds to the step S33. If not, the process proceeds to the step S34. In the step S33, the CPU 11 executes a process in accordance with the accepted operation, and the process returns to the step S32.

In the step S34, the CPU 11 determines whether a sleep condition has been satisfied. Here, in the step S32, in the case where an operation by the user has not been accepted for a predetermined time period, the CPU 11 determines that the sleep condition has been satisfied. If the sleep condition has been satisfied, the process proceeds to the step S01. If not, the process returns to the step S32.

After the operation mode is switched to the power saving mode in the step S01, the CPU 11 determines in the step S02A whether a connection request has been received. If the connection request has been received, the process proceeds to the step S03. If not, the process proceeds to the step S35.

In the step S35, similarly to the step S32, the CPU 11 determines whether an operation by the user has been accepted. If the operation has been accepted, the process proceeds to the step S36. If not, the process returns to the step S02A. In the step S36, the operation mode is switched to the driving mode, and the process returns to the step S32. Specifically, the CPU 11 supplies the power to the automatic document feeder 120, the document scanning unit 130, the image forming unit 140, the paper feed unit 150, and the HDD 113.

In the step S14, the CPU 11 determines whether a communication path established in the step S03 has been cut off. If the communication path has been cut off, the process returns to the step S02A. If not, the process proceeds to the step S37. In the step S37, similarly to the step S32, the CPU 11 determines whether an operation by the user has been accepted. If the operation has been accepted, the process returns to the step S06. Even if not, the process returns to the step S06.

<Third Modified Example of Main Substrate>

Figure 30:
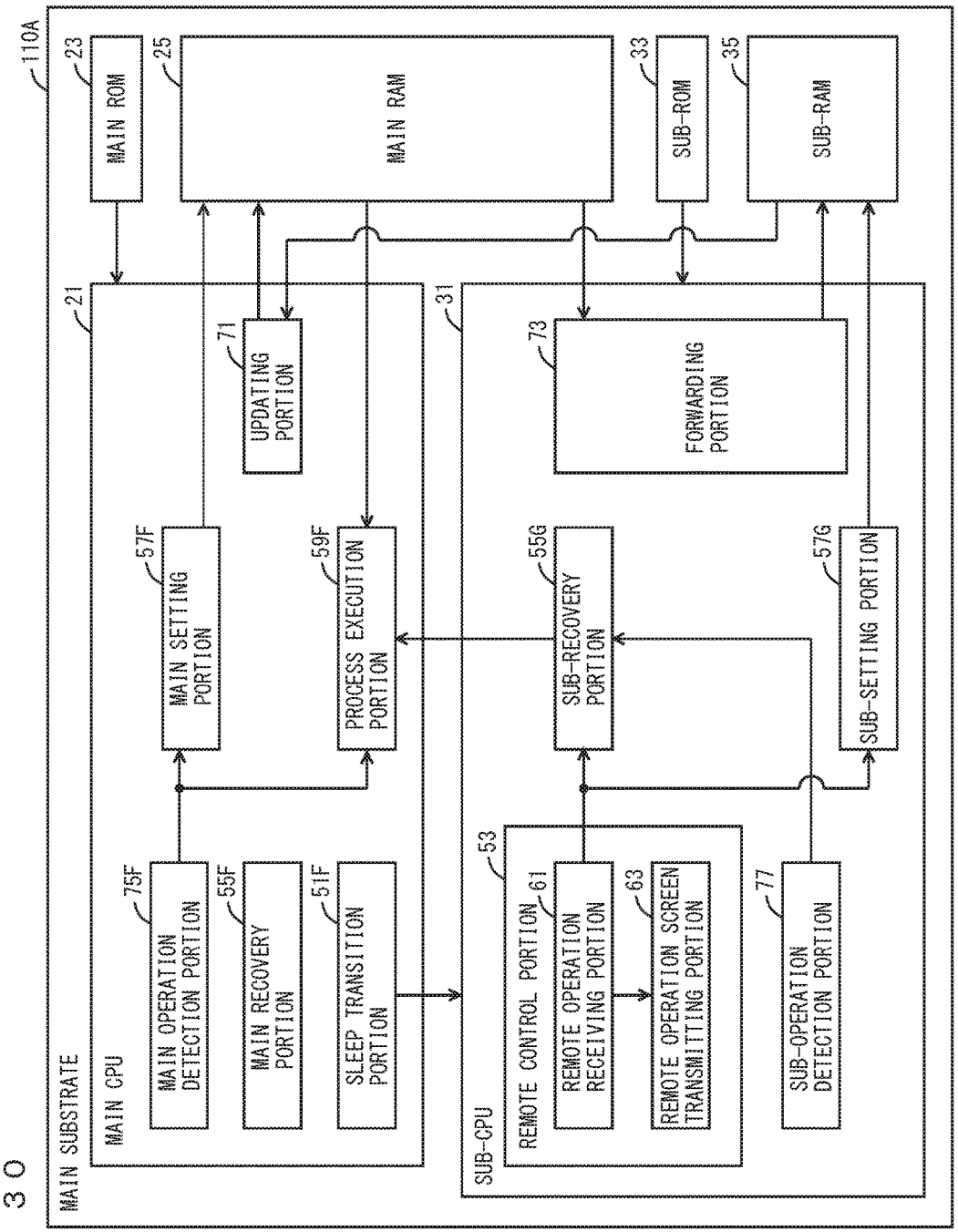
FIG. 30 is a block diagram showing one example of configurations of a main substrate in a modified example of the third embodiment.

FIG. 30 is a block diagram showing one example of configurations of the main substrate in the modified example of the third embodiment. Referring to FIG. 30, differences of the main substrate 110A in the modified example of the third embodiment from the main substrate 110A in the modified example of the first embodiment shown in FIG. 14 lie in that the main CPU 21 includes a main recovery portion 55F, a main operation detection portion 75F, and a main setting portion 57F, that the sleep transition portion 51A and the process execution portion 59A are respectively changed to a sleep transition portion 51F and a process execution portion 59F, that a sub-operation detection portion 77 is added in the sub-CPU 31, and that the recovery portion 55A and the setting portion 57A are respectively changed to a sub-recovery portion 55G and a sub-setting portion 57G. Other functions are the same as the functions shown in FIG. 14. A description thereof is therefore not repeated.

Similarly to the operation detection portion 75 shown in FIG. 27, the main operation detection portion 75F detects an operation of inputting in the operation unit 119 included in the operation panel 115. Further, the main operation detection portion 75F detects an operation by the user based on the detection by the sensor included in the sensor unit 117. Further, in the case where detecting a setting operation, the main operation detection portion 75F outputs a setting instruction to the main setting portion 57F. In the case where detecting an execution instruction operation, the main operation detection portion 75F outputs an execution instruction to the process execution portion 59F. In the case where detecting a screen transition operation, the main operation detection portion 75F displays an operation screen specified by the screen transition operation in the display unit 118.

In the case where receiving a setting instruction from the main operation detection portion 75F, the main setting portion 57F sets setting information in accordance with a setting instruction. The main setting portion 57F sets the setting information included in the setting instruction in a setting item included in the setting instruction. Specifically, the main setting portion 57F updates the setting information of the setting item defined by the setting instruction among setting information stored in the main RAM 25 by the setting information defined by the setting instruction.

In response to input of an execution instruction from the main operation detection portion 75F, the process execution portion 59F executes a process specified by process identification information included in the execution instruction in accordance with the setting information stored in the main RAM 25. Specifically, the process execution portion 59F reads out the setting information stored in the main RAM 25, and executes the process in accordance with the read setting information. The processes to be executed by the process execution portion 59F include a scanning process, an image forming process, a data management process, a data transmission process, or a combination of more than 1 of these processes.

Similarly to the operation detection portion 75 shown in FIG. 27, the sub-operation detection portion 77 detects an operation of inputting in the operation unit 119 included in the operation panel 115. Further, the sub-operation detection portion 77 detects an operation by the user based on detection by a sensor included in the sensor unit 117. Further, in the case where detecting an operation, the sub-operation detection portion 77 outputs an operation detection signal to the sub-recovery portion 55G.

In the case where receiving a setting instruction command from the remote operation receiving portion 61, the sub-setting portion 57G sets setting information in accordance with a setting instruction command. The sub-setting portion 57G sets the setting information defined by the setting instruction command in a setting item defined by the setting instruction command. Specifically, the sub-setting portion 57G updates the setting information of the setting item defined by the setting instruction command among setting information stored in the sub-RAM 35 by the setting information defined by the setting instruction command.

During a period in which a communication path is established between the remote control portion 53 and the HMD 200, the sub-recovery portion 55G sometimes receives an execution instruction command from the remote operation receiving portion 61. In response to input of an execution instruction from the remote operation receiving portion 61, the sub-recovery portion 55G switches the operation mode to the driving mode. Further, in the case where receiving an operation detection signal from the sub-operation detection portion 77, the sub-recovery portion 55G switches the operation mode to the driving mode on condition that a communication path is not established between the remote control portion 53 and the HMD 200. In the case where receiving the operation detection signal from the sub-operation detection portion 77, and the communication path is established between the remote control portion 53 and the HMD 200, the sub-recovery portion 55G does not switch the operation mode to the driving mode.

In the case where switching the operation mode to the driving mode, the sub-recovery portion 55G supplies the power to the automatic document feeder 120, the document scanning unit 130, the image forming unit 140, the paper feed unit 150, and the HDD 113, and activates the main CPU 21. The sub-recovery portion 55G stops after outputting an execution instruction command to the main CPU 21 after the activation of the main CPU 21. Specifically, the sub-recovery portion 55G shuts off the power supplied to the sub-CPU 31.

In this manner, in the case where the operation mode is the driving mode, the main CPU 21 and the main RAM 25 operate in the main substrate 110A in the modified example of the third embodiment. In the case where the operation mode is the power saving mode, the sub-CPU 31 and the sub-RAM 35 operate in the main substrate 110A in the modified example of the third embodiment. Therefore, in the case where the operation mode is the driving mode, the power may be supplied to the main CPU 21 and the main RAM 25. In the case where the operation mode is the power saving mode, the power may be supplied to the sub-CPU 31 and the sub-RAM 35. Therefore, the power consumption in the power saving mode can be reduced.

Figure 31:
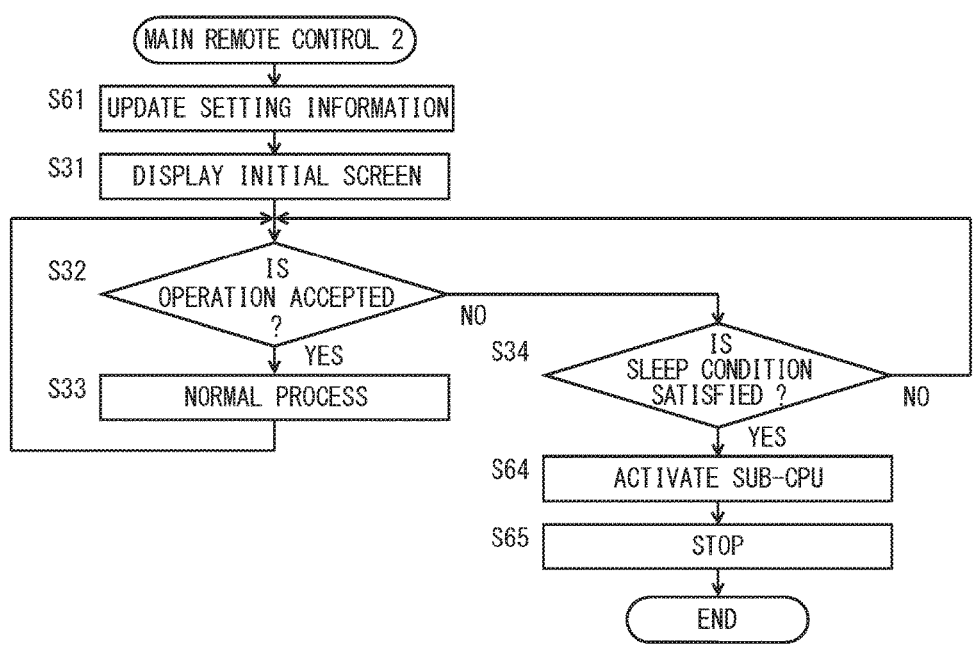
FIG. 31 is a flow chart showing one example of a flow of a main remote control process in the modified example of the third embodiment.

FIG. 31 is a flow chart showing one example of a flow of a main remote control process in the modified example of the third embodiment. The main remote control process in the modified example of the third embodiment is a process executed by execution of a main part of a remote control program in the modified example of the third embodiment stored in the main ROM 25, the HDD 113, or the CD-ROM 190A by the main CPU 21 included in the main substrate 110A in the modified example of the third embodiment.

Referring to FIG. 31, when being activated, the main CPU 21 updates setting information (step S61), and the process proceeds to the step S31. Specifically, the main CPU 21 reads out setting information stored in the sub-RAM 35, and stores the setting information in the main RAM 25. Thereafter, the main CPU 21 shuts off the power supplied to the sub-RAM 35.

The processes from the step S31 to the step S34 are similar to the processes from the step S31 to the step S34 shown in FIG. 28. In the case where the sleep condition is satisfied in the step S34, the main CPU 21 activates the sub-CPU 31 in the step S64, and the process proceeds to the step S65. Specifically, the main CPU 21 supplies the power to the sub-CPU 31 and the sub-RAM 35, and resets the sub-CPU 31. In the step S65, the main CPU 21 stops, and ends the process. Specifically, the main CPU 21 shuts off the power supplied to the automatic document feeder 120, the document scanning unit 130, the image forming unit 140, the paper feed unit 150, and the HDD 113, and shuts off the power supplied to the main CPU 21.

Figure 32:
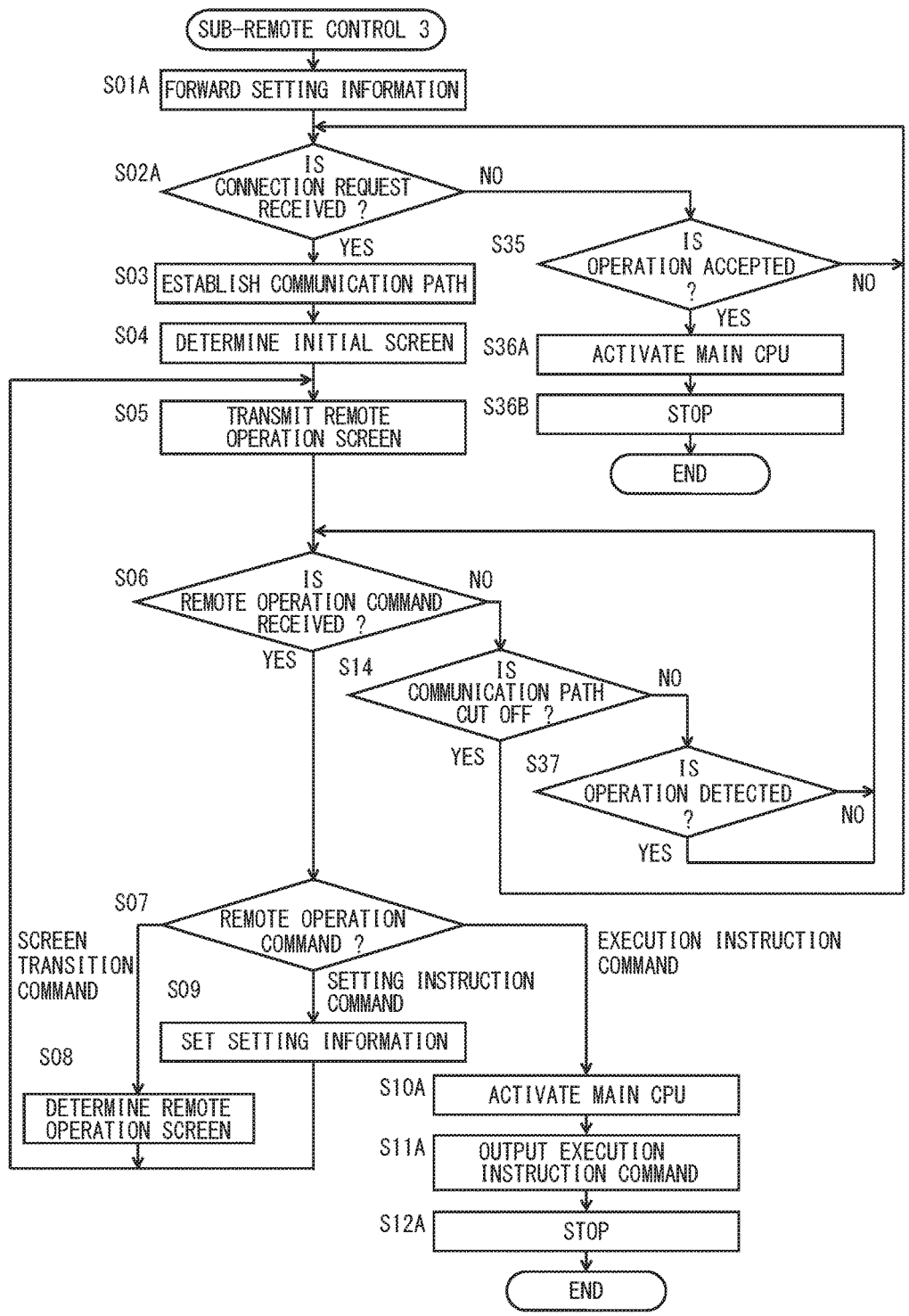
FIG. 32 is a flow chart showing one example of a flow of a sub-remote control process in the modified example of the third embodiment.

FIG. 32 is a flow chart showing one example of a flow of a sub-remote control process in the modified example of the third embodiment. The sub-remote control process in the modified example of the third embodiment is a process executed by execution of a sub-part of a remote control program in the modified example of the third embodiment stored in the sub-ROM 35, the HDD 113, or the CD-ROM 190A by the sub-CPU 31 included in the main substrate 110A in the modified example of the third embodiment.

Referring to FIG. 32, differences of the sub-remote control process in the modified example of the third embodiment from the sub-remote control process in the modified example of the first embodiment shown in FIG. 16 lie in that the step S02 is changed to the step S02A, the step S35, the step S36A, and the step S36B, and that the step S37 is added after the step S14. Other processes are the same as the processes shown in FIG. 16. A description thereof is therefore not repeated. When being activated, the sub-CPU 31 forwards setting information (step S01A), and the process proceeds to the step S02A. In the step S02A, the sub-CPU 31 determines whether a connection request has been received. If the connection request has been received, the process proceeds to the step S03. If not, the process proceeds to the step S35.

In the step S35, the sub-CPU 31 determines whether an operation by the user has been accepted. If the operation has been accepted, the process proceeds to the step S36A. If not, the process returns to the step S02A. In the step S36A, the sub-CPU 31 operates the main CPU, and the process proceeds to the step S36B. Specifically, the sub-CPU 31 supplies the power to the main CPU 21 and the main RAM 25, and resets the main CPU 31. In the step S36B, the sub-CPU 31 stops, and ends the process. Specifically, the sub-CPU 31 supplies the power to the automatic document feeder 120, the document scanning unit 130, the image forming unit 140, the paper feed unit 150, and the HDD 113, and shuts off the power supplied to the sub-CPU 31.

In the step S14, the sub-CPU 31 determines whether a communication path established in the step S03 has been cut off. If the communication path has been cut off, the process returns to the step S02A. If not, the process proceeds to the step S37. In the step S37, the sub-CPU 31 determines whether an operation by the user has been accepted. If the operation has been accepted, the process returns to the step S06. Even if not, the process returns to the step S06.

As described above, the MFP 100A in the third embodiment switches the operation mode from the driving mode to the power saving mode by satisfaction of a sleep condition. In the case where an operation by the user is detected such as the case where the operation unit 119 accepts an operation, or the case where the plurality of sensors included in the sensor unit 117 detects the opening and closing of the paper feed tray, or the case where the MFP 100A is remotely operated by the HMD 200, the MFP 100A in the third embodiment does not switch the operation mode to the driving mode, and sets setting information in accordance with a setting instruction command received from the HMD 200. In the case where having switched the operation mode from the driving mode to the power saving mode, the MFP 100A maintains the operation mode in the power saving mode until receiving an execution instruction command that is a remote operation command corresponding to an execution instruction operation from the HMD 200. In the case where receiving a remote operation command corresponding to the execution instruction operation, the MFP 100A switches the operation mode to the driving mode. Therefore, during a period in which the MFP 100A is being remotely operated by the HMD 200, even in the case where an operation by the user is detected such as the case where the operation unit 119 accepts an operation, the case where the plurality of sensors included in the sensor unit 117 detects the opening and closing of the paper feed tray or the like, the MFP 100A can be remotely operated by the HMD 200 and set setting information without switching the operation mode to the driving mode. As a result, the power consumption of the MFP 100A can be reduced.

Further, in response to detection of a process execution condition setting operation that is one operation that can be accepted by the operation unit 119, the MFP 100A sets setting information used for execution of a process, and the HMD 200 analyzes image data output by the camera 202, and determines the process execution condition setting operation. Therefore, the HMD 200 determines the process execution condition setting operation based on an image that has captured the MFP 100A, so that, during a period in which the MFP 100A is switching the operation mode to the power saving mode, the MFP 100A can set setting information that is the same as the setting information that is set during a period in which the driving mode is being switched to the operation mode.

Further, in response to detection of a configuration changing operation that is one operation that can be accepted by the operation unit 119, the MFP 100A sets setting information that defines a configuration of the hardware resource, and the HMD 200 analyzes image data that is output by the camera 202, and determines the configuration changing operation. Therefore, the HMD 200 determines the configuration changing operation based on the image that has captured the MFP 100A, so that, during a period in which the MFP 100A is switching the operation mode to the power saving mode, the HMD 200 can set setting information that is the same as the setting information that is set during a period in which the operation mode is being switched to the driving mode.

<Fourth Embodiment>

In an image formation system 1 in the fourth embodiment, the server 300 has part of the functions of the MFP 100A in the third embodiment. Hardware configurations and functions of the HMD 200 in the fourth embodiment are the same as the hardware configuration shown in FIG. 2 and the functions shown in FIG. 19. Further, a remote operation process executed by the HMD 200 in the fourth embodiment is the same as the remote operation process in the second embodiment shown in FIG. 22. Further, an appearance and hardware configurations of an MFP in the fourth embodiment are the same as the appearance and the hardware configurations of the MFP in the third embodiment shown in FIGS. 25 and 26. Therefore, a description thereof is therefore not repeated.

Figure 33:
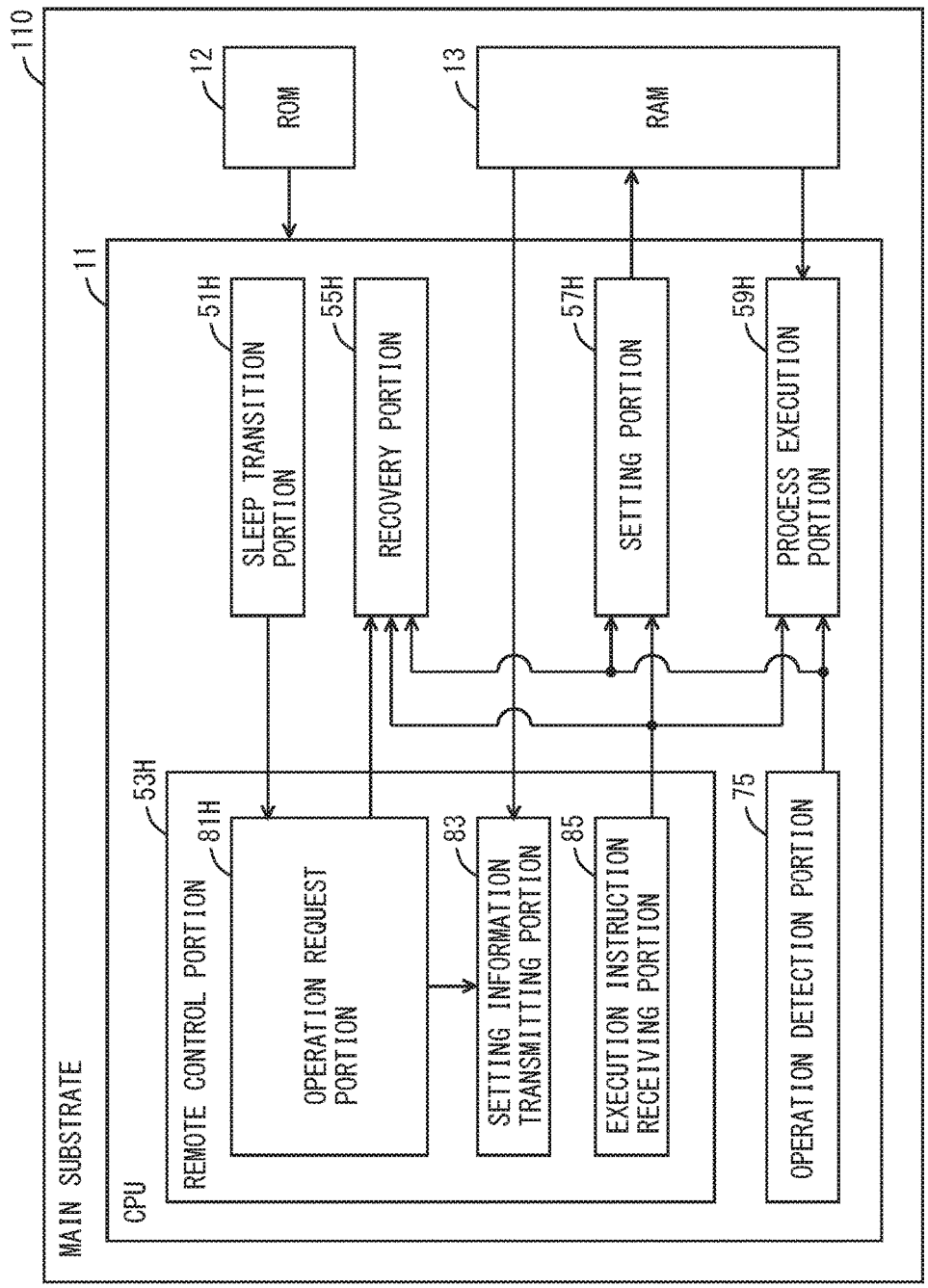
FIG. 33 is a block diagram showing one example of configurations of a main substrate included in an MFP in a fourth embodiment.

FIG. 33 is a block diagram showing one example of configurations of a main substrate included in the MFP in the fourth embodiment. Referring to FIG. 33, a difference of the configurations of the main substrate included in the MFP in the fourth embodiment from the configurations of the main substrate 110 included in the MFP 100A in the third embodiment shown in FIG. 27 lies in that the remote control portion 53, the sleep transition portion 51E, the recovery portion 55E, the setting portion 57E, and the process execution portion 59E are respectively changed to a remote control portion 53H, a sleep transition portion 51H, a recovery portion 55H, a setting portion 57E, and a process execution portion 59H in the functions of the CPU 11. Other functions are the same as the functions shown in FIG. 27. A description thereof is therefore not repeated.

Referring to FIG. 33, when a sleep transition condition is satisfied, the sleep transition portion 51H switches the operation mode from the driving mode to the power saving mode, and outputs a request instruction to the remote control portion 53H. In the case where switching the operation mode to the power saving mode, the sleep transition portion 51H shuts off the power supplied to the automatic document feeder 120, the document scanning unit 130, the image forming unit 140, the paper feed unit 150, and the HDD 113. The sleep transition portion 51H continues to supply the power to the communication I/F unit 160, the facsimile unit 170, and the short-range communication unit 180 even if the operation mode is the power saving mode.

The remote control portion 53H includes an operation request portion 81H, a setting information transmitting portion 83, an execution instruction receiving portion 85. In response to input of a request instruction from the sleep transition portion 51H, the operation request portion 81H controls the communication I/F unit 160 to establish a communication path with the server 300, transmits a proxy request to the server 300, and outputs a transmission instruction to the setting information transmitting portion 83.

When establishing the communication path with the server 300, the operation request portion 81H sometimes receives connection notification from the server 300. Details of functions of the server 300 will be described below. The server 300 accepts a remote operation by the HMD 200 on behalf of the MFP 100. During a period in which accepting the remote operation by the HMD 200 on behalf of the MFP 100, the server 300 transmits connection notification to the MFP 100. During a period in which not accepting the remote operation by the HMD 200 on behalf of the MFP 100, the server 300 does not transmit the connection notification to the MFP 100. During a period in which receiving the connection notification from the server 300, the operation request portion 81H outputs a prohibition signal to the recovery portion 55H.

In response to input of a transmission instruction, the setting information transmitting portion 83 controls the communication I/F unit 160 to transmit setting information stored in the RAM 13 to the server 300.

The execution instruction receiving portion 85 controls the communication I/F unit 160 to receive a server execution instruction from the server 300 after the operation request portion 81H transmits a proxy request to the server 300. The server execution instruction includes setting information and an execution instruction command. In response to reception of the server execution instruction, the execution instruction receiving portion 85 outputs a server recovery instruction to the recovery portion 55H, outputs a server setting instruction to the setting portion 57H, and outputs a process execution instruction to the process execution portion 59H. The server setting instruction includes the setting information included in the server execution instruction, and the process execution instruction includes process identification information of a process specified by the execution instruction command.

In the case where receiving a server setting instruction from the execution instruction receiving portion 85, the setting portion 57H sets setting information included in the server setting instruction. Specifically, the setting portion 57H updates setting information of a setting item corresponding to the setting information included in the server setting instruction among setting information stored in the RAM 13 by the setting information included in the server setting instruction.

In the case where receiving a setting instruction from the operation detection portion 75, the setting portion 57H sets setting information in accordance with the setting instruction. The setting portion 57H updates setting information of a setting item defined by the setting instruction among the setting information stored in the RAM 13 by the setting information defined by the setting instruction.

In response to input of a process execution instruction from the operation detection portion 75, the process execution portion 59H executes a process specified by process identification information included in the process execution instruction in accordance with the setting information stored in the RAM 13. The processes to be executed by the process execution portion 59H include a scanning process, an image forming process, a data management process, a data transmission process, or a combination of more than 1 of these processes.

In the case where the operation mode is switched to the power saving mode, in response to input of an operation detection signal from the operation detection portion 75, the recovery portion 55H switches the operation mode from the power saving mode to the driving mode on condition that a prohibition signal has not been input from the operation request portion 81H. Specifically, the recovery portion 55H supplies the power to the automatic document feeder 120, the document scanning unit 130, the image forming unit 140, the paper feed unit 150, and the HDD 113. In the case where the operation mode is switched to the power saving mode, and the prohibition signal has been input from the operation request portion 81H, the recovery portion 55H does not switch the operation mode from the power saving mode to the driving mode even if an operation detection signal has been input from the operation detection portion 75. A period in which the prohibition signal is being input from the operation request portion 81H is a period in which the server 300 is performing a proxy remote operation of the MFP 100 by the HMD 200.

In the case where the operation mode is switched to the power saving mode, and the prohibition signal has been input from the operation request portion 81H, the recovery portion 55H sometimes receives a server recovery instruction from the execution instruction receiving portion 85. In response to input of a server recovery instruction from the execution instruction receiving portion 85, the recovery portion 55H switches the operation mode to the driving mode.

In response to input of an execution instruction from the operation detection portion 75 with the operation mode being switched to the driving mode, the process execution portion 59H executes a process defined by the execution instruction in accordance with setting information set by the setting portion 57H. Specifically, the process execution portion 59H reads out setting information stored in the RAM 13, and executes a process in accordance with the read setting information. The processes to be executed by the process execution portion 59H include a scanning process, an image forming process, a data management process, a data transmission process, or a combination of more than 1 of these processes. In the case where receiving an execution instruction from the operation detection portion 75 with the operation mode being switched to the power saving mode by the sleep transition portion 51H, the operation mode is not switched to the driving mode by the recovery portion 55E, so that the process execution portion 59H does not execute a process.

Further, in the case where receiving an execution instruction from the remote operation receiving portion 61 with the operation mode being switched to the power saving mode by the sleep transition portion 51H, the operation mode is switched to the driving mode by the recovery portion 55H, so that the process execution portion 59H executes a process defined by the execution instruction. In the case where receiving an execution instruction from the remote operation receiving portion 61 with the operation mode being switched to the power saving mode, the operation mode is switched to the driving mode by the recovery portion 55H, so that the process execution portion 59H can execute a process to control the automatic document feeder 120, the document scanning unit 130, the image forming unit 140, the paper feed unit 150, and the HDD 113.

FIG. 34 is a block diagram showing one example of functions of a CPU included in the server in the fourth embodiment. Referring to FIG. 34, differences of the functions of the CPU 301 included in the server 300 in the fourth embodiment from the functions of the CPU 301 included in the server 300 in the second embodiment shown in FIG. 18 lies in that a connection notification portion 359 is added.

Other functions are the same as the functions shown in FIG. 18. A description thereof is therefore not repeated.

During a period in which a communication path is established between the server 300 and the HMD 200, the connection notification portion 359 transmits connection notification to the MFP 100. When the communication path established by the connection portion 357 between the server 300 and the HMD 200 is cut off, the connection notification portion 359 ends transmitting the connection notification, which has been sent to the MFP 100 until then.

The functions of the CPU 201 included in the HMD 200 in the fourth embodiment are the same as the functions of the CPU 201 included in the HMD 200 in the second embodiment shown FIG. 18. A description thereof is therefore not repeated.

Figure 35:
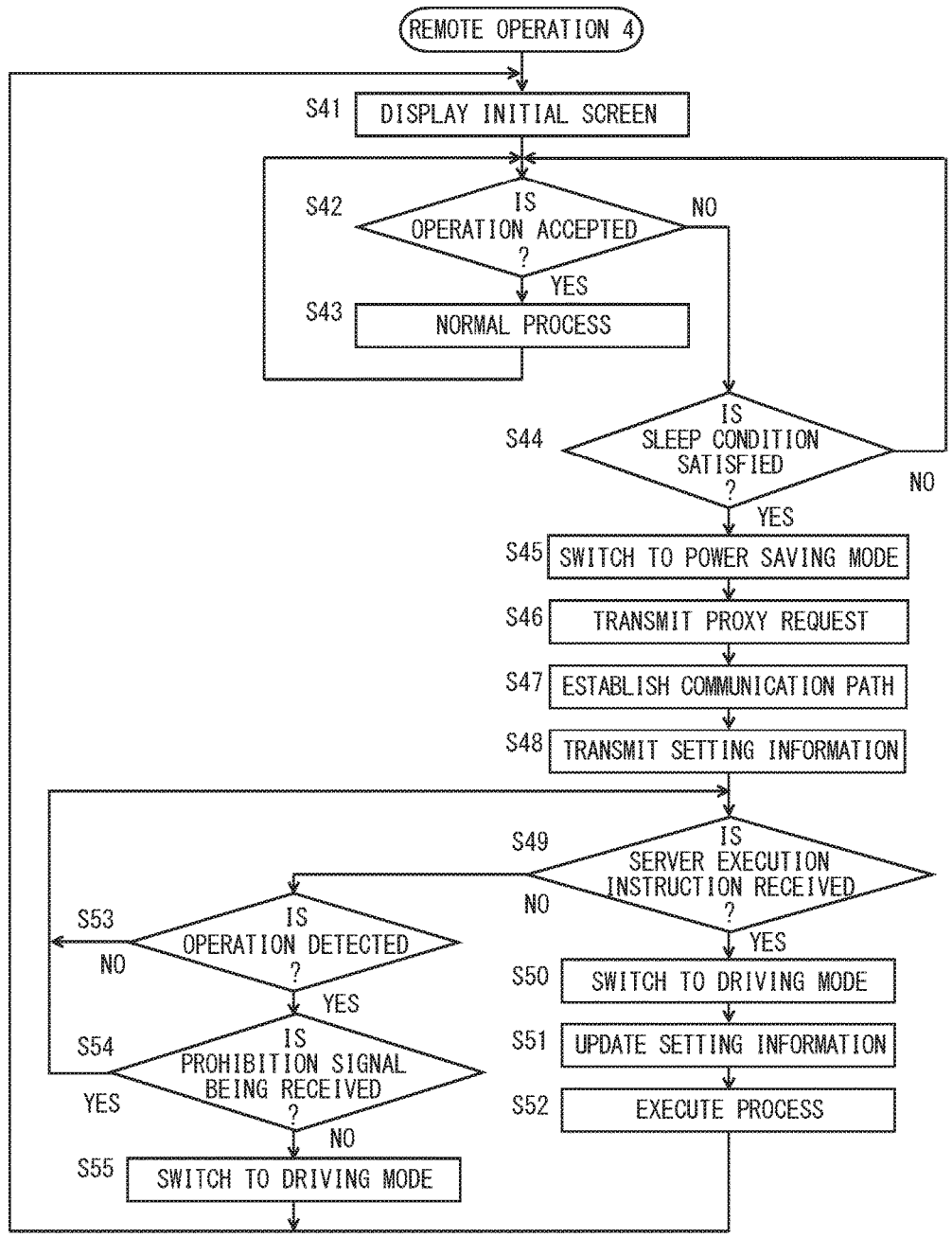
FIG. 35 is a flow chart showing one example of a flow of a remote control process in the fourth embodiment.

FIG. 35 is a flow chart showing one example of a flow of a remote control process in the fourth embodiment. The remote control process in the fourth embodiment is a process executed by execution of a remote control program in the fourth embodiment stored in the ROM 12, the HDD 113, or the CD-ROM 190A by the CPU 11 included in the MFP 100A in the fourth embodiment. Referring to FIG. 35, the CPU 11 displays an initial screen in the display unit 118 (step S41). In the next step S42, the CPU 11 determines whether the operation unit 119 or the sensor unit 117 has accepted an operation by the user. If the operation has been accepted, the process proceeds to the step S43. If not, the process proceeds to the step S44. In the step S43, the CPU 11 executes a process in accordance with the accepted operation, and the process returns to the step S42.

In the step S44, the CPU 11 determines whether a sleep condition has been satisfied. Here, in the step S42, in the case where an operation by the user has not been accepted for a predetermined time period, the CPU 11 determines that the sleep condition has been satisfied. If the sleep condition has been satisfied, the process proceeds to the step S45. If not, the process returns to the step S42.

In the step S45, the CPU 11 switches the operation mode to the power saving mode. Specifically, the CPU 11 shuts off the power supplied to the automatic document feeder 120, the document scanning unit 130, the image forming unit 140, the paper feed unit 150, and the HDD 113. Then, the CPU 11 controls the communication I/F unit 160 to transmit a proxy request to the server 300 (step S46). Then, the CPU 11 controls the communication I/F unit 160 to establish a communication path with the server 300 (step S47). In the next step S48, the CPU 11 transmits setting information stored in the RAM 15 to the server 300, and the process proceeds to the step S49. Specifically, the CPU 11 controls the communication I/F unit 160 to transmit the setting information to the server 300 via the communication path established in the step S47.

In the next step S49, the CPU 11 determines whether a server execution instruction has been received from the server 300. When the communication I/F unit 160 receives the server execution instruction via the communication path established in the step S47, the process proceeds to the step S50. If not, the process proceeds to the step S53. In the step S50, the CPU 11 switches the operation mode to the driving mode. Specifically, the CPU 11 supplies the power to the automatic document feeder 120, the document scanning unit 130, the image forming unit 140, the paper feed unit 150, and the HDD 113.

In the next step S51, the CPU 11 updates setting information. Specifically, the CPU 11 overwrites setting information stored in the RAM 15 with setting information included in the server execution instruction received in the step S49. In the next step S52, the CPU 11 executes a process specified by an execution instruction command included in the server execution instruction received in the step S49 in accordance with the setting information stored in the RAM 15, and the process returns to the step S41.

On the one hand, in the step S53, similarly to the step 42, the CPU 11 determines whether an operation has been detected. If the operation has been detected, the process proceeds to the step S54. If not, the process returns to the step S49. In the step S54, the CPU 11 determines whether the communication I/F unit 160 is receiving a prohibition signal from the server 300 via the communication path established in the step S47. If the communication I/F unit 160 is receiving the prohibition signal, the process returns to the step S49. If not, the process proceeds to the step S55. In the step S55, the CPU 11 switches the operation mode to the driving mode, and the process returns to the step S41. Specifically, the CPU 11 supplies the power to the automatic document feeder 120, the document scanning unit 130, the image forming unit 140, the paper feed unit 150, and the HDD 113.

Figure 36:
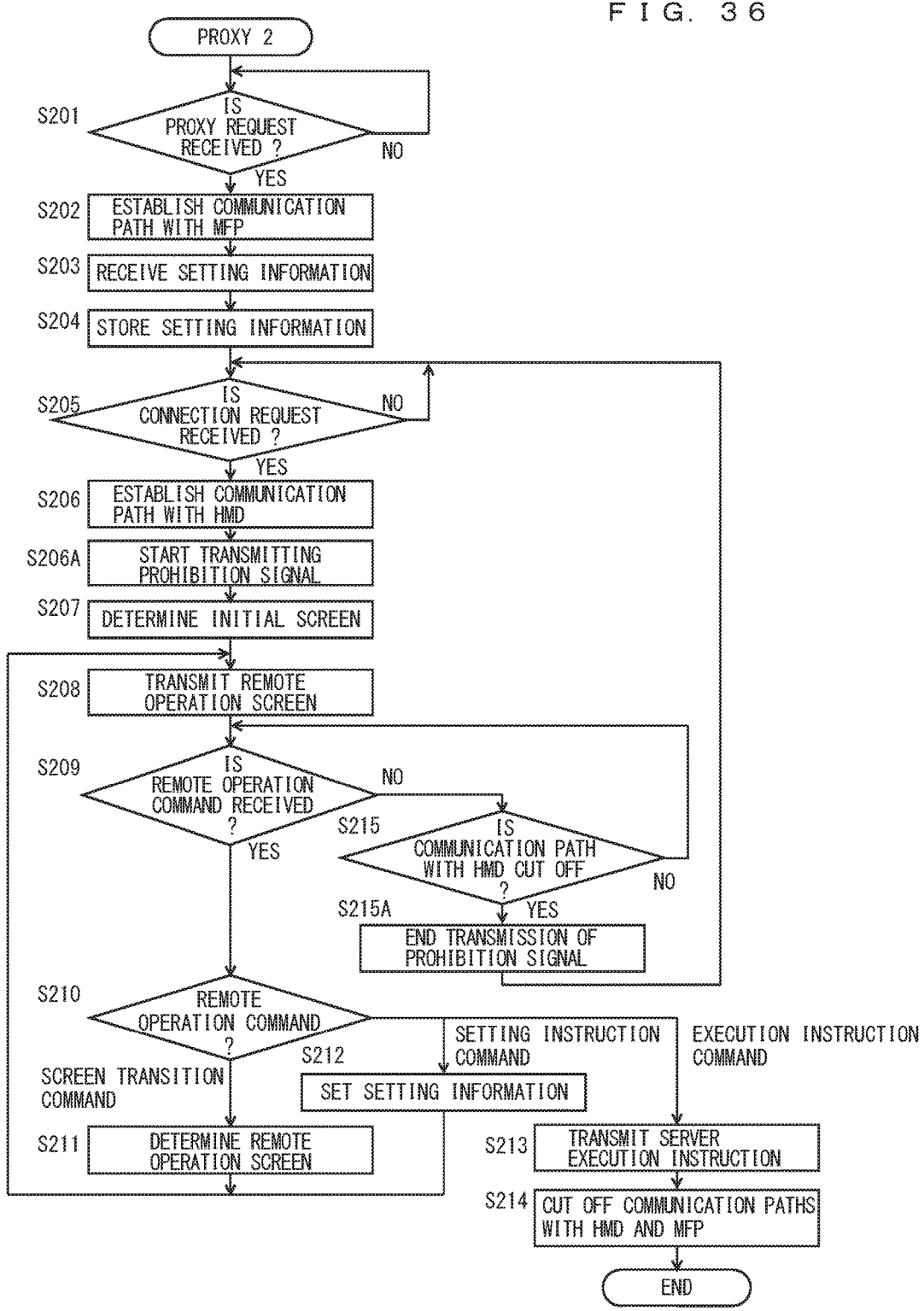
FIG. 36 is a flow chart showing one example of a flow of a proxy process in the fourth embodiment.

FIG. 36 is a flow chart showing one example of a flow of a proxy process in the fourth embodiment. The proxy process in the fourth embodiment is a process executed by execution of a proxy program in the fourth embodiment stored in the ROM 302, the HDD 304 or the CD-ROM 309 by the CPU 301 included in the server 300 in the fourth embodiment. Referring to FIG. 36, differences of the proxy process in the fourth embodiment from the proxy process in the second embodiment shown in FIG. 21 lies in that the step 206A and the step S215A are added. Other processes are the same as the processes shown in FIG. 21. A description thereof is therefore not repeated.

When establishing a communication line with the HMD 200 in the step S206, the CPU 301 starts to transmit a prohibition signal to the MFP 100. Specifically, the CPU 301 controls the communication unit 305 to transmit the prohibition signal via the communication path established with the MFP 100 in the step S202. The prohibition signal is transmitted at predetermined time intervals.

When the communication line established with the HMD 200 is cut off in the step S215, the CPU 301 ends transmission of the prohibition signal, which has been transmitted to the MFP 100, and the process returns to the step S205.

<Fourth Modified Example of Main Substrate>

Figure 37:
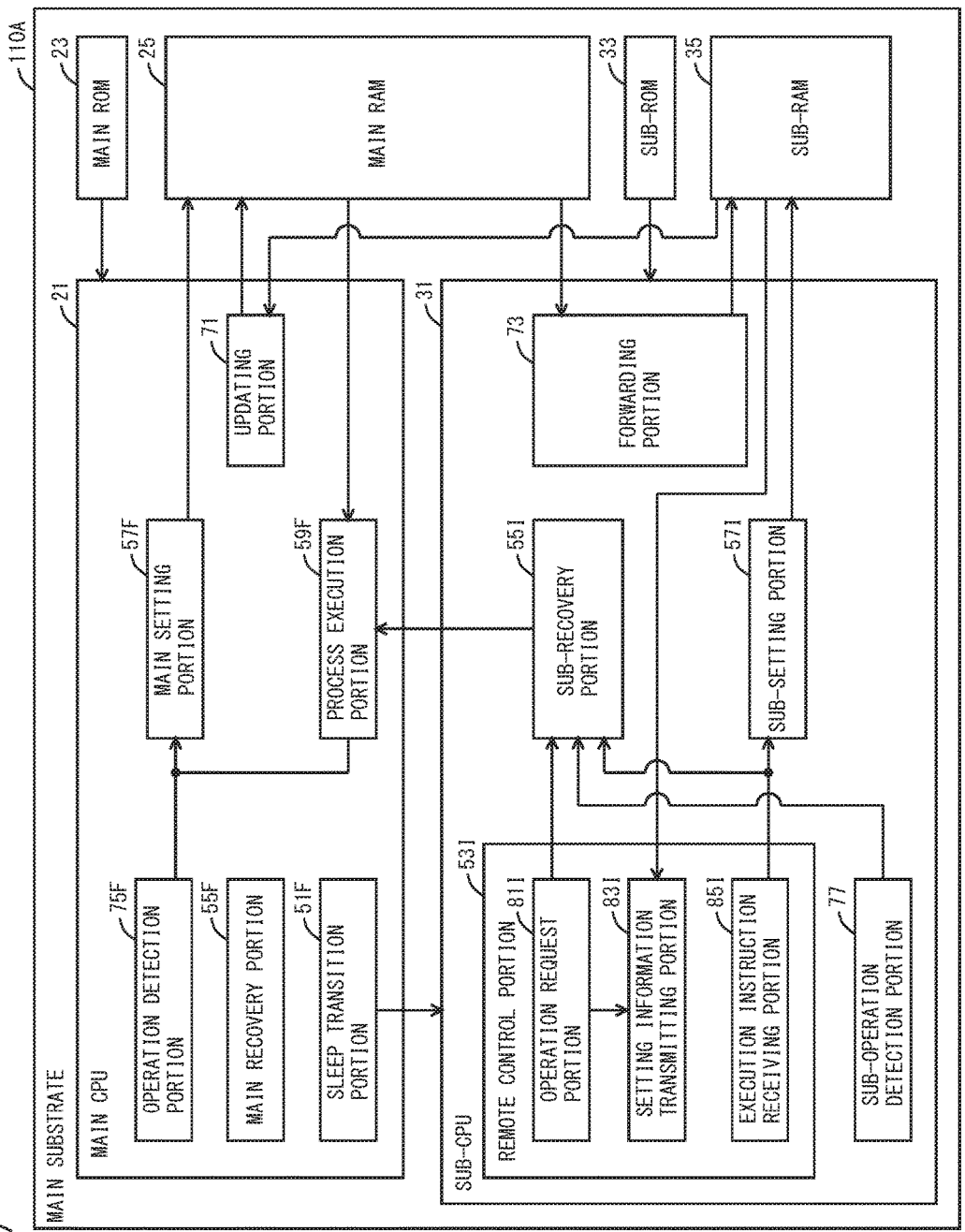
FIG. 37 is a block diagram showing one example of configurations of the main substrate in the modified example of the fourth embodiment.

FIG. 37 is a block diagram showing one example of configurations of the main substrate in the modified example of the fourth embodiment. Referring to FIG. 37, a difference of the main substrate 110A in the modified example of the fourth embodiment from the main substrate 110A in the modified example of the third embodiment shown in FIG. 30 lies in that the remote control portion 53, the sub-recovery portion 55G, and the sub-setting portion 57G are respectively changed to a remote control portion 53I, a sub-recovery portion 55I, and a sub-setting portion 57I in the sub-CPU 31. Other functions are the same as the functions shown in FIG. 30. A description thereof is therefore not repeated.

The remote control portion 53I includes an operation request portion 81I. a setting information transmitting portion 83I, and an execution instruction receiving portion 85I. When the sub-CPU 31 is activated, the operation request portion 81I controls the communication I/F unit 160 to establish a communication path with the server 300, transmits a proxy request to the server 300, and outputs a transmission instruction to the setting information transmitting portion 83I.

When the communication path is established with the server 300, the operation request portion 81I sometimes receives connection notification from the server 300. During the reception of the connection notification from the server 300, the operation request portion 81H outputs a prohibition signal to the sub-recovery portion 55I.

In response to input of a transmission instruction, the setting information transmitting portion 83I controls the communication I/F unit 160 to transmit setting information stored in the sub-RAM 35 to the server 300.

The execution instruction receiving portion 85I controls the communication I/F unit 160 to receive a server execution instruction from the server 300 after the operation request portion 81I transmits a proxy request to the server 300. The server execution instruction includes setting information and an execution instruction command. In response to reception of the server execution instruction, the execution instruction receiving portion 85I outputs a process execution instruction to the sub-recovery portion 55I, and outputs a server setting instruction to the sub-setting portion 57I. The server setting instruction includes setting information included in the server execution instruction, and the process execution instruction includes process identification information of a process specified by a remote control command.

In the case where receiving a server setting instruction from the execution instruction receiving portion 85I, the sub-setting portion 57I sets setting information included in the server setting instruction. Specifically, the sub-setting portion 57I updates setting information of a setting item corresponding to the setting information included in the server setting instruction among setting information stored in the sub-RAM 35 by the setting information included in the server setting instruction.

In response to input of a process execution instruction from the execution instruction receiving portion 85I, the sub-recovery portion 55I switches the operation mode to the driving mode. Further, in the case where receiving an operation detection signal from the sub-operation detection portion 77, the sub-recovery portion 55G switches the operation mode from the power saving mode to the driving mode on condition that a prohibition signal is not input from the operation request portion 81I. In the case where the operation detection signal is input from the sub-operation detection portion 77, and the prohibition signal is input from the operation request portion 81I, the sub-recovery portion 55I switches the operation mode from the power saving mode to the driving mode. A period in which the prohibition signal is being input from the operation request portion 81I is a period in which the server 300 is performing a proxy remote operation of the MFP 100 by the HMD 200.

In the case where the operation mode is switched to the driving mode, the sub-recovery portion 55I supplies the power to the automatic document feeder 120, the document scanning unit 130, the image forming unit 140, the paper feed unit 150, and the HDD 113, and activates the main CPU 21. The sub-recovery portion 55I stops after outputting an execution instruction command corresponding to a process execution instruction to the main CPU 21 after the activation of the main CPU 21. Specifically, the sub-recovery portion 55G shuts off the power supplied to the sub-CPU 31.

In this manner, in the case where the operation mode is the driving mode, the main CPU 21 and the main RAM 25 operate in the main substrate 110A in the modified example of the fourth embodiment. In the case where the operation mode is the power saving mode, the sub-CPU 31 and the sub-RAM 35 operate in the main substrate 110A in the modified example of the fourth embodiment. Therefore, in the case where the operation mode is the driving mode, the power may be supplied to the main CPU 21 and the main RAM 25. In the case where the operation mode is the power saving mode, the power may be supplied to the sub-CPU 31 and the sub-RAM 35. Thus, the power consumption in the power saving mode can be reduced.

A main remote control process in the modified example in the fourth embodiment is the same as the main remote control process in the modified example of the third embodiment shown in FIG. 31.

Figure 38:
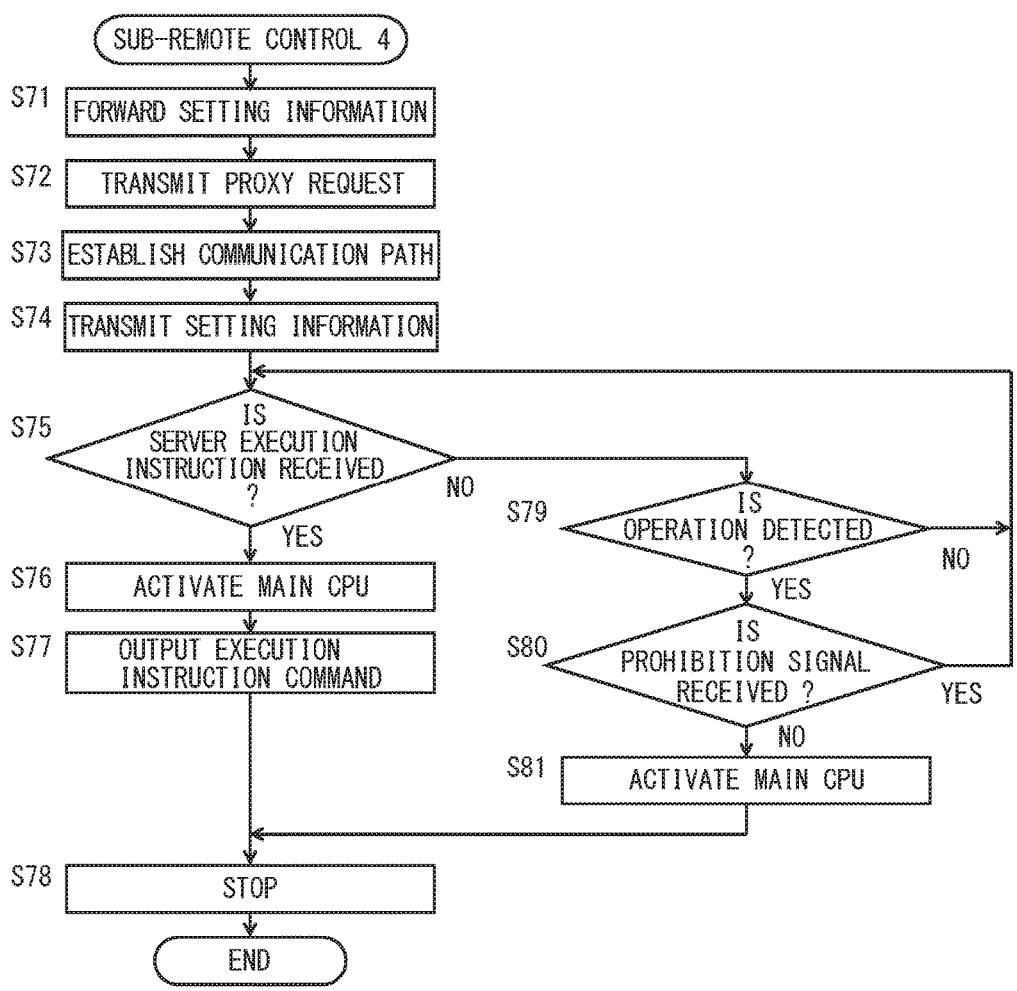
FIG. 38 is a flow chart showing one example of a flow of a sub-remote control process in the modified example of the fourth embodiment.

FIG. 38 is a flow chart showing one example of a flow of a sub-remote control process in the modified example of the fourth embodiment. The sub-remote control process in the modified example of the fourth embodiment is a process executed by execution of a sub-part of a remote control program in the modified example of the fourth embodiment stored in the sub-ROM 35, the HDD 113, or the CD-ROM 190A by the sub-CPU 31 included in the main substrate 110A in the modified example of the fourth embodiment.

Referring to FIG. 38, when being activated, the sub-CPU 31 forwards setting information (step S71), and the process proceeds to the step S72. Specifically, the sub-CPU 31 reads out setting information stored in the main RAM 25, and stores the setting information in the sub-RAM 35. Thereafter, the sub-CPU 31 shuts off the power supplied to the main RAM 25.

In the next step S72, the sub-CPU 31 controls the communication I/F unit 160 to transmit a proxy request to the server 300. Then, the sub-CPU 31 controls the communication I/F unit 160 to establish a communication path with the server 300 (step S73). In the next step S74, the sub-CPU 31 transmits setting information stored in the sub-RAM 35 to the server 300, and the process proceeds to the step S75. Specifically, the sub-CPU 31 controls the communication I/F unit 160 to transmit setting information to the server 300 via the communication path established in the step S73.

In the next step S75, the sub-CPU 31 determines whether a server execution instruction has been received from the server 300. If the communication I/F unit 160 receives the server execution instruction via the communication path established in the step S73, the process proceeds to the step S76. If not, the process proceeds to the step S79. In the step S76, the sub-CPU 31 activates the main CPU 21, and the process proceeds to the step S77. Specifically, the power is supplied to the main CPU 21 and the main RAM 25, and the main CPU 31 is reset. In the next step S77, the sub-CPU 31 outputs an execution instruction command to the main CPU 21, and the process proceeds to the step S78. In the step S78, the sub-CPU 31 stops, and ends the process. Specifically, the sub-CPU 31 supplies the power to the automatic document feeder 120, the document scanning unit 130, the image forming unit 140, the paper feed unit 150, and the HDD 113, and shuts off the power supplied to the sub-CPU 31.

On the one hand, in the step S79, the sub-CPU 31 determines whether the operation unit 119 or the sensor unit 117 has accepted an operation by the user. If the operation has been accepted, the process proceeds to the step S80. If not, the process returns to the step S75. In the step S80, the sub-CPU 31 determines whether the communication I/F unit 160 is receiving a prohibition signal from the server 300 via the communication path established in the step S73. If the communication I/F unit 160 is receiving the prohibition signal, the process returns to the step S75. If not, the process proceeds to the step S81. In the step S81, similarly to the step S76, the sub-CPU 31 activates the main CPU 21, and the process proceeds to the step S78.

As described above, the MFP 100A in the fourth embodiment switches the operation mode from the driving mode to the power saving mode by satisfaction of a sleep condition, transports a proxy request to the server 300, requests the server 300 to receive a remote operation command from the HMD 200, and receives the prohibition signal from the server 300 during a period in which the server 300 is receiving the remote operation command from the HMD 200 on behalf of the MFP 100A. During a period in which receiving the prohibition signal, in the case where an operation by the user is detected such as the case where the operation unit 119 accepts an operation or the case where the plurality of sensors included in the sensor unit 117 detect the opening and closing of the paper feed tray, the MFP 100A switches the operation mode to the driving mode.

After receiving the proxy request from the MFP 100A, the server 300 receives a remote operation command transmitted from the HMD 200 on behalf of the MFP 100A, and sets setting information in accordance with a setting instruction command received from the HMD 200. The server 300 sets the setting information in accordance with the setting instruction command received from the HMD 200 until receiving an execution instruction command that is the remote operation command corresponding to an execution instruction command from the HMD 200. In the case where receiving an execution instruction command that is a remote operation command corresponding to an execution instruction operation, the server 300 transmits a server execution instruction including the changed setting information and a remote operation command to the MFP 100A.

After the operation mode is switched to the power saving mode, during a period in which receiving a prohibition signal from the server 300, the MFP 100A maintains the power saving mode until receiving the server execution instruction from the server 300. When the server execution instruction is received, the MFP 100A switches the operation mode to the driving mode, and executes the execution instruction command included in the server execution instruction in accordance with the setting information included in the server execution instruction.

Therefore, in the case where the MFP 100A has requested the server 300 to receive the remote operation command, and also during a period in which the server 300 is receiving a remote operation command from the HMD 200 on behalf of the MFP 100A, even if where an operation by the user is detected such as the case where the operation unit 119 accepts an operation or the case where the plurality of sensors included in the sensor unit 117 detects the opening and closing of the paper feed tray, the MFP 100A does not switch the operation mode to the driving mode. As a result, the power consumption of the MFP 100A can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a communication circuit capable of, in a case where an operation mode is any of a driving mode and a power saving mode in which power consumption is smaller than the driving mode, wirelessly communicating with a head-mount display (HMD);
   a plurality of sensors, the plurality of sensors including a first sensor which detects opening of a paper feed tray of the image forming apparatus, a second sensor which detects placement of a document on an automatic document feeder of the image forming apparatus, and a third sensor which detects opening of a front door of the image forming apparatus; and
   a processor,
   wherein the processor includes:
      a sleep transition portion configured to switch the operation mode from the driving mode to the power saving mode,
      a remote operation screen transmitting portion which produces a remote operation screen and transmits the remote operation screen to the HMD via the communication circuit,
      a setting portion configured to set setting information in accordance with a remote operation command received by the communication circuit from the HMD,
      a process execution portion configured to, in a case where the remote operation command received by the communication circuit from the HMD corresponds to an execution instruction operation, execute a process in accordance with the set setting information, and
      a recovery portion configured to maintain the operation mode in the power saving mode until the communication circuit receives the remote operation command corresponding to the execution instruction operation, and configured to, only in the case where the communication circuit receives the remote operation command corresponding to the execution instruction operation, switch the operation mode to the driving mode,
   wherein the recovery portion maintains the operation mode in the power saving mode when any one of (i) the opening of the paper feed tray is detected, based on an output of the first sensor, (ii) the placement of a document on the automatic document feeder is detected, based on an output of the second sensor, and (iii) the opening of the front door is detected, based on an output of the third sensor, while the operation mode is in the power saving mode.

2. The image forming apparatus according to claim 1, wherein the execution instruction operation is an operation of giving an instruction to execute an image forming process to the image forming apparatus.

3. An image forming system that includes the image forming apparatus according to claim 1 and the HMD, the HMD comprising:
   an imaging device that outputs an image capturing a subject; and
   an operation-side processor,
   wherein the operation-side processor includes:
      an operation determination portion configured to determine an operation by a user based on the image output by the imaging device, and
      a remote operation portion configured to transmit, as the remote operation command, a command corresponding to an operation determined by the operation determination portion.

4. The image forming system according to claim 3, wherein the execution instruction operation is an operation of giving an instruction to execute an image forming process to the image forming apparatus.

5. The image forming system according to claim 3, wherein the operation determination portion is configured to determine the operation based on a change of a shape of the image forming apparatus.

6. The image forming system according to claim 3, wherein:
the image forming apparatus further comprises:
a main memory that operates when the operation mode is the driving mode, and
a sub-memory that operates when the operation mode is the power saving mode, a power consumption of the sub-memory being smaller than a power consumption of the main memory,
the processor includes:
a forwarding portion configured to, in a case where the operation mode is switched from the driving mode to the power saving mode, store setting information stored in the main memory in the sub-memory, and
an updating portion configured to, in a case where the operation mode is switched from the power saving mode to the driving mode, update the setting information stored in the main memory by the setting information stored in the sub-memory, and
the setting portion is configured to, in a case where the operation mode is the driving mode, change the setting information stored in the main memory, and is configured to, in a case where the operation mode is the power saving mode, change the setting information stored in the sub-memory.

7. A remote control method performed by an image forming apparatus that is remotely operable by a head-mount display (HMD), the image forming apparatus comprising (i) a communication circuit capable of, in a case where an operation mode is any of a driving mode and a power saving mode in which power consumption is smaller than the driving mode, wirelessly communicating with the HMD, and (ii) a plurality of sensors, the plurality of sensors including a first sensor which detects opening of a paper feed tray of the image forming apparatus, a second sensor which detects placement of a document on an automatic document feeder of the image forming apparatus, and a third sensor which detects opening of a front door of the image forming apparatus, the remote control method comprising:
a sleep transition step of switching the operation mode from the driving mode to the power saving mode;
a remote operation screen transmitting step of producing a remote operation screen and transmitting the remote operation screen to the HMD via the communication circuit:
a setting step of setting setting information in accordance with a remote operation command received by the communication circuit from the HMD with the image forming apparatus being remotely operated by the HMD;
a process execution step of, in a case where the remote operation command received from the HMD corresponds to an execution instruction operation, executing a process in accordance with the set setting information; and
a recovery step of maintaining the operation mode in the power saving mode until the remote operation command corresponding to the execution instruction operation is received, and switching the operation mode to the driving mode only in the case where the remote operation command corresponding to the execution instruction operation is received,
wherein in the recovery step, the operation mode is maintained in the power saving mode when any one of (i) the opening of the paper feed tray is detected, based on an output of the first sensor, (ii) the placement of a document on the automatic document feeder is detected, based on an output of the second sensor, and (iii) the opening of the front door is detected, based on an output of the third sensor.

8. The remote control method according to claim 7, wherein the execution instruction operation is an operation of giving an instruction to execute an image forming process to the image forming apparatus.

9. A non-transitory computer-readable recording medium encoded with a remote control program, wherein the remote control program is executable to control a computer that controls the image forming apparatus to perform the remote control method according to claim 7.

10. The non-transitory computer-readable recording medium according to claim 9, wherein the execution instruction operation is an operation of giving an instruction to execute an image forming process to the image forming apparatus.

11. The image forming apparatus according to claim 1, wherein the recovery portion is configured to maintain the operation mode in the power saving mode in a case where the remote operation command received by the communication circuit from the HMD corresponds to a command other than the execution instruction operation.

12. The image forming apparatus according to claim 1, wherein the remote operation command corresponds to a remote operation instruction input at the HMD using the remote operation screen transmitted thereto.

13. The image forming apparatus according to claim 1, wherein the remote operation command is received from the HMD via a server.

14. The image forming apparatus according to claim 1, wherein the communication circuit is configured to communicate with the HMD via short-range communication and via wireless LAN.

* * * * *